US005652914A

United States Patent [19]
Eckert et al.

[11] Patent Number: 5,652,914
[45] Date of Patent: Jul. 29, 1997

[54] METHOD AND SYSTEM FOR SUPERIMPOSING, CREATING AND ALTERING I/O APPLICATIONS AND CONTROLS WITHIN AN I/O SUBSYSTEM BY USING AN I/O SUBCHANNEL INTERCEPT FIELD

[75] Inventors: Wolfgang Eckert, Altdorf, Germany; Marten Jan Halma, Poughquag, N.Y.; Juergen Erwin Maergner, Sindelfingen, Germany; John Scott Trotter, Pleasant Valley, N.Y.

[73] Assignee: International Business Machines Corporation, Armonk, N.Y.

[21] Appl. No.: 489,396

[22] Filed: Jun. 12, 1995

[51] Int. Cl.⁶ .................................................. G06F 13/00
[52] U.S. Cl. ................................... 395/856; 395/868
[58] Field of Search .............................. 395/700, 275, 395/375, 856, 868; 340/172.5, 173

[56] References Cited

U.S. PATENT DOCUMENTS

| | | | |
|---|---|---|---|
| 3,725,864 | 4/1973 | Clark et al. | 340/172.5 |
| 3,748,653 | 7/1973 | Debruyne et al. | 340/173 |
| 3,805,247 | 4/1974 | Zucket et al. | 340/172.5 |
| 3,911,406 | 10/1975 | McLaughlin et al. | 340/172.5 |
| 4,142,246 | 2/1979 | Fumihiko et al. | 164/900 |
| 4,162,520 | 7/1979 | Cook et al. | 364/200 |
| 4,293,909 | 10/1981 | Catiller et al. | 364/200 |
| 4,542,453 | 9/1985 | Patrick et al. | 364/200 |
| 4,855,936 | 8/1989 | Casey et al. | 364/521 |
| 5,210,833 | 5/1993 | Kaneko | 395/375 |
| 5,335,331 | 8/1994 | Murao et al. | 395/375 |
| 5,432,941 | 7/1995 | Crick et al. | 395/700 |
| 5,459,838 | 10/1995 | Coscarella et al. | 395/827 |
| 5,461,721 | 10/1995 | Cormier et al. | 395/275 |

*Primary Examiner*—Thomas C. Lee
*Assistant Examiner*—Duo Chen
*Attorney, Agent, or Firm*—Bernard M. Goldman

[57] ABSTRACT

An Internal I/O Facility (iIOF) having a general interface for executing I/O related applications in an Input/Ouput Sub-System (IOSS) of a computer system. IIOF applications are executed in the IOSS outside the scope of CPU applications executed under the operating system (OS) of the computer system. IIOF applications are allowed to use all facilities in the IOSS. An iIOF subchannel extension is provided for those subchannels which can execute an iIOF application. IIOF subchannel extensions contain interception control fields which determine if conventional processing for the subchannel by the IOSS is to be intercepted to execute an iIOF application. A front-end interception bit in a subchannel extension is used to initiate iIOF application execution when the subchannel is taken from the IOSS work request queue. A back-end interception bit in a subchannel extension is used to initiate iIOF application execution when the subchannel is to have status put on the IOSS interruption queue. The iIOF application is defined in a field in the iIOF subchannel extension. The IOSS may front-end intercept I/O requests made by the OS, and the IOSS may back-end intercept status received by the IOSS for I/O interruptions to be generated by the IOSS.

27 Claims, 35 Drawing Sheets

FIG.6

| KEY | S | 0 | 0 | 0 | F | P | I | 0 | 0 | 0 | 0 | 0 | LPM | 0 0 0 0 0 0 0 0 |
|---|---|---|---|---|---|---|---|---|---|---|---|---|---|---|

INTERRUPTION PARAMETER

CHANNEL PROGRAM ADDRESS

FIG.7

| KEY | S | L | CC | F | P | I | 0 | 0 | Z | E | N | 0 | FC | AC | SC |
|---|---|---|---|---|---|---|---|---|---|---|---|---|---|---|---|

CPA ADDRESS/CCW ADDRESS

DEVICE STATUS | SCH STATUS | COUNT

SUBCHANNEL LOGOUT

EXTENDED REPORT WORD

ZEROS

EXTENDED CONTROL WORD

FIG. 8

| Word | \ | \ | \ | \ | \ | \ | \ | \ | \ |
|---|---|---|---|---|---|---|---|---|---|
| 0 | 0 0 | ISC | 0 0 | A | E | LM | MM | D | T | V |
| 1 | \multicolumn{9}{l|}{INTERRUPTION PARAMETER} |
| 2 | \multicolumn{4}{l|}{LPM} | \multicolumn{2}{l|}{PNOM} | \multicolumn{3}{l|}{LPUM} | PIM |
| 3 | \multicolumn{6}{l|}{MBI} | \multicolumn{2}{l|}{POM} | PAM |
| 4 | \multicolumn{3}{l|}{CHPID-0} | \multicolumn{3}{l|}{CHPID-1} | \multicolumn{2}{l|}{CHPID-2} | CHPID-3 |
| 5 | \multicolumn{3}{l|}{CHPID-4} | \multicolumn{3}{l|}{CHPID-5} | \multicolumn{2}{l|}{CHPID-6} | CHPID-7 |
| 6 | 0 | 0 | 0 | 0 | 0 | 0 | 0 | 0 | S |
| 7 | 0 | 0 | 0 | 0 | 0 | 0 | 0 | 0 | 0 |
| 8 | \multicolumn{9}{l|}{SUBCHANNEL STATUS WORD} |
| 9 | | | | | | | | | |
| 10 | \multicolumn{4}{l|}{CUA-0} | \multicolumn{3}{l|}{LINK ADDR-0} | \multicolumn{2}{l|}{LINK ADDR-1} | CUA-1 |
| 11 | \multicolumn{4}{l|}{CUA-2} | \multicolumn{3}{l|}{LINK ADDR-2} | \multicolumn{2}{l|}{LINK ADDR-3} | CUA-3 |
| 12 | \multicolumn{4}{l|}{CUA-4} | \multicolumn{3}{l|}{LINK ADDR-4} | \multicolumn{2}{l|}{LINK ADDR-5} | CUA-5 |
| 13 | \multicolumn{4}{l|}{CUA-6} | \multicolumn{3}{l|}{LINK ADDR-6} | \multicolumn{2}{l|}{LINK ADDR-7} | CUA-7 |
| 14 | S | 0 | F | B | IAI | 0 0 0 0 0 0 0 0 | V | T | E | 0 | P | PrefP |
| 15 | \multicolumn{4}{l|}{DEVICE ADDRESS} | \multicolumn{5}{l|}{LOGICAL CONTROL UNIT ADDRESS} |

Note: header spans — Word 2: LPM | PNOM | LPUM | PIM; Word 0: bits ISC, 0 0, A, E, LM, MM, D, T, V; Word 1: INTERRUPTION PARAMETER / DEVICE NUMBER.

FIG. 9

| INTERRUPTION PARAMETER | | | | | | |
|---|---|---|---|---|---|---|
| 0 0 | 0 0 | E | MM | D | T | |
| LPM | | PNOM | | | | |
| | | MBI | | | | |
| CHPID-0 | | CHPID-1 | | | | |
| CHPID-4 | | CHPID-5 | | | | |
| 0 0 0 0 0 0 0 0 | | 0 0 0 0 0 0 0 0 | | | | |
| 0 0 0 0 0 0 0 0 | | 0 0 0 0 0 0 0 0 | | | | |

| DEVICE NUMBER | |
|---|---|
| PIM | |
| LPUM | |
| PAM | |
| POM | |
| CHPID-2 | CHPID-3 |
| CHPID-6 | CHPID-7 |
| 0 0 0 0 0 0 0 0 | 0 0 0 0 0 0 0 S |
| 0 0 0 0 0 0 0 0 | 0 0 0 0 0 0 0 0 |

| LINK ADDR-0 | CUA-0 | LINK ADDR-1 | CUA-1 |
| LINK ADDR-2 | CUA-2 | LINK ADDR-3 | CUA-3 |
| LINK ADDR-4 | CUA-4 | LINK ADDR-5 | CUA-5 |
| LINK ADDR-6 | CUA-6 | LINK ADDR-7 | CUA-7 |
| DEVICE ADDRESS | S 0 | IAI | |
| 0 0 0 0 0 0 0 0 | V T | E O P | PrefP |

FIG. 10

| INTERRUPTION PARAMETER | | | | | | | | | | |
|---|---|---|---|---|---|---|---|---|---|---|
| 0 0 | 0 0 | E | MM | D | T | PNOM | | LPUM | | PIM |
| | | | | | | | | | | |
| LPM | | | MBI | | | | | POM | | PAM |
| | | | | | | | | | | S |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| | | | | | | | | | | |

DEVICE NUMBER

| DEVICE ADDRESS | 0 | IAI | 0 0 0 0 0 0 0 V | T | E | O P | PrefP |

LOGICAL CONTROL UNIT ADDRESS

SID:

| R | M | WORK AREA SIZE |

R = REQUEST TO SEE CHANNEL RESET FUNCTIONS
M = REQUEST TO SEE CHANNEL-RELATED MACHINE CHECKS

OPERAND:

| 0 | 0 | WORK AREA SIZE |
| | | WORK AREA ORIGIN |

FIG. 12

| 1ST DIAGNOSTIC SUBCHANNEL # | # OF DIAGNOSTIC SUBCHANNELS |
| 1ST SHADOW SUBCHANNEL # | # OF SHADOW SUBCHANNELS |
| BASE ADDRESS OF APPLICATION WORK AREA | |

| | 1805 | 1801 | 1802 | | | |
|---|---|---|---|---|---|---|
| | 0 | 7 8 | 15 16 | 23 | 24 28 | 31 |
| 00 | CHPID | FUNCTION ID | STATUS | 0000 | RSVD | |
| 01 | SCSW 0 ||||||
| 02 | SCSW 1 ||||||
| 03 | SCSW 2 ||||||
| 04 | ADDITIONAL PARMS (SEE BELOW) ||||| |
| 13 | ||||| 1803 |
| 14 | 0 ||||||
| 15 | 0 ||||||

CHPID: IDENTIFIES THE CHANNEL PATH THAT THE OFPA WILL BE USED FOR.
SET UP AT IOSS INITIALIZATION TIME

FUNCTION ID: SET BY SUPPORT PROCESSOR TO BE THE FUNCTION IT WANTS PERFORMED.
SOME SUPPORTED FUNCTIONS:

'00'X=NO COMMAND TO PERFORM
    '01'X=ALTER OSA MEMORY (REQUIRES ADDITIONAL PARAMETERS)
    '02'X=DISPLAY OSA MEMORY (REQUIRES ADDITIONAL PARAMETERS)
    '03'X=RESET OSA (NO ADDTL PARAMETERS)
    '05'X=SET PORT ENABLE/DISABLE (REQUIRES ADDITIONAL PARAMETERS)
    '10'X=ENABLE I/O (NO ADDTL PARAMETERS)

STATUS: PROGRESS OF FUNCTION:

'00'X=SET BY SP PRIOR TO SIGNALLING SERVICE FUNCTION
    '01'X="FUNCTION STARTED" BY OSA/IA
    '02'X="FUNCTION COMPLETED SUCCESSFULLY"
    OTHER="FUNCTION FAILED" REASON

SCSW0,1,2: SUBCHANNEL STATUS WORD FOR ADDITIONAL INFORMATION

ADDL. PARMS: FUNCTION ID DEPENDENT

FIG.19

| | 0 | 7 8 | 15 16 | 23 24 | 31 |
|---|---|---|---|---|---|
| 04 | 0 | | '41'X | NO. OF BYTES TO WRITE | |
| 05 | F | OSA CARD MEMORY ADDRESS TO WRITE TO | | | |
| 06 | 0 | | | | |
| 07 | 0 | | | | |
| 08 | 0 | | | | |
| 09 | 0 | | | | |
| 10 | 0 | | | | |
| 11 | 0 | | | | |
| 12 | SSA ADDRESS OF DATA TO WRITE | | | | |
| 13 | 0 | | | | |

F: FLASH BIT
    0 = RAM
    1 = FLASH

FIG.20

| | 0 | 7 8 | 15 16 | 23 24 | 31 |
|---|---|---|---|---|---|
| 04 | 0 | | '42'X | NO. OF BYTES TO READ | |
| 05 | F | OSA CARD MEMORY ADDRESS TO READ FROM | | | |
| 06 | 0 | | | | |
| 07 | 0 | | | | |
| 08 | 0 | | | | |
| 09 | 0 | | | | |
| 10 | 0 | | | | |
| 11 | 0 | | | | |
| 12 | SSA ADDRESS TO READ DATA INTO | | | | |
| 13 | 0 | | | | |

F: FLASH BIT
    0 = RAM
    1 = FLASH

|    | 0  7 | 8       15 | 16 | 23 24      31 |
|----|------|------------|----|---------------|
| 04 | 0    | '15'X      |    | 0             |
| 05 | 0    | PORT NUMBER | D | 0             |
| 06 |      | 0          |    |               |
| 07 |      | 0          |    |               |
| 08 |      | 0          |    |               |
| 09 |      | 0          |    |               |
| 10 |      | 0          |    |               |
| 11 |      | 0          |    |               |
| 12 |      | 0          |    |               |
| 13 |      | 0          |    |               |

PORT NUMBER: PORT THAT IS BEING ENABLED OR DISABLED
D:           1 = DISABLE PORT
             0 = ENABLE PORT

FIG. 30

| SUPPORT PROCESSOR | I/O SUBSYSTEM AND IIOF | SERIAL CHANNEL | LINK | COMMUNICATION CONTROLLER |
|---|---|---|---|---|
| 3001 DECONFIGURE CHANNEL → | 3002 IOSS TURNS OFF PAM BITS IN SUBCHANNELS (INCLUDING DIAGNOSTIC SUBCHANNEL) FOR THIS CHPID | | | |
| | 3203 IOSS SENDS OLS REQUEST TO CHANNEL → | 3004 SEND OLS AND DROP OUTBOUND LIGHT → | | 3005 DROP INBOUND LIGHT AND BEGIN RESET |
| | 3006 IOSS SENDS ACK WITH RETURN CODE | | | |
| 3007 DONE | | | | |

FIG. 33

| SUPPORT PROCESSOR | I/O SUBSYSTEM AND IIOF | SERIAL CHANNEL | LINK | COMMUNICATION CONTROLLER |
|---|---|---|---|---|
| 3301 SET UP OFPA TO "READ MASTER FILE" | | | | |
| 3302 FROM MASTER FILE DATA, DETERMINE IF CODE LEVELS MATCH. IF YES, GO TO STEP 07 | PROCESS IN FIG.22 | | | |
| 3303 LOAD NEW LEVELS OF CODE FROM SP DASD INTO SSA OCDA | | | | |
| 3304 SET UP OFPA TO "WRITE LOAD MODULE" | | | | |
| 3305 SET UP OFPA TO "WRITE MASTER FILE" (UPDATED) | | | | |
| 3306 OFPA FUNCTION= "RESET OSA". AND GO TO STEP 10 | PROCESS IN FIG.37 MINUS THE LOGGING TO FLASH | | | |
| 3307 OFPA FUNCTION= "ENABLE PORTS" | | | | |
| 3308 OFPA FUNCTION= "ENABLE I/O". | PROCESS IN FIG.22 | | | |
| 3309 OSA DEVICES NOW ACCESSIBLE | | | | |
| 3310 END PRI | | | | |

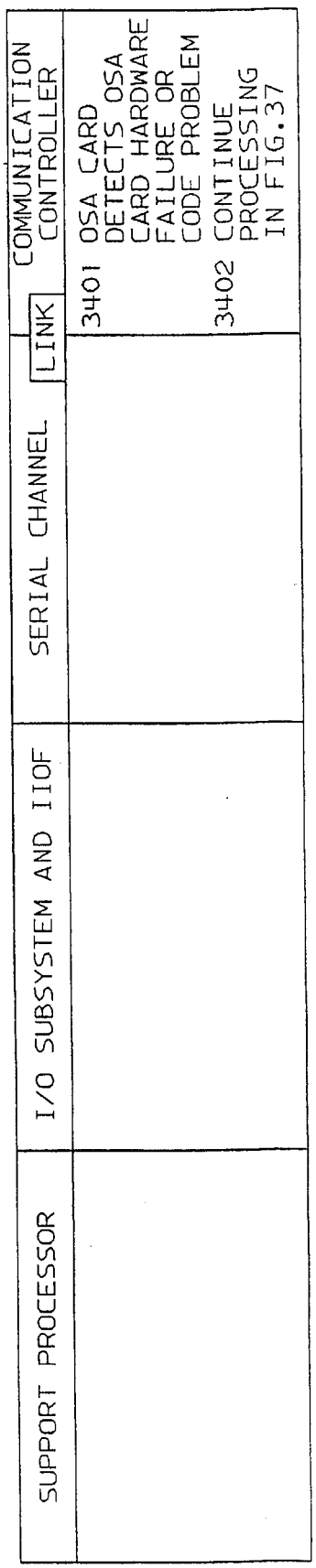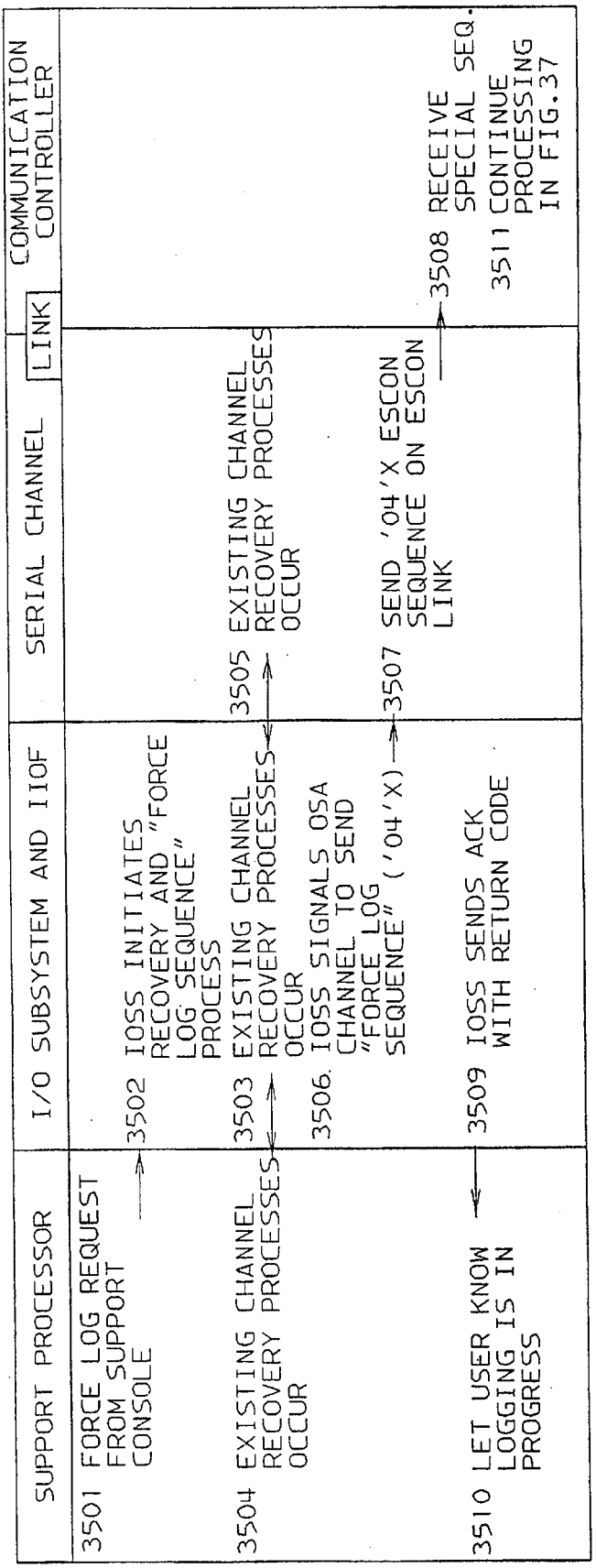

METHOD AND SYSTEM FOR SUPERIMPOSING, CREATING AND ALTERING I/O APPLICATIONS AND CONTROLS WITHIN AN I/O SUBSYSTEM BY USING AN I/O SUBCHANNEL INTERCEPT FIELD

INTRODUCTION

The invention provides a new level of execution in a computer system by enabling microcode execution of I/O Related applications in the I/O subsystem (IOSS) of a computer system. The invention provides novel ways to connect the execution of the I/O-related applications to I/O events controlled from anywhere in the system. These I/O-related applications are herein called "internal I/O function" (iIOF) applications existing as executable microcode in the IOSS.

INCORPORATION BY REFERENCE

This specification incorporates by reference the entire specification in U.S. application Ser. No. 08/489,421 (PO9-95-021X) entitled "Method and System for Controlling Servicability of Adapters Connected by an I/O Channel Interface to a Computer System" by the same inventors as the subject application filed on the same day as this specification.

BACKGROUND OF THE INVENTION

Existing I/O Channel Subsystems (IOSS) only provide direct support for I/O instructions issued by a host central processor which initiate execution of I/O channel programs located in the host main memory, and for I/O interruptions resulting from the execution of such I/O channel programs. Other I/O related functions must be executed by a central processor (CPU), which must issue an I/O instruction to the IOSS to start execution of a channel program that will use the results of such CPU executed I/O related functions. The latter processing is an interface between the IOSS and such CPU executed I/O related functions, which is indirect.

Dedicated I/O adapter functions connected with the IOSS have been performed in the prior art using unique hardware entities external to the IOSS, such as channel-to-channel hardware coupling devices, and special hardware semiconductor chips for performing special functions such as compression/decompression, cryptography, LAN network conversion operations, etc.

The IOSS operates as a protected and privileged part of a computer system. The IOSS does not execute ordinary CPU instructions, and CPUs have only limited access to the IOSS through a small set of privileged CPU-I/O instructions. Its protected state does not allow the IOSS to be accessed by any application programs executing in problem state, and general access to the IOSS is not provided even to the privileged OS program. The CPU's problem state and privileged instructions are all located in the same real memory with the I/O channel programs. That is, I/O channel programs are not located in the IOSS. And the IOSS cannot execute non-privileged CPU instructions.

The present invention finds use in a data processing system such as one produced by International Business Machines Corp. and referred to as an ES/9000. This data processing system is configured to comply with an architecture defined in "IBM System ESA/390 Principles of Operation", SA22-7201.

A portion of FIG. 1 will be referred to for describing the existing flow of I/O functions and operations through the data processing system, as may be found in the prior art, as follows:

The data processing system includes a host computer comprised of one or more central processing units (CPUs) 9 and a host memory 6. Host memory 6 is comprised of a main store 7, addressable by program instructions such as contained in the system control program 11 and user programs and a system store 8. The system store stores various control data and is only available to various hardware components and microcode such as the CPU microcode 12. This system store is not available to program instructions.

The data processing system also includes an input/output subsystem (IOSS) 10 which provides the communication between the CPUs 9 and a plurality of I/O devices 5. The IOSS 10 includes a plurality of channels 15 that provide the physical connection to the I/O devices 5, and a set of processes within IOSS MAIN 14. These processes include those that accept requests for I/O functions from the CPUs 9, those that execute these I/O functions, and those that select a channel 15 and dispatch I/O operations with the I/O devices 5. The I/O operations consist of sequences that perform read, write and control operations with the I/O devices 5. A read operation causes data stored on a device 5 such as a disk drive to be transferred to main store 7 and make it available for use by program instructions. A write operation causes data in main store to be transferred to a device 5 such as a printer or storage device. A control operation causes special functions to occur at the I/O device 5 such as a rewind operation for a tape drive. These processes also include those that accept ending status from the devices 5 and present the status to the CPU 9.

In accordance with the ESA/390 architecture, each I/O device is represented by a subchannel (SCH) 4. Each subchannel is assigned a unique number called a subchannel number and contains the information necessary to perform I/O functions and operations with the associated device. These subchannels are typically predefined by the customer according to the set of installed devices and their characteristics. An I/O instruction executed by the SCP 11 in a CPU 9 targets a SCH 4 using the subchannel number. The CPU microcode 12 interprets the instruction. If the I/O instruction is asynchronous, the CPU microcode 12 sets up the SCH 4, queues it on a work queue and provides initiative for the IOSS 10 to look at the work queue; Signal Work—SIGW.

Subsequently, the IOSS 10 recognizes that work is pending on its work queue, dequeues the SCH 4 from the work queue using the Dequeue Work process 13 and executes the I/O function pending in the SCH using the IOSS MAIN process 14. This may include dispatching the I/O function on a channel 15 to a device 5 to execute a sequence of I/O operations also known as a channel program stored in main store 7. When a channel program completes and the device 5 presents ending status to the channel 15, the channel provides initiative for the IOSS MAIN 14 to update the state of the subchannel and make it status pending. The SCH 4 is queued on the interruption queue using the Enqueue Interruption process 18 and an I/O interruption is signaled to the CPU 9; Signal Interruption—SIGI.

Subsequently, the I/O interruption is detected by the CPU microcode 12, accepted by the SCP 11 and the status is tested and cleared from the SCH 4.

SUMMARY OF THE INVENTION

The invention provides a new level of execution in a computer system by enabling microcode execution of I/O-related applications in the I/O subsystem (IOSS) of a computer system. The invention provides novel ways to connect the execution of the I/O-related applications to I/O events in the system to eliminate special interfaces previously required between prior applications and their initiators. These I/O-related applications are herein called "internal I/O function" (iIOF) applications existing as executable microcode in the IOSS. Previously, I/O oriented applications could only be executed by central processors (CPUs) operating under the control of host operating system (OS) software either before or after IOSS services were started or completed, but never as part of the IOSS execution.

The new level of execution for iIOF applications in the IOSS is compatible with prior IOSS operation (e.g. for executing CPU requested I/O instructions). These prior IOSS operations continue to be executed in the IOSS in the same way that they were previously executed, and they may be executed with new iIOF applications in the IOSS.

Novel ways may initiate the execution of iIOF applications in the IOSS including: interception of prior-type IOSS execution by events occurring outside the IOSS, such as in an I/O adapter or control unit connected to the IOSS such as resets and interruption conditions.

Examples of iIOF applications can include old functions such as: data compression and decompression, data cryptographing, I/O device simulation, code for testing I/O functions, etc. That is, an iIOF data compression/decompression application can execute in the IOSS for every I/O data transfer requested by any central processor (CP) system instruction to the IOSS without the software in the CP system (which generates or used the data) needing to be concerned about any interface to the iIOF data compression/decompression application.

The invention alters the IOSS to enable it to perform microcoded application functions in response to requests initiated externally of the IOSS, which may be initiated anywhere in the system, including from any processor or adapter operationally connected to the IOSS, such as in the host system, a connected I/O adapter, or in a system service element. This provides a simple interface between initiating external requests and IOSS applications which permits execution of an IOSS application without the requestor being aware of that IOSS application execution.

The executed IOSS application may perform an existing or new I/O-related function. The IOSS application is microcoded and stored in a memory only accessible to IOSS microcode. The invention may be implemented in some prior S/390 type of IOSS without requiring any additional hardware, although a small modification to the main IOSS processing is required. The results of the execution of such IOSS applications are generally transmitted to or from I/O devices (real or virtual) represented by subchannels found in the IOSS.

The IOSS applications of this invention are not accessible to a host operating system (OS) or to programs executing under the host OS. Nevertheless, an IOSS application may implicitly be executed in conjunction with a host program invoking a request to the IOSS, and such IOSS application execution may or may not be apparent to the host system. Some IOSS applications may be given higher execution priority by having special hardware connections to the IOSS, such as an IOSS application supporting a transfer of service operations to a system servicing element from an I/O entity, such as an I/O adapter (this avoids having additional servicing hardware directly connected to the I/O adapter).

An example of an IOSS application of the invention is a dual-write function, in which each I/O write request writes each record twice on different I/O disks—which are done by the IOSS transparent to initiating write requests issued to the IOSS by the host OS, although the OS may need to allocate the two sets of disk space for the dual writes. To do this, the invention provides an IOSS application that controls each OS-provided write request to perform write operations in each of the two sets of disk space.

In another example, the invention has an IOSS application respond to an OS request to transmit data to an I/O device by intercepting the transmission operation to first convert the data in each provided data record to a required transmission protocol for interfacing a particular transmission network. Also, the IOSS application responds to an OS request to receive data as each record is received to perform the function of converting each record received from the network to the protocol required by the host OS. In this case, the host OS is not involved in the detailed control of the protocol conversion process being done in the I/O subsystem, and the OS structure is reduced by not having to provide any network protocol interface or its maintenance.

Still another example of the invention is its implementation as an IOSS application which performs a data compression function and a cryptographic function for each record requested to be transmitted by a host program, and also performs a corresponding data decompression function and decryptographic function for each record requested to be received by the host program. The host OS channel program does not need to support, or even be aware of, these compression or cryptographic protocols when it is making its transmission requests, so that the OS need not be burdened by having to support such functions. In this manner, this invention can reduce the complexities and maintenance requirements for host programs, and obtain greater efficiency in the performance of those function by shifting their location and execution to the IOSS.

Another example of the invention is its implementation of an IOSS application for performing logical channel-to-channel communications between logical partitions within a single hardware computer entity. The IOSS application can perform the handshaking signal conversions for both transmission directions. Therefore, the signals are transmitted in the form expected by the remote system channel, and the local host OS receives useful signals from the remote channel. Then, the IOSS application may replace the need for channel-to-channel adapter hardware (and provide a corresponding cost reduction in the system hardware).

The Internal I/O Facility (iIO Facility or iIOF) provides capabilities in the Input/Ouput SubSystem (IOSS) so that iIOF applications can:

A. Intercept I/O functions initiated by the system control program,

B. Intercept I/O interruptions generated by the IOSS,

C. Perform their own I/O functions and

D. Generate their own status conditions.

The interface to the iIO Facility is intended to be a general purpose one, independent of the iIOF application.

Some examples of the type of functions available to the iIOF applications are:

1. Create sequences of I/O operations and dispatch a start function to execute these sequences at a real device.

2. Intercept a start function from the system control program, execute the associated sequence of I/O operations within the iIOF application and then present status back to the control program.

3. Intercept a start function from the system control program for one subchannel, dispatch one or more new start functions for different subchannels and reflect back to the control program that the original start function has been initiated.

4. Intercept an I/O interruption, change the status and then present the status to the system control program.

5. Intercept an I/O interruption for one subchannel, clear the status and then present status for a different subchannel to the system control program.

6. Dispatch a start function to a device, perhaps not defined to the IOSS, as a result of initiative from the support processor. Subsequently, intercept the status pending condition, clear the status and present the results back to the support processor.

7. To be notified of events related to a channel path that could effect ongoing operations. These events are channel resets and machine checks.

A general interface is provided to the iIO Facility which is independent of the iIOF application and therefore can support many different kinds of internal IO functions.

An Internal I/O Facility contains the following, which refers to FIG. 1:

IIOF WORK AREA: Each iIOF application has an area of host memory 6 reserved for its own use. Access to this area is controlled in order to prevent inadvertent access by the SCP or user programs. The work area may be part of main store 7 if protected or part of the system store 8 which is already protected. Each application may be assigned its own work area or multiple applications may share a work area.

IIO APPLICATION MANAGER 16: A process invoked by the IOSS when an iIOF intercept occurs either during front-end processing when the IOSS dequeues a function-pending subchannel from the work queue or during back-end processing when the IOSS causes the subchannel to be made status pending but prior to generating an I/O interruption. The iIO Application Manager passes control to the appropriate iIOF application 17 based on the iIOF Application ID field 3 in the subchannel 4.

IIO FUNCTION MANAGER 19: A process invoked by an iIOF application 17 in order to execute I/O functions, generate status conditions and execute iIOF control functions. Asynchronous I/O functions and status conditions are set up in the Queue Work 20 and Gen Status 21 processes, respectively (see below). Control functions are executed entirely within the iIO Function Manager 19.

QUEUE WORK 20: A process to provide the I/O functions that emulate asynchronous I/O instructions. It is invoked by the iIO Function Manager 19. This process sets up the target subchannel for the specified I/O function and queues the request on the work queue, if required.

GEN STATUS 21: A process to provide the emulation of a real channel to set up the subchannel for I/O functions executed by the iIOF application 17 or status generated by the iIOF application. It is called by the iIO Function Manager 19 and the iIO Application Manager 16.

FRONT-END INTERCEPTION 1: An interception indicated in a subchannel (SCH) 4 before performing the front-end processing in the IOSS.

BACK-END INTERCEPTION 2: An interception indicated in a subchannel (SCH) 4 after performing the back-end processing in the IOSS.

IIOF CONTROLS: A set of control functions are provided to allow the application to obtain information about the iIO Facility and to control how the facility is to be used. An example of a control function is the channel configuration function. This function initializes a channel path, does not make the channel path visible to the SCP, but still allows the iIOF subchannels to perform I/O functions on that channel path. These control functions are executed within the iIO Function Manager CHANNEL EVENT NOTIFICATION: Optionally the iIOF applications can be notified of channel related events that may effect ongoing operations on the channel path. This could be as a result of the SCP executing a channel resetting instruction or because of a malfunction on the channel path that results in a machine check. Both conditions are reported to the applications using the iIO Application Manager 16 and looks like an intercept.

The iIOF can cause intercepts on any defined subchannel. In addition, two additional sets of subchannels exist just for the iIOF. FIG. 2 will be referred to for describing these subchannels.

IIOF SHADOW SUBCHANNELS: One or more shadow subchannels 23 and 24 are provided that are used by the iIOF applications to perform I/O functions with devices that are defined and known to the SCP 11. Effectively they become duplicate subchannels of those subchannels 28 defined to the SCP. The shadow subchannels 23 and 24 are part of the same logical control unit as the corresponding defined subchannels 28, but are not visible to the SCP 11.

Shadow subchannels are always intercepted in the back-end, but never in the front-end. The shadow subchannels are required to prevent the SCP from observing changes within the defined subchannels when an iIOF application performs an I/O function with the associated device.

In FIG. 2, shadow subchannels 23 represent device-00 26 on behalf of the iIOF and shadow the defined subchannel with DA=00. Shadow subchannels 24 represent device-01 27 on behalf of the iIOF and shadow the defined subchannel with DA=01.

IIOF DIAGNOSTIC SUBCHANNELS: One or more diagnostic subchannels 25 are provided that are used by the iIOF applications to perform I/O functions with devices independent of whether they are defined to the IOSS 10 or SCP 11. The diagnostic subchannels are not visible to the SCP.

Diagnostic subchannels are always intercepted in the back-end, but never in the front-end. In FIG. 2, the diagnostic subchannels 25 may represent any device 29 at any given time. An iIOF application 17 may change the configuration information, such as the DA, in order to have it represent different devices. +++

FIG. 40 is a general diagram showing input/output processor (IOP) program control performed by the subject invention in an IOSS part of a computer system. Front-end control bit (F) 4002 and back-end control bit (B) 4023 are each two state entities, which have their two states represented in FIG. 40 by a two state switch (single-pole double throw switch). Each switch is shown in its "open" position.

FIG. 40 shows the process flow controlled by the invention using two state entities, and it represents a simplification of the operation invention to assist the reader's understanding of the operation of the invention. Thus, FIG. 40 is for the purpose of aiding understanding, and it does not represent an actual hardware implementation. Both switches are shown in intercept (open) positions for obtaining new operations in this invention. If these switches were shown in their other states (closed positions), conventional IOSS operation would be obtained. Thus, this invention operates in a novel manner when one or both of switches are set as shown. The short horizontal lines represent instructions in the illustrated programs, including in the prior-types of IOP programs 4003A and 4003B, and the new-types of IOP programs 4004 and 4022.

An input initiative 4001 (which may be a host CPU issued "start I/O" instruction or a "start subchannel" instruction) is provided to start execution of program(s) in the IOSS. The execution initiated is controlled by the setting of a front-end control bit (F) 4002. It is to be understood that the input initiative 4001 may be provided in a number of ways other than as an start I/O instruction, such as by any event sensed in the IOSS.

Conventional type IOP execution occurs if front-end control bit 4002, and back-end control bit 4023 do not exist (which is the same execution as occurs when switches 4002 and 4023 are in their non-illustrated closed position). Then, execution occurs for prior-type front-end IOP program 4003A, and prior-type back-end IOP program 4003B. The front-end program executes an initiative requested I/O operation (such as a start subchannel operation for starting an I/O device). In FIG. 40, the completion of execution of the front-end program causes an I/O device operation 4006. Upon completion of the I/O device operation, the back-end program 4003B is executed.

On its completion of execution of the prior-type back-end program 4003B, an ending intiative is provided by the program (such as providing status for placement on an I/O interruption queue for communication to the initiator).

Then back-end switch 4023 (in its closed position) sends the status to a status output 4027 which communicates it to the initiator that provided the input intitiative 4001. (For example, the IOSS may store the status output 4027 as interruption status in a predetermined location in a memory of a central processor send an associated interruption to the central processor.)

However if switch 4002 is in its open (intercept) state, the new front-end program 4004 is executed, instead of at least the prior-type front-end program 4003A.

However if switch 4023 is in its open (intercept) state, the new back-end program 4022 is executed.

Thus with this invention, front-end control bit 4002 intercepts the old type of operation (which would be at least the execution of prior-type of program 4003A), and instead starts execution of front-end application program 4004.

When program 4004 completes its execution, its instructions may select one of several branch operations A, B or C. Branch A controls the execution of the prior-type front-end program 4003A when execution is completed for the new front-end IOP program 4004. Alternatively, program 4004 may take branch B to start an I/O device operation 4006, and then the prior-type back-end program 4003B executes to generate a conventional type of status. Also, the execution of program 4004 may end and bypass the conventional processing of programs 4003A and 4003B by taking a branch C; in this case, program 4004 may have set up initiative to latter cause the execution of the back-end program 4003B.

With this invention, back-end control bit 4023 controls the interception of an ending initiative generated by the prior-type of back-end IOP processing 4003B, and has a choice of presenting old-type status generated by processing 4003B or of presenting new-type status generated by new processing 4022 to the initiator.

It should be understood from these explained branches A, B and C that many other variations may be selected for the exit branch from program 4004, such as doing multiple iterations through any or all of these programs.

When the execution is completed of all programs selected by the execution path taken through programs 4004 and/or 4022, the completion status may be generated by whichever program was last executing. It is important to understand that the generated status is to be presented to the "initiator" that provided, or caused, the input initiation signal 4001 (for example, the "initiator" may be an OS which issued a "start I/O" instruction).

This invention allows the execution of new front-end program 4004, and/or of new back-end program 4022, to perform almost any type of I/O operation, including deviant I/O operations unknown to the "initiator". For example, the deviant I/O operations may include operating I/O devices, or executing application functions for I/O operations, that are unknown to the "initiator" which initiated the operations. It is important that the status reported back to the initiator not indicate any devices or functions unknown to the initiator, because if known the initiator consider them to be error conditions. An acceptable status output should be reported to the initiator if all executing IOP programs operated correctly, and in a form acceptable to the initiator.

In FIG. 40, subchannels are not shown because they are not essential to the subject invention concept, even though subchannels provide an important part of a preferred embodiment described herein as a way to communicate I/O information to the IOP.

BRIEF DESCRIPTION OF THE DRAWINGS

In FIG. 1:

SIGW=Signal Work
CPU=Central Processing Unit
SIGI=Signal Interruption
IOSS=Input/Output Subsystem

FIG. 6 displays the format and contents of the internal Operation Request Block. This control block is used by the start function.

FIG. 7 displays the format and contents of the internal Interruption Response Block. This control block is used by the test and status functions.

FIG. 8 displays the format and contents of the Internal Subchannel Information Block. This control block is used by the store and modify functions.

FIG. 9 shows the fields within the internal Subchannel Information Block that are modifiable for diagnostic subchannels. Blank fields and reserved fields indicated with 0s are not modifiable.

FIG. 10 shows the fields within the internal Sub-channel Information Block that are modifiable for idle shadow subchannels. Blank fields and reserved fields indicated with 0s are not modifiable.

FIG. 12 shows the format and contents of the two operands for the reserve work area function. This includes the origin and size of the requested work area.

FIG. 13 shows the format and contents of the operand for the Read iIOF Info function. Information about the iIOF is returned to the internal application executing the function.

FIG. 18 is a map of the OSA Function Parameter Area (OFPA) that is one of the interfaces between the OSA/IA and the SP.

FIG. 19 is a map of the Additional Parameters needed for the Service Function: Alter OSA Memory. Alter can be used to update RAM and FLASH on the OSA Card.

FIG. 20 is a map of the Additional Parameters needed for the Service Function: Display OSA Memory. Display can be used to tranfer RAM and FLASH data into the Mainframe System Storage Area.

FIG. 30 is a flow diagram showing the transfer of control among the various sytem elements for handling Deconfigure Channel Path.

FIG. 33 is a flow diagram showing the transfer of control among the various sytem elements during the OSA Post Reset Initialization (PRI) Sequence.

FIG. 34 is a flow diagram showing the transfer of control among the various sytem elements during an OSA detected error.

FIG. 35 is a flow diagram showing the transfer of control among the various sytem elements during an OSA Force Log.

DETAILED DESCRIPTION OF EMBODIMENTS

The embodiment next described of the Internal I/O Facility is shown in FIGS. 1 through 13. It consists of the following for a data processing system in a CEC (central electronic complex) supporting the IBM ESA/390 architecture.

IIOF FUNCTION FLOW

Figure 1:
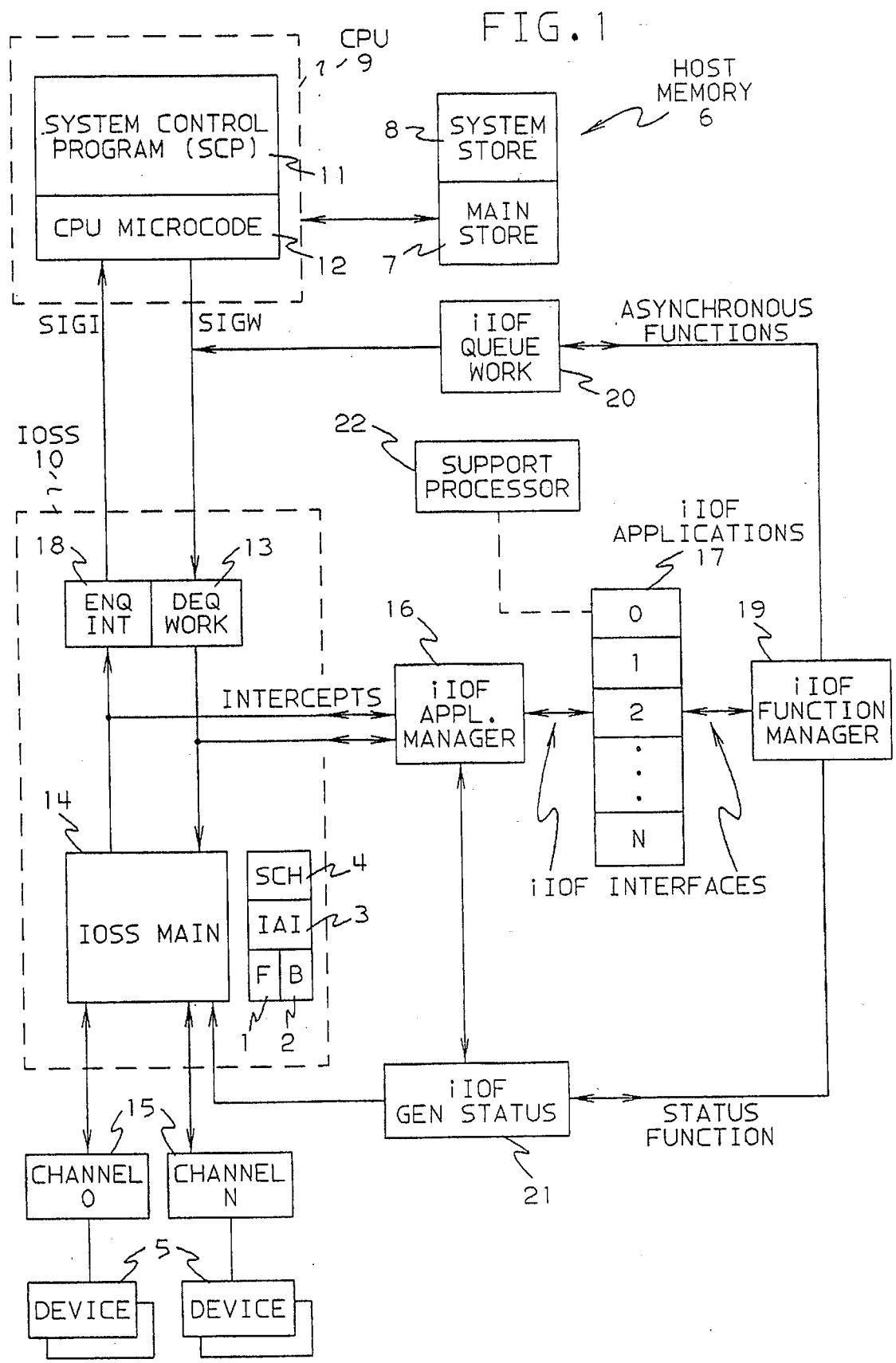
FIG. 1 is a representation of the iIOF facility showing the functional elements and flow of the facility and the relationship to the rest of the system.
Figure 2:
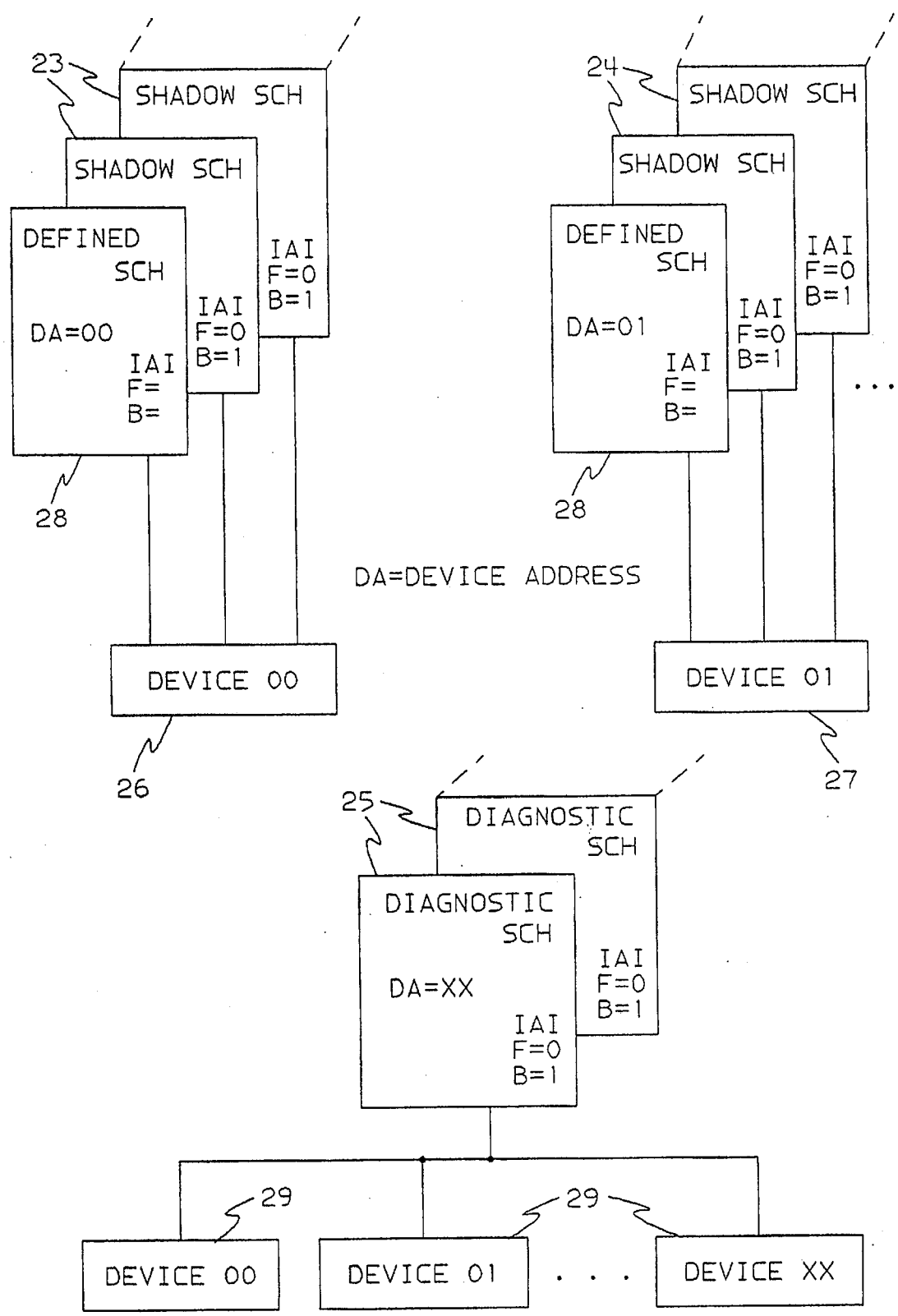
FIG. 2 depicts the iIOF subchannel structure. The shadow and diagnostic subchannels and their relationships to defined subchannels and the associated devices.

FIG. 1 is a pictorial representation of the iIO Facility and where it fits within the IOSS structure 10. The intercepts occur within the IOSS 10. In order to show where they occur, the IOSS has been portrayed in three sections. These are: the process that dequeues new work from the work queue 13, the process that enqueues status pending subchannels on the interruption queues 18 and the IOSS MAIN 14.

Within the CPU 9, the SCP 11 executes I/O instructions which are interpreted by the CPU microcode 12. For asynchronous instructions, the microcode sets up the subchannel (SCH) 4, queues it on a work queue, and provides initiative for the IOSS 10 to look at the work queue; Signal Work—SIGW. Subsequently, if the SCH is not intercepted, the IOSS 10 dequeues the SCH from the work queue using the Dequeue Work process 13 and executes the I/O function pending in the SCH using the IOSS MAIN process 14. This may include dispatching the I/O function on a channel path 15.

If the SCH is to be intercepted as indicated by the Front-End Intercept bit (F) 1 in the SCH 4, the I/O function is not executed. Instead control is passed to the iIO Application Manager 16 and in turn to the appropriate iIOF application 17 as indicated by the iIOF Application ID (IAI) 3. Both the F bit 1 and the IAI 3 are initialized by the iIOF application wishing to intercept.

When a channel program completes and the device 5 presents ending status to the channel 15, the channel provides initiative for the IOSS MAIN 14 to update the state of the SCH 4 and make it status pending. If the SCH is not intercepted the SCH is queued on an interruption queue using the Enqueue Interruption process 18 and an I/O interruption is signaled to the CPU 9; Signal Interruption—SIGI. Subsequently, the I/O interruption is detected by the CPU microcode 12, accepted by the SCP 11 and the status is cleared from the SCH 4.

If the SCH 4 is to be intercepted as indicated by the Back-End Intercept bit (B) 2 in the SCH 4, the SCH is not queued on the interruption queue. Instead control is passed to the iIO Application Manager 16 and in turn to the appropriate iIOF application 17 as indicated by the iIOF Apllication ID (IAI) 3. Both the B bit 2 and the IAI 3 are initialized by the iIOF application wishing to intercept.

The iIO Application Manager 16 determines which application to call by using the iIOF Application ID (IAI) 3 in the SCH 4. Once an iIOF application 17 is invoked, it is capable of requesting any of the functions available within the iIO Function Manager 19. via the function CALL interface. iIOF control functions are executed entirely within the iIO Function Manager. For functions that emulate asynchronous I/O instructions, the Queue Work process 20 is used. This process closely resembles the function provided by the CPU microcode 12 for I/O instructions since the iIOF interface is very much like the ESA/390 I/O architecture. For the start, resume, halt and clear functions, the SCH 4 is queued on the work queue as if an instruction had been issued by the SCP 11.

For the Status Function, the Gen Status process 21 is used. This process emulates the channel 15. The status information provided by the iIOF application 17 is stored in the SCH and initiative is provided for the IOSS MAIN 14. The status can either be initial status when called by the iIO Application Manager 16 or ending status when called by the iIO Function Manager 19.

When an iIOF application 17 has completed its task it returns to the iIO Application Manager 16 with a return code to indicate what action is to be performed with the SCH that caused the interception. If the return code indicates that the function causing the interception has been executed by the application, the Gen Status process 21 is used to set up the SCH and provide initiative for the IOSS MAIN 14.

As is shown in FIG. 1, the iIOF applications can also be invoked from the Support Processor 22 independent of the iIO Application Manager 16. In this case, the application can also request any of the iIOF functions as described above.

IIOF WORK AREAS

Each iIOF application requires a work area within main storage 7 or the system store 8 in order to build channel programs and allocate data buffers. The work areas must be accessible by the channels 15 when executing these channel programs, but should be protected from any access by the SCP 11 or user programs and their channel programs. For work areas in main store, a mechanism must exist to provide this protection. This mechanism is outside the scope of this invention. Work areas in the system store are already protected. The system store is not accessible by the user programs or the SCP. It is also not normally accessible by the channel for executing channel programs or reading and writing data unless given authority. An iIOF application may be assigned a segment of the system store for its own use. The channel is then instructed to use the authorization mechanism when executing channel programs on behalf of the iIOF application.

IIOF INTERCEPTS

Two intercepts are provided in the IOSS that causes control to be passed to an iIOF application. The first intercept occurs during front-end processing when a subchannel is function pending prior to initiating the I/O function. The second occurs during back-end processing when a subchannel is status pending prior to making the subchannel interruption pending. The intercept causes the IOSS to call the iIO Application Manager 16. The iIO Application Manager in turn calls the appropriate iIOF application 17 based on the iIOF Application ID 3 in the SCH 4.

In order to provide an interface that is as general as possible, these intercepts provide the iIOF application with the subchannel number identifying the SCH causing the intercept. Subsequently, iIOF functions are used by the iIOF application to extract information from the SCH 4.

The CALL interface from the iIO Application Manager 16 to the iIOF application 17 contains three parameters, the Function Code, the Subsystem Identification word (SID) and the Interruption Parameter. The first parameter specifies the function that is pending in the SCH 4. When a SCH has multiple functions pending, the order of precedence is clear, halt, start and resume. Where applicable, the Function Code consists of the last two digits of the ESA/390 I/O Op Code for the corresponding instruction:

FC=30 Clear Function
FC=31 Halt Function
FC=33 Start Function
FC=36 Status Function
FC=38 Resume Function The remaining two parameters are the SID, containing the subchannel number in bits 16–31, and the Interruption Parameter from the subchannel causing the interception. This corresponds to the information provided in the I/O Interruption Code during an I/O interruption as described in "ESA/390 Principles of Operation:", chapter 16.

FRONT-END INTERCEPT

A Front-end intercept occurs after a SCH is dequeued from the work queue and the SCH is function pending, but prior to initiating the I/O function in the IOSS. Pending functions that cause an intercept are start, resume, halt, and clear. SCHs that are not function pending are not intercepted.

Figure 3:
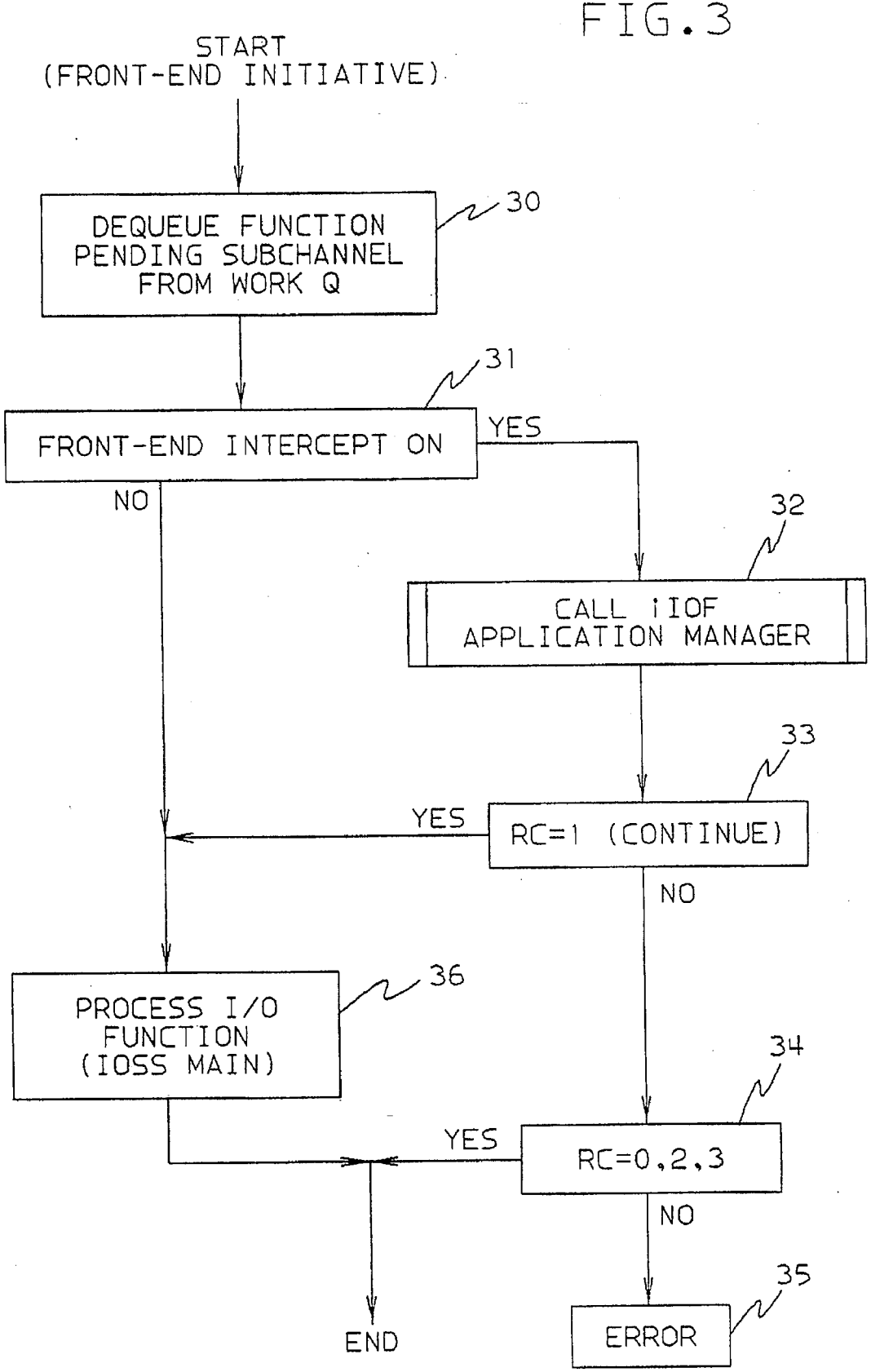
FIG. 3 shows the flow for the front-end process of the IOSS.

In FIG. 3 at 30 the IOSS 10 dequeues the function-pending SCH from the work queue. At 31 the SCH 4 is tested for the Front-End Intercept bit (F) 1. If this bit is one, the IOSS 10 calls the iIO Application Manager 16 at 32. If this bit is zero, normal processing continues at 36.

Figure 5:
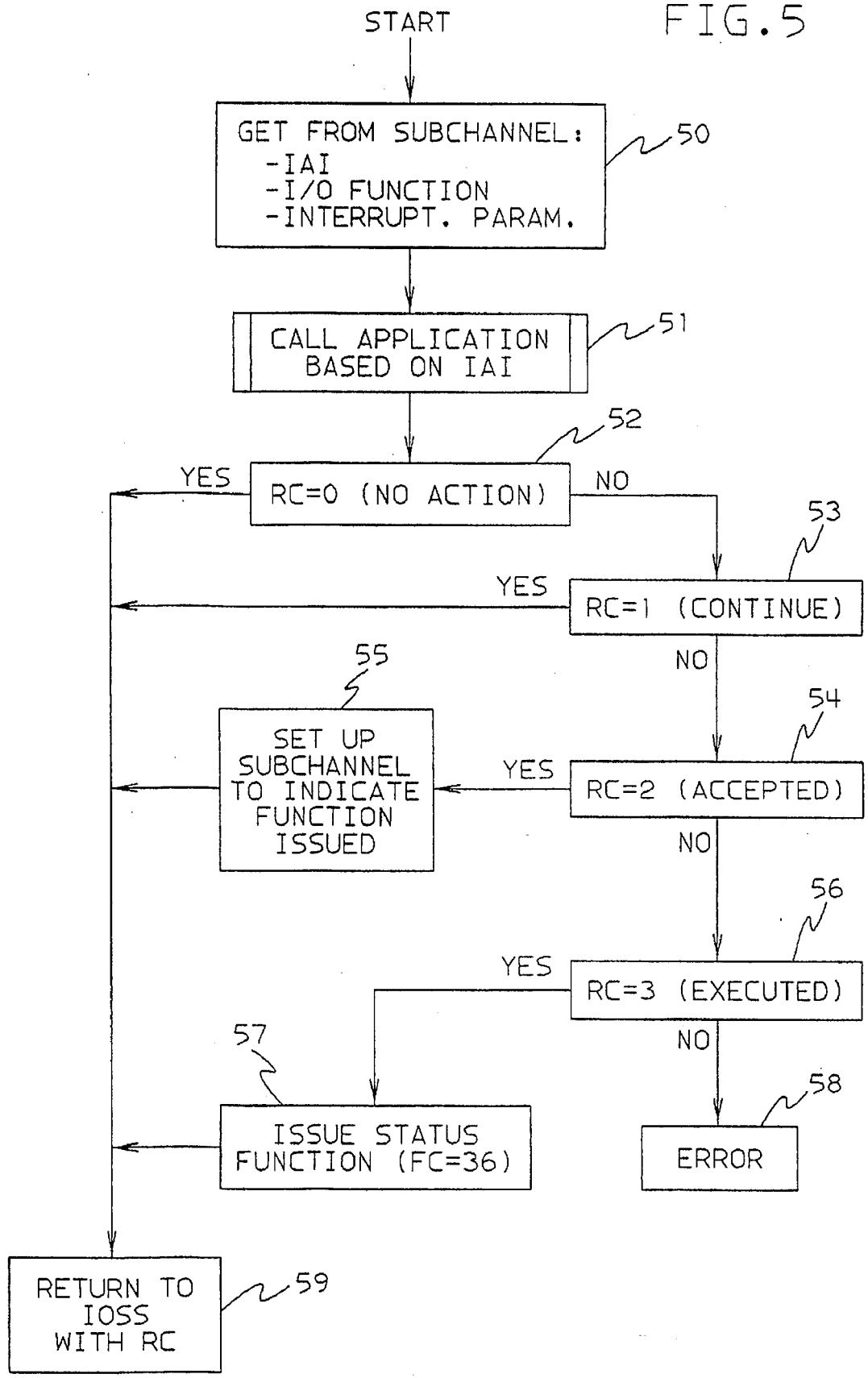
FIG. 5 shows the flow for the iIO Application Manager.

In FIG. 5 at 50 the iIO Application Manager 16 extracts the iIOF Application ID (IAI) 3, the pending function and the Interruption Parameter from the SCH 4 causing the interception. At 51, the iIOF application 17 based on the IAI 3 is called.

Subsequently, the iIOF application may extract additional information about the pending I/O function from the SCH by using the Test- or Store-Function CALL. The application now performs its intended function by using any of the defined function calls. This is outside of the scope of this invention.

The iIOF application 17 returns to the iIO Application Manager 16 with one of the following return codes:

RC=0 No-Action: In FIG. 5 at 52 the iIO Application Manager 16 tests for a return code of zero. If equal, control is passed back to the IOSS 10 along with the return code at 59. In FIG. 3 at 34 the IOSS 10 tests for a return code of 0, 2 or 3. If equal no further action on the SCH that caused the interception is performed.

RC=1 Continue: In FIG. 5 at 53 the iIO Application Manager 16 tests for a return code of one. If equal, control is passed back to the IOSS 10 along with the return code at 59. In FIG. 3 at 33 the IOSS 10 tests for a return code of 1. If equal The IOSS 10 continues normal I/O function processing at 36 as if the SCH that caused the interception is not associated with the iIO Facility.

RC=2 Function Accepted: In FIG. 5 at 54 the iioAM, 16 tests for a return code of two. If equal the iIO Application Manager 16 sets up the SCH as if a function was dispatched to a real channel at 55. Control is then passed back to the IOSS 10 along with the return code at 59. In FIG. 3 at 34 the IOSS 10 tests for a return code of 0, 2 or 3. If equal no further action on the SCH that caused the interception is performed.

For example, this return code is equivalent to the IOSS having sent a start command to a real channel, but not having received a response. This return code is required if a Status-Function CALL was executed for the SCH that caused the interception.

RC=3 Function Executed: In FIG. 5 at 56 the iioAM, 16 tests for a return code of three. If equal the iIO Application Manager 16 calls the Gen Status process 21 at 57 to set up the subchannel as if the function was performed by a real channel and if required, establish initiative for the IOSS 10 to process the result. In FIG. 3 at 34 the IOSS 10 tests for a return code of 0, 2 or 3. If equal no further action on the SCH that caused the interception is performed.

For example, this return code is equivalent to the IOSS having sent a start command to a real channel and having received a response that indicated that the first command had been accepted by the device.

If the return code is not 0, 12 or 3, an error is recognized in FIG. 5 at 58 and in FIG. 3 at 35.

BACK-END INTERCEPT

The Back-end intercept occurs after a SCH 4 is made status pending, but prior to making the SCH interruption pending. At this time all information related to the status pending condition is in the SCH. Events such as busy conditions, suspensions when the Suppress Suspended Interruption Control is one, and any other events that do not cause the SCH to be made status pending are not intercepted.

Figure 4:
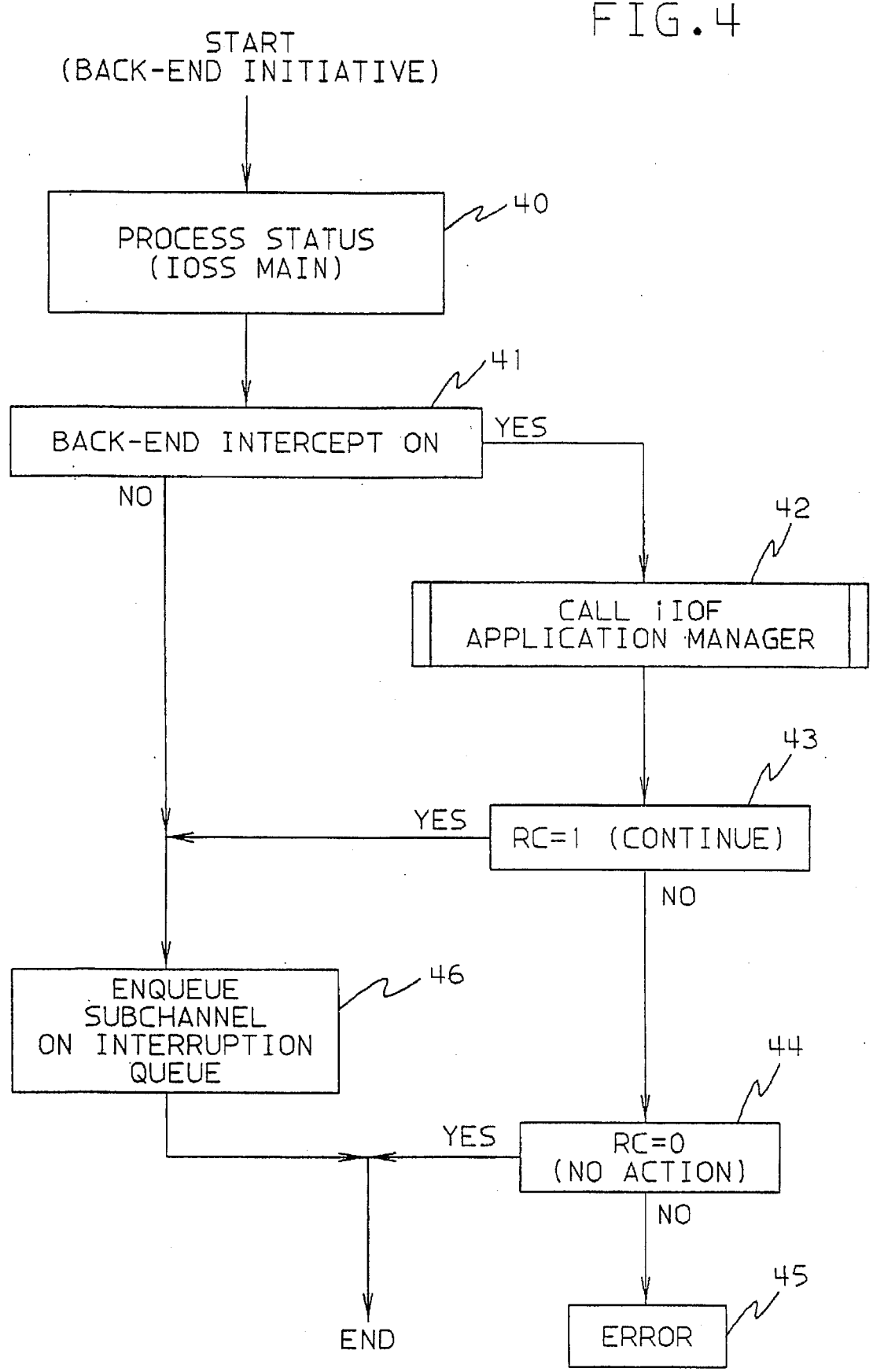
FIG. 4 shows the flow for the back-end process of the IOSS.

In FIG. 4 at 40 the IOSS 10 processes status information presented by a channel 15 or by the Gen Status process 21. Prior to enqueuing the SCH on the interruption queue, the IOSS 10 tests the SCH for the Back-end Intercept bit (B) 2 at 41, If this bit is one, the IOSS 10 calls the iIO Application Manager 16 at 42. If this bit is zero, normal processing continues at 46 by enqueuing the SCH on the interruption queue.

In FIG. 5 at 50 the iIO Application Manager 16 extracts the iIOF Application ID (IAI) 3, the pending function and the Interruption Parameter from the SCH 4 causing the interception. At 51, the application 17 based on the IAI 3 is called.

Subsequently, the iIOF application may extract additional information about the status pending condition from the SCH by using the Test- or Store- Function CALL. The Test-Function will cause the status to be cleared from the SCH. The Store-Function allows the application to look at the status without clearing it. The application now performs its intended function by using any of the defined function calls. This is outside of the scope of this invention.

The iIOF application 17 returns to the iIO Application Manager 16 with one of the following return codes:

RC=0 No-Action: In FIG. 5 at 52 the iIO Application Manager 16 tests for a return code of zero. If equal, control is passed back to the IOSS 10 along with the return code at 59. In FIG. 4 at 44 the IOSS 10 tests for a return code of 0. If equal no further action on the SCH that caused the interception is performed.

RC=1 Continue: In FIG. 5 at 53 the iIO Application Manager 16 tests for a return code of one. If equal, control is passed back to the IOSS 10 along with the return code at 59. In FIG. 4 at 43 the IOSS 10 tests for a return code of 1. If equal The IOSS 10 continues normal status processing at 46 as if the SCH that caused the interception is not associated with the iIO Facility.

If the return code is not 0 or 1, an error is recognized in FIG. 5 at 58 and in FIG. 4 at 45.

IIOF FUNCTION CALLS

The iIO Facility provides a set of function CALLs in order to start, terminate and control I/O functions within the IOSS. Most of the functions are modeled after, but not restricted to, existing ESA/390 I/O instructions. In order to provide an interface that is as general as possible, these functions have the same interface as the corresponding I/O instructions. For example, in ESA/390 architecture, the Start Subchannel instruction uses an Operation Request Block (ORB) to pass information such as the channel program address to the IOSS. Similarly, the iIOF Start-Function uses an internal ORB (iORB) to pass the same information to the IOSS. Conditions codes are also returned as if an I/O instruction was executed.

In order to use the iIOF function CALLs, an understanding of the ESA/390 I/O architecture is required as described in "ESA/390 Principles of Operation", chapters 13 through 16. This specification does not include information already provided in the referenced document. Descriptions are provided when the iIOF function differs from the corresponding I/O instruction.

The iIOF function CALLs are received by the iIO Function Manager 19 through a single CALL interface. Three parameters are passed in the CALL, the Function Code, the Subsystem Identification Word (SID) and the Operand Address. The Function Code is always required. For those functions that emulate I/O instructions, the Function Code is equal to the last two digits of the ESA/390 instruction Op Code:

FC=30 Clear-Function
FC=31 Halt-Function
FC=32 Modify-Function
FC=33 Start-Function
FC=34 Store-Function
FC=35 Test-Function
FC=36 Status-Function
FC=37 Queue-Function
FC=38 Resume-Function
FC=F1 Reserve-Work-Area
FC=F2 Release-Work-Area
FC=F3 Read iIOF Information
FC=F4 Configure Channel Path The SID is required for all iIOF functions that address a SCH. It is a full word consisting of the value '0001'x in bytes 0 and 1 and the subchannel number in bytes 2 and 3. This parameter corresponds to an implied operand in GPR 1 for the corresponding I/O instructions. When the SID is not applicable for the function, it is ignored.

The Operand Address is used for those functions that require a control block to be accessed such as the iORB for the Start-Function. The Operand Address is an absolute address which must be within the work areas reserved for iIOF applications and must be on a word boundary. Access exceptions do not occur. When the Operand Address is not applicable for the function, it is ignored.

For those functions that emulate I/O instructions, the return codes 0 through 3 are equivalent to the condition code settings for the corresponding instructions. However, not all condition codes for any given function are necessarily applicable. Additional return codes are used to indicate errors that would have caused program exceptions if an I/O instruction had been executed:

RC=4 Operand exception
RC=5 Specification exception
RC=6 Operation exception

An operand exception occurs when bits 0–15 of the SID do not contain '0001'x or when the operand designated by the Operand Address does not contain the proper format. A specification exception occurs when the Operand Address does not designate a word boundary.

An operation exception occurs when an undefined Function Code is specified.

Start-Function

The iIOF Start-Function emulates the SSCH instruction in ESA/390. The iIO Function Manager 19 checks the input parameters and if conditions allow, calls the Queue Work process 20 to set up the start function and queue the SCH 4 on an IOSS work queue. The function manager returns to the iIOF application with a return code indicating the resulting condition code. The Start-Function is only valid for iIOF diagnostic and shadow subchannels that are not visible to the system control program.

All parameters are required for the Start-Function. The Function Code is '33'x and the SID contains the target subchannel number in bits 16–31. The Operand Address specifies the location of the Operation Request Block (iORB). FIG. 6 shows the format of the iORB containing the information required for executing a channel program similar to the ORB described in ESA/390 architecture. The ORB is described in "ESA/390 Principles of Operation", chapter 15.

Required fields in the iORB are:
o Key
o CCW Format (F)
o Logical Path Mask (LPM)
o Channel Program Address (CPA)
Optional fields in the iORB are:
o Interruption Parameter
o Suspend Control (s)
o Prefetch (P)
o Initial Status Interruption Control (I)

The iIO Facility does not support the following fields in the ORB:
o Address Limit Checking Control (A).
o Suppress Suspended Interruption Control (U). By suppressing a suspended interruption, an intercept is prevented when a subchannel is suspended.

Valid return codes are:
RC=0 (CC=0) Function initiated
RC=1 (CC=1) Status pending
RC=2 (CC=2) Busy
RC=3 (CC=3) Not operational
RC=4 Operand exception
RC=5 Specification exception Resume-Function The iIOF Resume-Function emulates the RSCH instruction in ESA/390. The iIO Function Manager 19 checks the input parameters and if conditions allow, calls the Queue Work process 20 to set up the resume function and queue the SCH 4 on an IOSS work queue. The function manager returns to the iIOF application with a return code indicating the resulting condition code. The Resume-Function is only valid for iIOF diagnostic and shadow subchannels that are not visible to the system control program.

Only the Function Code and the SID are required for the Resume-Function. The Function Code is '38'x and the SID contains the target subchannel number in bits 16–31. The Operand Address is ignored.

Valid return codes are:
RC=0 (CC=0) Function initiated
RC=1 (CC=1) Status pending
RC=2 (CC=2) Function not applicable
RC=3 (CC=3) Not operational
RC=4 Operand exception Halt-Function The iIOF Halt-Function emulates the HSCH instruction in ESA/390. The iIO Function Manager 19 checks the input parameters and if conditions allow, calls the Queue Work process 20 to set up the halt function and queue the SCH 4 on an IOSS work queue. The function manager returns to the iIOF application with a return code indicating the resulting condition code. The Halt-Function is only valid for iIOF diagnostic and shadow subchannels that are not visible to the system control program.

Only the Function Code and the SID are required for the Halt-Function. The Function Code is '31'x and the SID contains the target subchannel number in bits 16–31. The Operand Address is ignored.

Valid return codes are:
RC=0 (CC=0) Function initiated
RC=1 (CC=1) Status pending with other than intermediate status.
RC=2 (CC=2) Busy
RC=3 (CC=3) Not operational
RC=4 Operand exception Clear-Function The iIOF Clear-Function emulates the CSCH instruction In ESA/390. The iIO Function Manager 19 checks the input parameters and if conditions allow, calls the Queue Work process 20 to set up the clear function and queue the SCH 4 on an IOSS work queue. The function manager returns to the iIOF application with a return code indicating the resulting condition code. The Clear-Function is only valid for iIOF diagnostic and shadow subchannels that are not visible to the system control program.

Only the Function Code and the SID are required for the Clear-Function. The Function Code is '30'x and the SID contains the target subchannel number in bits 16–31. The Operand Address is ignored.

Valid return codes are:
RC=0 (CC=0) Function initiated
RC=3 (CC=3) Not operational
RC=4 Operand exception Test-Function The iIOF Test-Function emulates the TSCH instruction in ESA/390. The iIO Function Manager 19 checks the input parameters and if conditions allow, calls the Queue Work process 20 to store control and status information and clear the status from the SCH 4. The function manager returns to the iIOF application with a return code indicating the resulting condition code. The Test-Function is only valid for iIOF diagnostic and shadow subchannels that are not visible to the system control program.

Unlike the ESA/390 IRB, there is one case when the CCW Address in the iIRB is valid even though the SCH is not status pending. The CCW address is valid when the subchannel is start or resume pending. This allows the iIOF application to determine the channel program address when an intercept occurs for a start- or resume-pending SCH. All parameters are required for the Test-Function. The Function Code is '35'x and the SID contains the target subchannel number in bits 16–31. The Operand Address specifies the location of the Interruption Response Block (iIRB). FIG. 7 shows the format of the iIRB used to store the status and control information from the SCH similar to the IRB described in ESA/390 architecture. The IRB is described in "ESA/390 Principles of Operation", chapter 16.

Valid return codes are:

RC=1 (CC=1) iIRB stored (independent of status pending)

RC=3 (CC=3) Not operational

RC=4 Operand exception

RC=5 Specification exception

Store-Function

The iIOF Store-Function emulates the STSCH instruction in ESA/390. The iIO Function Manager 19 checks the input parameters and if conditions allow, calls the Queue Work process 20 to store control and status information from the SCH 4. The state of the SCH is not changed. The function manager returns to the iIOF application with a return code indicating the resulting condition code. The Store-Function is valid for all SCHs.

All parameters are required for the Store-Function. The Function Code is '34'x and the SID contains the target subchannel number in bits 16–31. The Operand Address specifies the location of the Subchannel Information Block (iSCHIB). FIG. 8 shows the format of the iSCHIB used to store the control and status information from the subchannel similar to the SCHIB described in ESA/390 architecture. Additional information is provided in the iSCHIB unique to the iIO Facility. This is described in the iIOF Control Block section. The SCHIB is described in "ESA/390 Principles of Operation", chapter 15.

Valid return codes are:

RC=0 (CC=0) iSCHIB stored

RC=3 (CC=3) Not operational

RC=4 Operand exception

RC=5 Specification exception

Modify-Function

The iIOF Modify-Function emulates the MSCH instruction in ESA/390. The iIO Function Manager 19 checks the input parameters and if conditions allow, calls the Work Queue process 20 to place the modifiable information in the SCH 4. The function manager returns to the iIOF application with a return code indicating the resulting condition code. The Modify-Function is valid for all SCHs.

A SCH may be modified only when the iIOF Application ID (IAI) in the iSCHIB is equal to the same field (IAI) 3 in the SCH 4 or when that field in the SCH is zero.

All parameters are required for the Modify-Function.

The Function Code is '32'x and the SID contains the target subchannel number in bits 16–31. The Operand Address specifies the location of the Subchannel Information Block (iSCHIB). FIG. 8 shows the format of the iSCHIB used to provide the information to be modified in the SCH similar to the SCHIB described in ESA/390 architecture. Additional information is provided in the iSCHIB unique to the iIO Facility. This is described in the iIOF Control Block section. The SCHIB is described in "ESA/390 Principles of Operation", chapter 15.

Valid return codes are:

RC=0 (CC=0) iSCHIB information placed in SCH

RC=1 (CC=1) Status pending; iIOF information placed in SCH

RC=2 (CC=2) Busy; iIOF information placed in SCH

RC=3 (CC=3) Not operational

RC=4 Operand exception

RC=5 Specification exception

Not all fields in the iSCHIB are modifiable and the fields that are modifiable are dependent on the type of SCH and the state of the SCH. For iIOF diagnostic subchannels that are idle (no function in progress and not status pending), the fields that may be modified are indicated in FIG. 9.

For iIOF shadow subchannels that are idle (no function in progress and not status pending), the fields that may be modified are indicated in FIG. 10.

Figure 11:
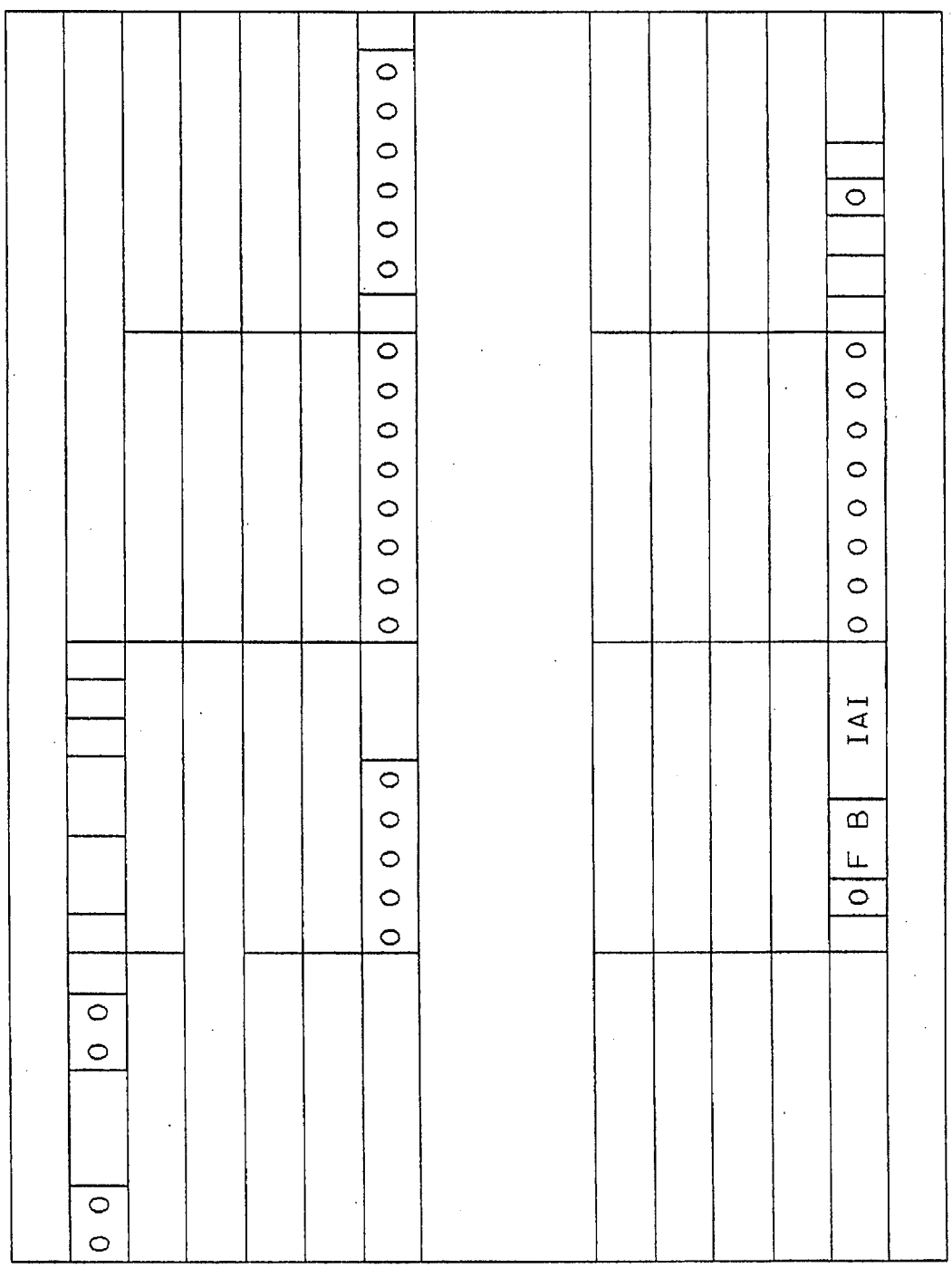
FIG. 11 shows the fields within the internal Subchannel Information Block that are modifiable for non-idle subchannels and subchannels that are visible to the SCP. Blank fields and reserved fields indicated with 0s are not modifiable.

For subchannels visible to the SCP or for diagnostic and shadow subchannels that are not idle (function in progress or status pending), only iIOF information may be modified as indicated in FIG. 11. Fields that are visible to the SCP can not be modified by the iIOF application.

Status-Function

The iIOF Status-Function causes the specified SCH to be made status pending and interruption pending to the SCP based on information provided by the iIOF application. The iIO Function Manager 19 checks the input parameters and if conditions allow, calls the Gen Status process 21 to set up the SCH 4 as if status information was presented by a real channel 15 and establishes initiative for the IOSS MAIN 14 to process the status. The function manager returns to the iIOF application with a return code indicating the results of the function. The Status-Function is valid for all subchannels.

All parameters are required for the Status-Function.

The Function Code is '36'x and the SID contains the target subchannel number in bits 16–31. The Operand Address specifies the location of the internal Interruption Response Block (iIRB). FIG. 7 shows the format of the iIRB used to set up the subchannel with status information. Word 0 of the iIRB is ignored.

Valid return codes are:

RC=0 (CC=0) Function initiated

RC=1 (CC=1) SCH already Status Pending

RC=3 (CC=3) Not operational

RC=4 Operand exception

RC=5 Specification exception

Queue-Function

The iIOF Queue-Function causes initiative to be re-established for a SCH 4 that is function pending. Previously an application might have returned from a Front-end intercept with a return code specifying No-Action. The iIO Function Manager 19 checks the input parameters and if conditions allow, queues the SCH on an IOSS work queue. The function manager returns to the iIOF application with a return code indicating the results of the function. The Queue-Function is valid for all SCHs.

Only the Function Code and the SID are required for the Queue-Function. The Function Code is '37'x and the SID contains the target subchannel number in bits 16–31. The Operand Address is ignored.

Valid return codes are:

RC=0 (CC=0) Function initiated
RC=1 (CC=1) Status Pending
RC=2 (CC=2) Function not applicable
RC=3 (CC=3) Not operational
RC=4 Operand exception Reserve-Work-Area The iIOF Reserve-Work-Area function is is used by the iIOF application to reserve a work area for its own use and to determine the work area origin and size. In addition, the application can indicate if it wants to be notified of channel events: reset functions and/or channel-path related machine checks. The iIO Function Manager 19 checks the input parameters and if conditions allow, assigns a work area to the application and provides a work area origin and size. It also saves the state of the channel event notification flags. The function manager returns to the iIOF application with a return code indicating the results of the function.

All parameters are required for the Reserve-Work-Area function. The Function Code is 'F1' and the SID is used to specify the channel notification flags and the size in bytes of the work area requested. If no work area is required, zero is specified. With a successful return code and if a size greater than 0 is requested, the Operand Address contains the location of the work area origin and size. The size may be smaller than the size requested. The formats of the SID and the operand are shown in FIG. 12.

Valid return codes are:

RC=0 Function executed

RC=3 No work area available

RC=4 Operand exception (invalid format for the SID)

Release-Work-Area

The iIOF Release-Work-Area function is used by the iIOF application to free up its work area and make it available for another application. The iIO Function Manager 19 unassigns the work area. The function manager returns to the iIOF application with a return code indicating the results of the function. Only the Function Code is required for the Release-Work-Area function. The Function Code is 'F2'. The SID and the Operand Address are ignored.

Valid return codes are:

RC=0 Function executed

Read iIOF Info

The Read iIOF Information function provides the iIOF application with information about the iIO Facility. This information is required for setting up the SCHs reserved for iIOF use.

Only the Function Code and the Operand Address are required for the Read iIOF Info function. The Function Code is 'F3' and the Operand Address specifies the location of where the information is to be stored. The SID is ignored. The format of the operand is shown in FIG. 13.

Valid return codes are:

RC=0 Function executed

RC=4 Operand Exception

RC=5 Specification Exception

Configure Channel Path

The Configure Channel Path function is used to put the target channel 15 in a state where it is not visible to the SCP 11, but can be used by iIOF applications that require exclusive use of the channel path. Whenever any of the iIOF diagnostic subchannels are used to commuicate with real devices, the channel path(s) must be in this state. Prior to using this function, the channel must be placed in the Standby (Offline) state using conventional manual means. The execution of this function causes the channel 15 to be configured back online from a hardware and IOSS 10 point of view. However, the channel will still appear as physically unavailable to the SCP. All the corresponding PAM bits in all the defined SCHs that have access to the channel will remain set to zero.

Architecturally, the channel will be placed in the Reserved State to prevent the channel from being configured back online to the SCP.

Only the Function Code and the SID are required for the Configure Channel Path function. The Function Code is 'F4'x and the SID contains the CHPID in bits 24–31 instead of the subchannel number. The Operand Address is ignored.

Valid return codes are:

RC=0 Function executed

RC=4 Operand Exception

RC=7 Channel path not in Standby

Unsupported Functions o I/O functions initiated by instructions that do not address subchannels and synchronous instructions are not provided by the iIO Facility.

o A mix of data streaming and D.C. interlock on the same channel when using the iIOF diagnostic subchannels is not supported. If required, the protocol for all devices on the channel path could be indicated at the time the channel is configured for diagnostic use.

o Address limit checking is incompatible with zone relocation and is therefor not supported for iIOF diagnostic and shadow subchannels.

o I/O interruption subclasses are not applicable to the iIO Facility and are therefor not supported for iIOF diagnostic and shadow subchannels.

o A suspended interruption cannot be suppressed for iIOF diagnostic and shadow subchannels since that will prevent an interception from occurring.

CHANNEL EVENT NOTIFICATION

There are certain events in the IOSS that may cause normal I/O operations to be effected on channel paths that are being used by the iIOF applications. If an application requires knowledge about these events, it may request that it be informed each time one of these events occurs. The request is made at the time the application reserves a work area for itself (see "Reserve-Work-Area"). These events consist of the reset function and channel-path related machine checks.

They are intended to be informational only.

When a channel event occurs, it is treated just like an intercept. The iIO Application Manager is called by the IOSS which in turn calls all applications that have requested notification for the particular type of event. The application is called regardless of the CHPID for which the event occurred. It is up to the application to determine if the event will effect its internal controls or what recovery action is required.

For the reset function, the intercept occurs after condition code zero is set. In ESA/390, this means that the intercept occurs after the CPU can complete the reset instruction, but prior to initiating the reset function. For the machine check function, the intercept occurs during the generation of the machine check, but prior to presenting it to the SCP.

The function CALL interface from the iIO Application Manager to the iIOF application for the iIOF intercepts is also used for the notification of channel events. The Function codes are defined as follows:

FC=39 Machine Check
FC=3B Reset Function

For both the reset and the machine check functions, the SID contains the CHPID in bits 24–31 instead of the subchannel number. For the machine check function, the Interruption Parameter contains the Error Recovery Code (ERC) in bits 26–31. The ERC is defined in in "ESA/390 Principles of Operation", chapter 17.

Only one return code is permitted when the iIOF application returns to the iIO Application Manager:

RC=1 Continue: The IOSS continues normal processing of the reset function or the machine check.

IIOF CONTROL BLOCKS

The iIOF control blocks are internal versions of the same control blocks defined in ESA/390 I/O architecture. They are used by the iIOF function CALLs. Definitions for the fields already described in "ESA/390 Principles of Operation" are not repeated here. Fields that are defined for the iIO Facility are described below. Many fields such as CCW Address, Key, Sub-channel and Device Status and Count are obvious.

The iORB and the iIRB are almost exact copies of the architected versions. The only difference is that some of the architected fields are not applicable to the iIO Facility. The iSCHIB is larger than the architected version to give the iIOF applications greater control over the subchannels.

The following definitions refer to the iSCHIBf in FIG. 8.

WORD 10

BIT 00–07 LINK ADDRESS-0. If not '00'x or 'FF'x, this field contains the link address assigned to the control unit attached to path 0. The link address is valid for all channel types, but has no meaning for parallel channels. For ESCON Converter channels, the link address has meaning only when the channel is attached to a switch. If the Link Address field is zero, a link address has not been assigned to the control unit.

BIT 08–15 CONTROL UNIT ADDRESS-0. Bits 04–07 of this field contains the 4-bit logical address for the control unit image attached to path 0. This field is used only for ESCON channels. Bits 00–03 of this field are reserved.

BIT 16–23 LINK ADDRESS-1. Link Address for path 1.

BIT 24–31 CONTROL UNIT ADDRESS-1. Control Unit Address for path 1.

WORD 11

Link Addresses and Control Unit Addresses for paths 2 and 3.

WORD 12

Link Addresses and Control Unit Addresses for paths 4 and 5.

WORD 13

Link Addresses and Control Unit Addresses for paths 6 and 7.

WORD 14

BIT 00–07 DEVICE ADDRESS. The identity of the device on the channel path.

BIT 08 ESCON (S). When one, this bit indicates that the device represented by this sub-channel is attached to an ESCON channel path or paths. When zero, this bit indicates that the device is attached to a parallel channel path or paths.

BIT 09 RESERVED.

BIT 10 FRONT-END INTERCEPTION. When one, this bit indicates that function-pending subchannels are to be intercepted for the iIO Facility. The interception occurs after the subchannel is dequeued from the work queue, but prior to executing the function.

BIT 11 BACK-END INTERCEPTION. When one, this bit indicates that status-pending subchannels are to be intercepted for the iIO Facility. The interception occurs after the subchannel is made status pending, but prior to making it interruption pending.

BIT 12–15 IIOF APPLICATION ID (IAI). When this field is not zero, it identifies the iIOF application currently assigned to this subchannel. When an intercept occurs, this ID determines which iIOF is called by the iIO Application Manager. When this field is zero, it indicates that the subchannel is available for new iIOF applications. A subchannel may be modified only when the IAI field in the iSCHIB is equal to the IAI field in the subchannel or when the IAI field in the subchannel is zero.

BIT 16–23 RESERVED.

BIT 24 ENABLE STATUS VERIFICATION (V). When on, the Status Verification Facility is enabled for this subchannel and status combinations presented by the device are checked for validity. If the status is not valid, an IFCC is generated.

BIT 25 INTERFACE TIMEOUT (T). When off, all I/O sequences other than data transfer sequences are timed out in 7.5 to 8 seconds. Data transfer sequences are not timed out. When on, data transfer sequences are also timed out in 30 seconds. This bit is only used for the parallel channel.

BIT 26 ENABLED FOR STATUS (E). When on, this bit indicates that the subchannel is enabled for the presentation of status. When zero, status is stacked.

NOTE: This bit is normally equal to the architected enable bit that controls the enablement of both I/O functions and status. A separate control is provided for iIOF.

BIT 27 RESERVED.

BIT 28 PREFERRED PATH VALID (P). When on, this bit indicates that the Preferred Path value in the sub-channel is valid and that the path selection rotation for a new start function should always start with the preferred path. If this bit is off then a preferred path has not been specified and the path selection rotation starts with the next path.

BIT 29–31 PREFERRED PATH (PREFP). When the Preferred Path Valid (P) bit is set to one, this field specifies the path to be attempted first in the path selection rotation for a new start function.

WORD 15 LOGICAL CONTROL UNIT ADDRESS. The absolute address of the control block representing the logical control unit associated with this subchannel. This field is required for setting up shadow subchannels.

SETUP

A setup procedure must be performed for all iIOF applications. Independent of the iIO Facility, each application must receive control in order to allocate work areas and reserve subchannels. A work area and sub-channels are reserved by executing iIOF functions. Each application is assigned a unique 4-bit ID that is used to reserve iIOF subchannels.

A typical scenario is described in the following steps:

1. Execute the Reserve-Work-Area Function CALL to get a work area assigned to the application.

2. Execute the Read iIOF Info function CALL to obtain information about the facility.

3. If the application requires shadow subchannels, execute successive Store-Function CALLs until a iSCHIB is stored that has the iIOF Application ID equal to zero. The Store-Function CALLs specify subchannel numbers provided by the Read iIOF Info function.

4. In the iSCHIB, change the iIOF Application ID field to the application's own ID.

5. Reserve the shadow subchannel by executing the Modify-Function CALL. The subchannel now contains the applications ID.

6. If required, a similar procedure is used to reserve diagnostic subchannels.

When an application is shut down it should release all subchannels previously reserved by using the Modify-Function CALL and release the assigned work area by executing the Release-Work-Area function CALL.

The next detailed embodiment described herein is shown in FIGS. 14 through 39.

Figure 14:
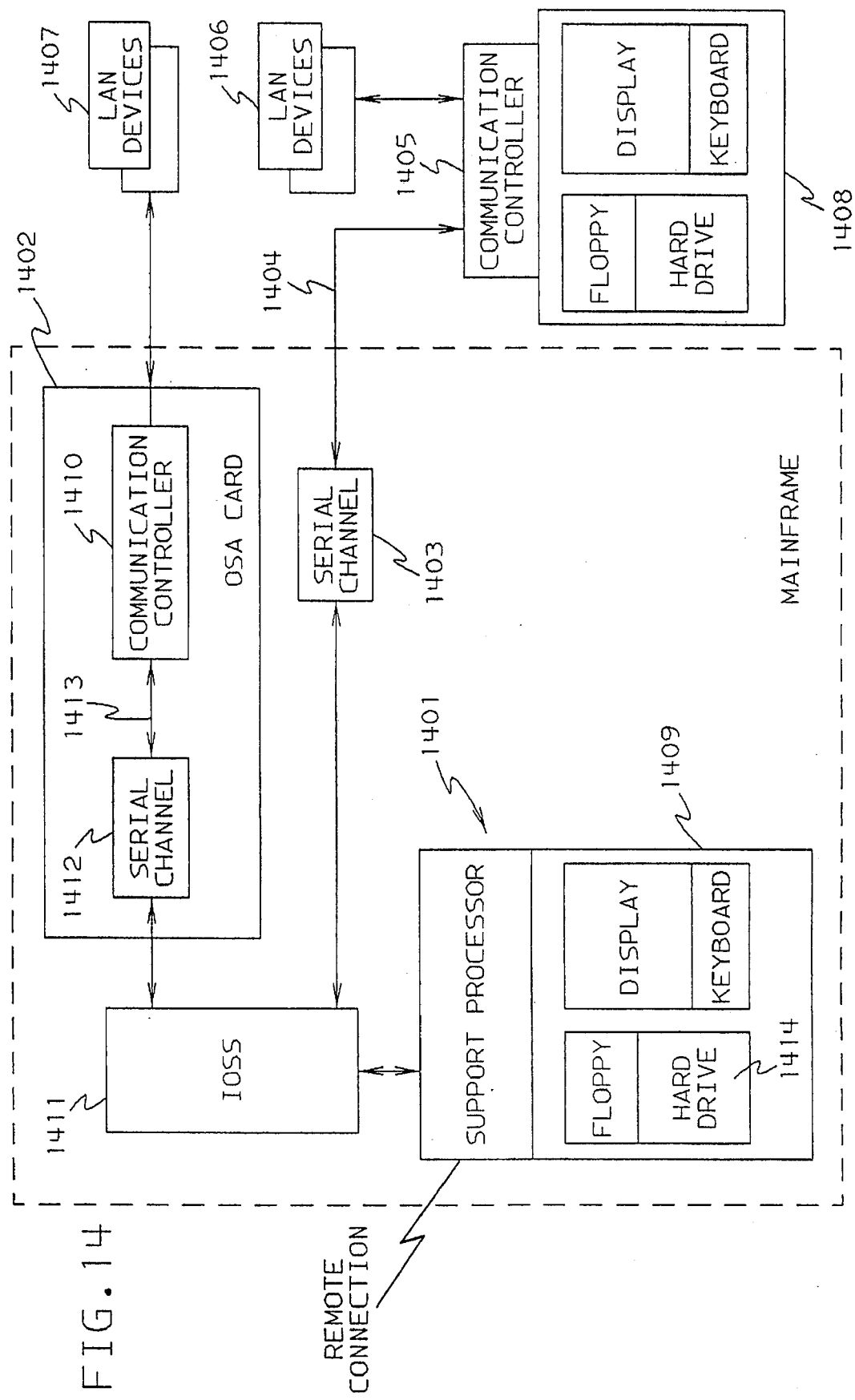
FIG. 14 shows the major functional elements of a Mainframe with a Serial Channel connected over a fiber to a Communications Controller contrasted to an OSA Card connected directly to a LAN.

FIG. 14 shows a Mainframe with its Support Processor (SP) at 1401, an OSA Card at 1402 and a Serial Channel at 1403. The OSA Card is essentially an integrated Serial Channel at 1412 connected to a Communication Controller at 1410 over an internal electronic serial link at 1413. Attached to the Serial Channel over a Fiber Cable at 1404 is a Communication Controller at 1405. This prior art Communication Controller has a Keyboard, Display, Hard Drive and Floppy Disk attached as shown in at 1408. These peripherals are used in the initialization of the communication controller, performing updates to the internal microcode that runs the controller as well as for storing error data for the purpose of debugging controller problems. In addition, these peripherals can be used to view various statistics with regards to the attached LAN at 1406. In short, these peripherals are there to provide serviceability of the controller.

Figure 15:
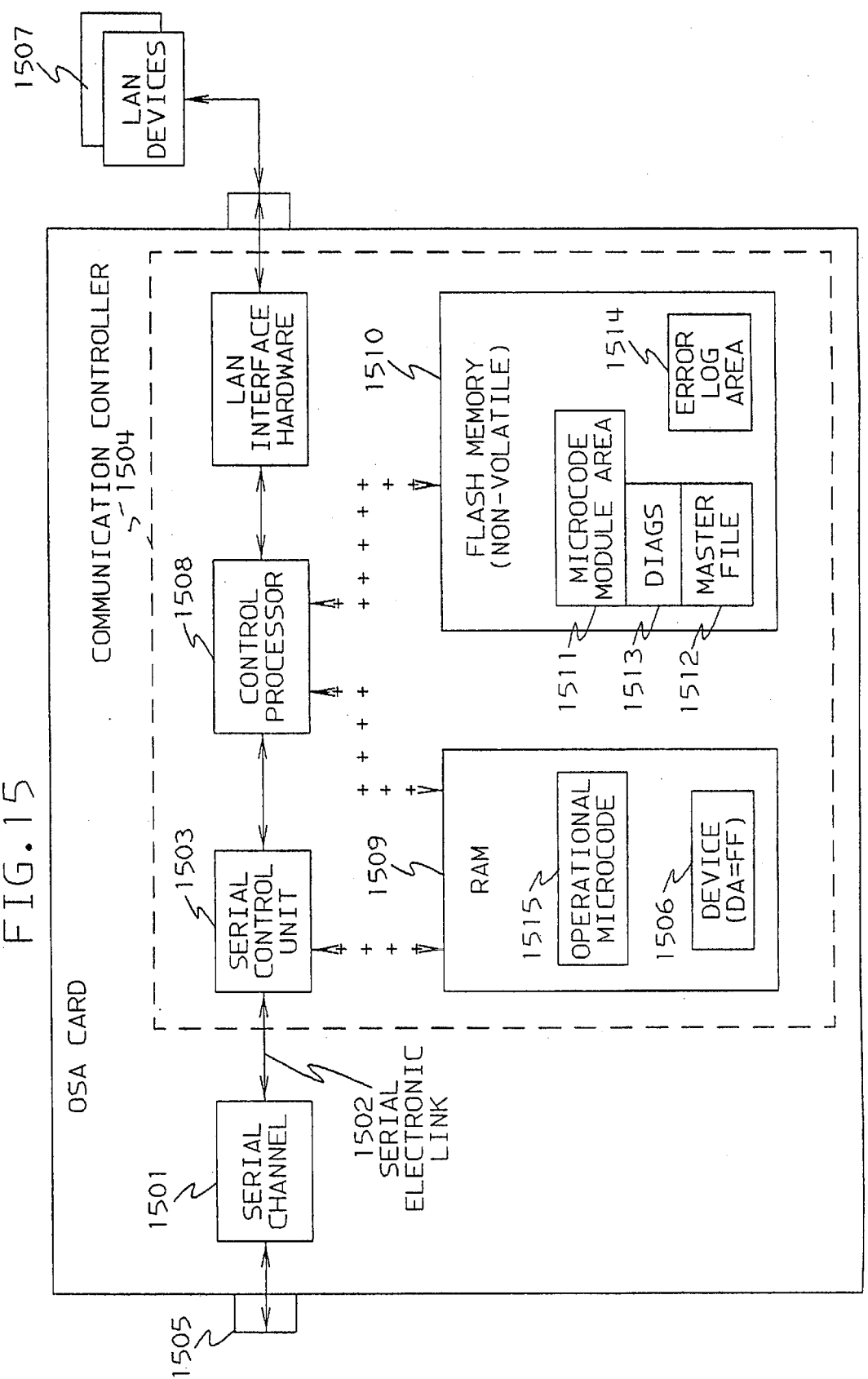
FIG. 15 shows the major functional elements on the OSA Card: Serial Channel, Control Unit, Serial link, Flash Memory, RAM, OSA Service Device and other components.

Also in FIG. 14 is the OSA Card at 1402 attached to a LAN at 1407. The OSA Card is an integrated Serial Channel and Communications Controller as shown in FIG. 15 attached directly to the Mainframe. However, the noticeable difference is the lack of a keyboard, display, hard drive and floppy. Thus, the question that comes to mind is how do you provide serviceability to the OSA without the Keyboard, Hard Drive, Display and Floppy?

FIG. 15 shows the functional elements and structure of OSA Card. Shown at 1501 is a Serial Channel connected across a Serial Electronic Link at 1502 to a Serial Control Unit at 1503. Note that the Serial link shown at 1502 is not a glass fiber, but rather electronic glue logic that emulates the Serial Link in electronics. This link is the only way the Mainframe can communicate with the Communication Controller portion of the card. Thus, if one were to attempt to provide serviceability to the OSA Communication Controller at 1504 through the mainframe connection shown at 1505, the only way to do so without making significant hardware changes to the OSA card is through the Serial Channel shown at 1501 and through the Serial Electronic Link shown at 1502. However, in order to do so, that same Serial Electronic Link at 1502 that is used for transferring data must also be shared with transferring the kinds of serviceability requests that are described above for the Communication Controller at 1405. This invention describes a method and system for achieving the goal of being able to provide serviceability to controllers, control units or other adapters from a mainframe through the standard channel I/O interface. This idea of providing serviceability over the Serial Link is extendable to be used with other adaptors connected to hosts that are typically attached over some medium such as an Serial fiber link.

The Support Processor keyboard, hard drive, display and floppy shown at 1409 will now be able to be used to support the OSA communication controller shown at 1410 to perform an equivalent role that the keyboard, display, hard drive and floppy shown at 1408 has for Communication Controller shown at 1405. However, the mainframe attached support devices at 1409 have the advantage in that only 1 set of support devices is needed to provide support for a multitude of OSA Cards attached to the I/O Sub System (IOSS) shown at 1411. (Only one OSA Card is shown in the FIG. 14.) The mechanism and system for accomplishing the goal of providing serviceability over a standard I/O interface is described in the subsequent paragraphs.

In order for serviceability requests to be transmitted by the standard protocols for communicating over a Channel, Electronic Link and Control Unit as described in ESA/390 Priciples of Operation, ESA/390 Common I/O Device Commands and ESA/390 ESCON I/O Interface, an emulated device shown at 1506 called the OSA Service Device was created. In this embodiment, the OSA Service Device is assigned with Device Address of 'FF'X. However, the selection of Device Address is arbitrary. To the Serial Channel shown at 1501 and to the Serial Control Unit shown at 1503, the OSA Service Device is a device that is the same as any other device shown at 1507 in terms of the protocols that must be observed when communicating across the Serial link.

The basic difference between the OSA Service Device shown at 1506 and the devices shown at 1507 is the OSA Service Device is a command and control emulated device in RAM whereas the devices shown at 1507 represent real devices on a Local Area Network (LAN). For both the LAN devices and the OSA Service Device, Channel Command Words (CCW) in Channel Programs executing in the mainframe are used to be able to communicate with these devices. Channel Programs and CCWs are described in ESA/390 Priciples of Operation and ESA/390 Common I/O Device Commands. However, the OSA Service Device has additional Channel Command Words (CCW) and Subcommands that are interpreted by the Control Processor shown at 1508. These special CCWs and Subcommands have been added to the existing set described in ESA/390 Priciples of Operation and ESA/390 Common I/O Device Commands and they do not affect the Serial Channel and Serial Control Unit protocols. The OSA Service Device is under control of microcode running in the Control Processor shown at 1508. When Read or Write CCWs are executed on the OSA Service Device, transfer of data occurs either from RAM or FLASH rather from a device on the LAN. For example, the "Alter OSA Storage" Subcommand and its associated CCWs causes data to be transferred from mainframe storage, through the mainframe connection at 1505, through the Serial channel, over the Serial Link, through the Serial control unit into RAM or FLASH at 1509 or 1510.

Figure 16:
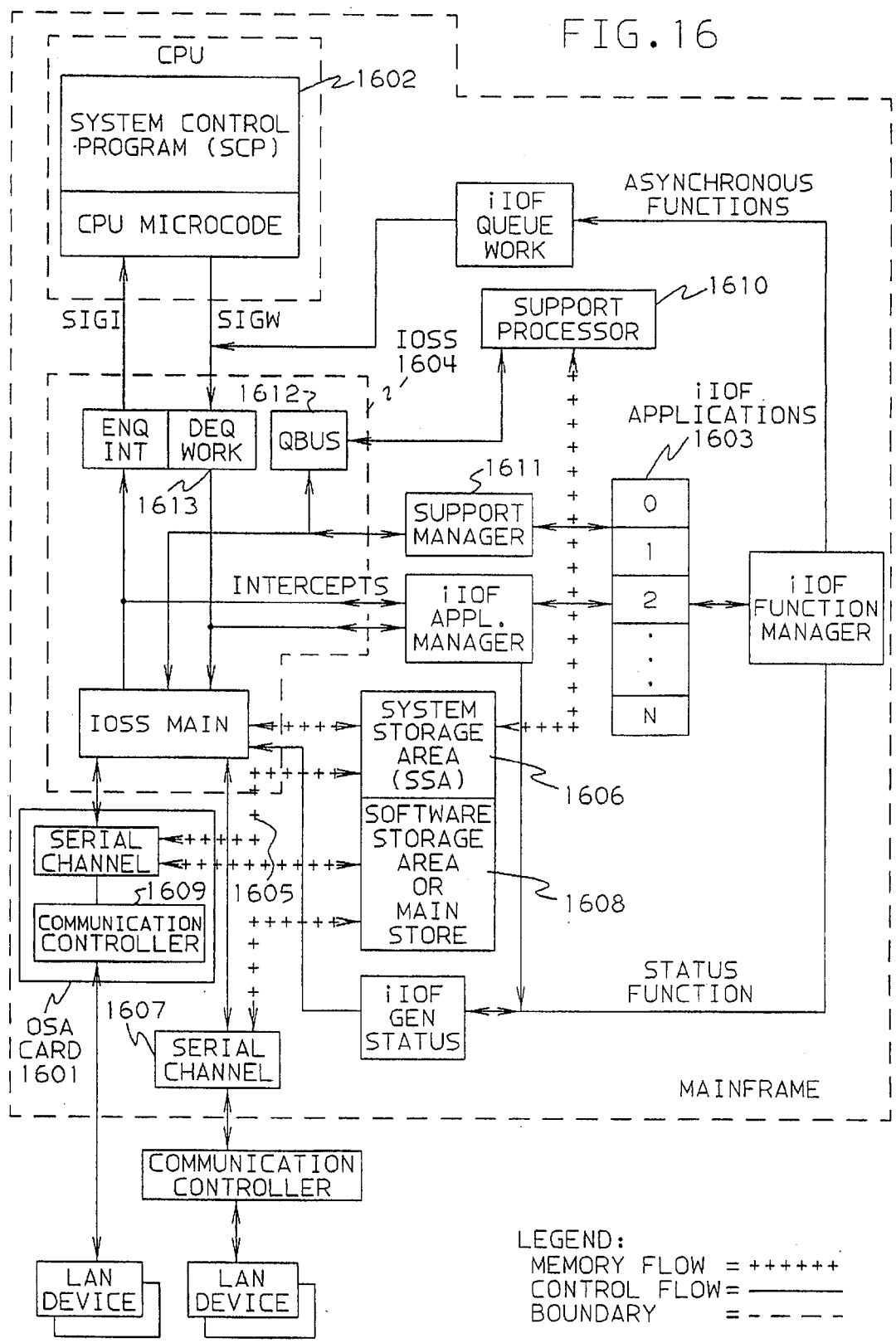
FIG. 16 is a representation of the iIOF showing the functional elements and flow of the facility. In addition, more detail with regards to the Support Processor (SP) interface has been shown. The OSA card, memory flows and Support Manager have also been added.

To use this OSA Service Device to communicate serviceability requests to and from the OSA Card in FIG. 16 at 1601 without having host programs running in the CPU shown at 1602 having access to OSA Service Devices, an iIOF application called the OSA internal Application (OSA/IA) shown at 1603 was developed to have exclusive use of the OSA Service Devices. The OSA/IA uses Diagnostic Subchannels as previously described as the means to communicate with the OSA Service Devices. One Diagnostic Subchannel is assigned to each OSA Channel.

One per OSA Channel is needed because if multiple OSA cards are plugged into the IOSS at 1604, the OSA/IA must be able to keep track of service requests from each of the OSA channels in a concurrent manner.

In this embodiment, a Device Address (or Unit Address, as it is referred to in the ESA/390 IOCP Users Guide) of "FF"X is used for the OSA Service Subchannel. Diagnostic Subchannels will be assigned as OSA Service Subchannels which are hidden from Software running on the host because the device valid bit is set-off in the diagnostic subchannels. To ensure exclusive use of OSA Service Devices for the OSA/IA and not allow Software running on the host the capability of accessing the OSA Service Devices, a new requirement is placed on the IOCP program or equivalent to not allow the user to specify a device on OSA channels with a Device Address equal to "FF"X.

Figure 38:
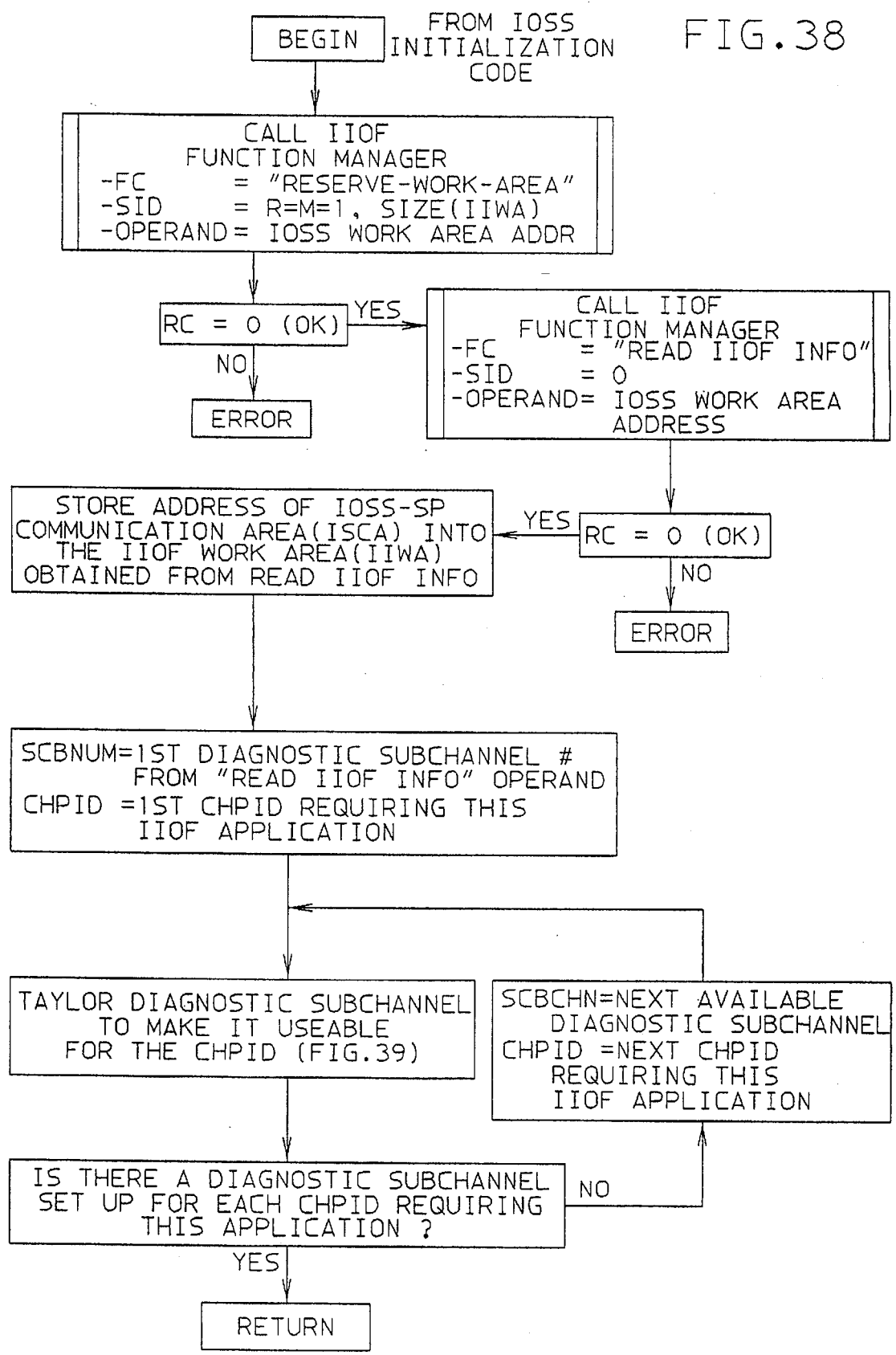
FIG. 38 is a flow chart showing basic initialization of the OSA/IA required when the Mainframe is initialized.
Figure 39:
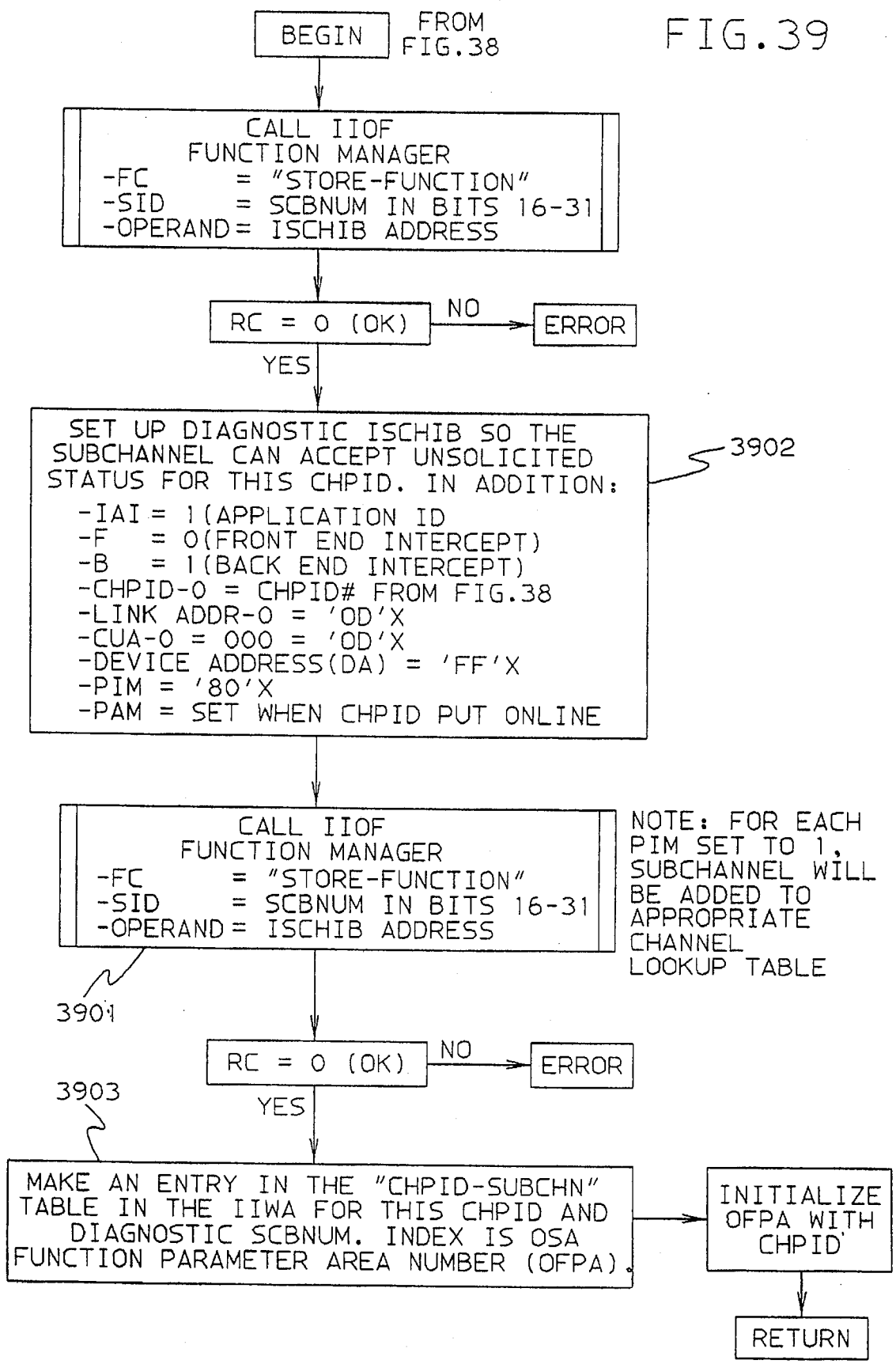
FIG. 39 is a flow chart showing basic initialization of a Diagnostic subchannel as it applies to the OSA/IA.
Figure 40:
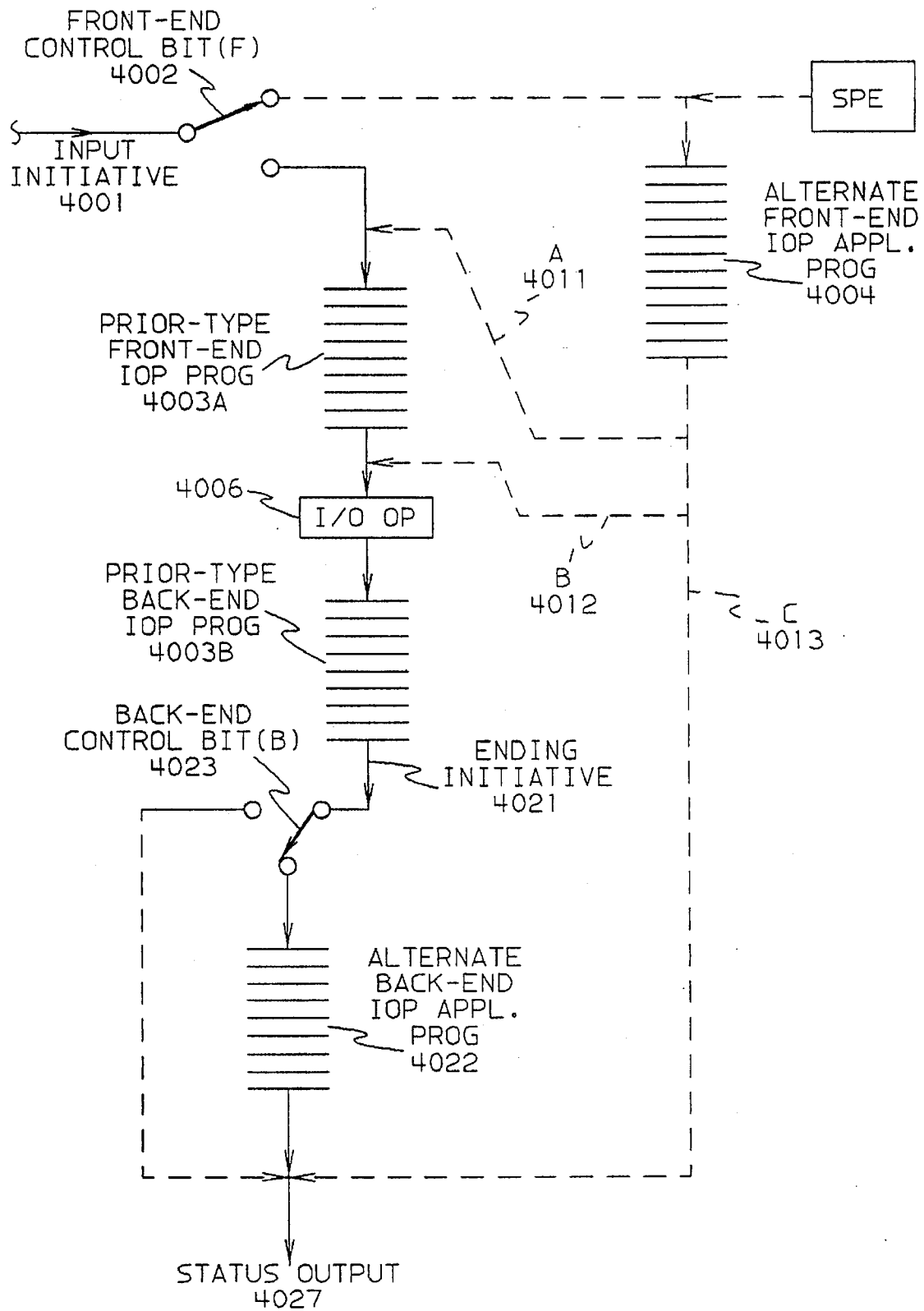
FIG. 40 is an execution flow diagram showning a simplified representation of controls for selecting the flow of execution in the IOSS when using the invention.

FIG. 38 and FIG. 39 show how the OSA Service Subchannels are initialized at system initialization time using iIOF Function calls. In FIG. 38, a Diagnostic Subchannel used as an OSA Service Subchannel is assigned to each OSA Card. This is the basis for providing serviceability to different OSA Cards concurrently. At 3902, each Diagnostic Subchannel that is used for the OSA/IA will have the B bit=1 to cause the iIOF to intercept it on the Back End and the IAI set to Application 1. The F bit will be set to 0 since Front End interception is not needed for this application. When Diagnostic Subchannels are stored at 3901, the Modify-Function microcode will enable a System Storage Area (SSA) Authority control in the internal SSA subchannel that will allow Channel Programs to be executed from SSA for the OSA Service Subchannel. This is important because the iIOF work areas in FIG. 17 at 1704 which are in the SSA will be used to build channel programs. FIG. 16 at 1605 shows the additional data path for CCW execution and data transfer that is obtained by enabling the SSA authority mechanism. When the SSA Authority control is disabled for the subchannel, CCW processing can only occur from Main Storage at 1608 for I/O Subchannels as shown for the Serial Channel at 1607 as well as for the I/O Subchannels for the OSA Serial Channel at 1609.

Figure 17:
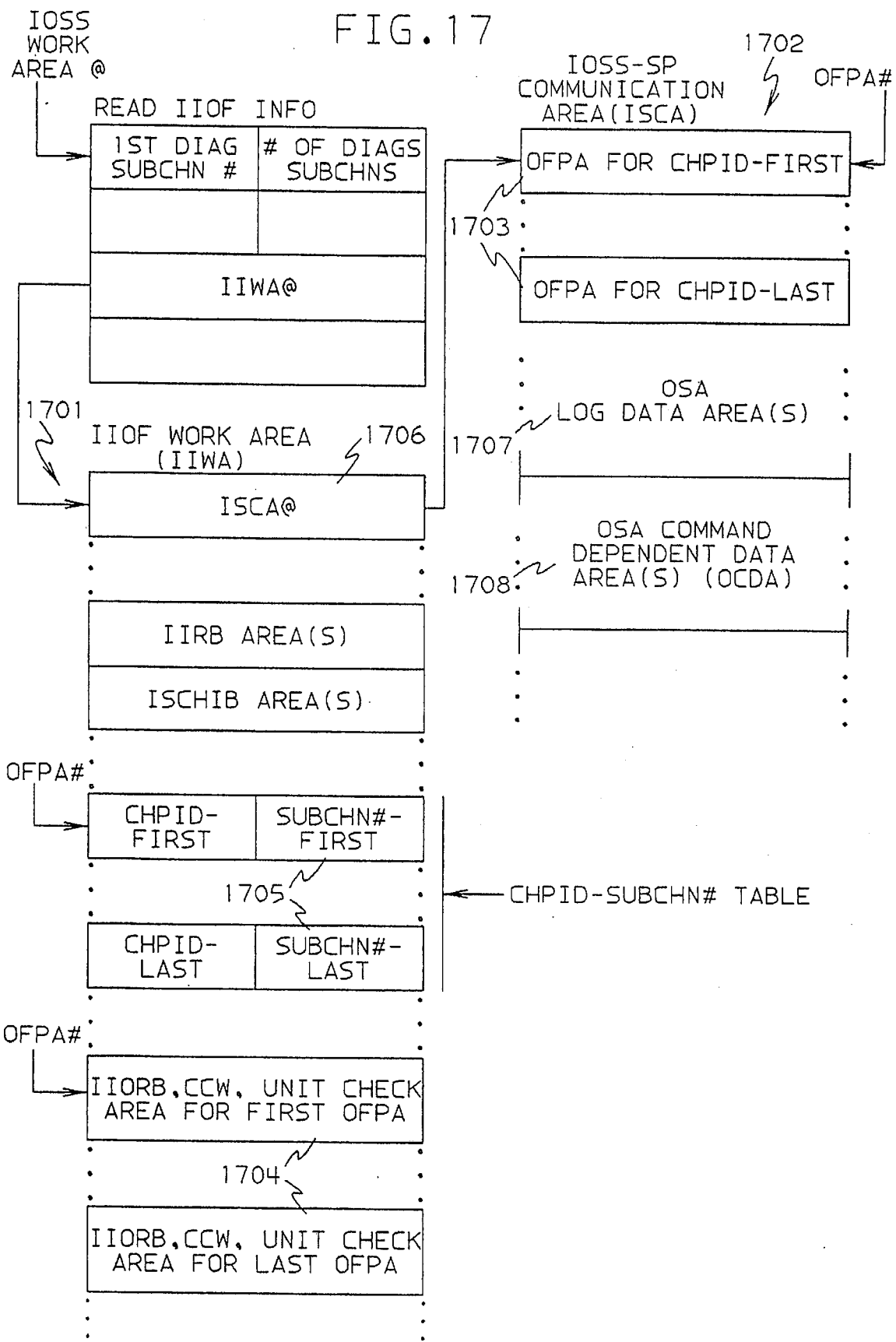
FIG. 17 shows memory areas in System Storage needed to support the OSA internal Application (OSA/IA) embodiment.

In addition, the iIOF Work Areas (IIWA) at 1701 and IOSS-SP Communication Area (ISCA) at 1702 are also set up. Note that SPE 1610 in FIG. 16 has access to system storage 1606. FIG. 17 shows the layout of some areas located in the SSA at 1606 necessary for OSA/IA processing. The IIWA (iIOF Work Area) is set up to handle OSA/IA Service Subchannel activity for multiple OSA Service Subchannels. In addition, multiple OSA Function Parameter Areas (OFPA) at 1703, one for each Channel Path (or CHPID) that requires a Diagnostic Subchannel, are setup so the Support Processor at 1610 can initiate Service Requests to multiple channels without waiting for each Service Request to complete. Note that the OFPA at 1703, the Work Area at 1704 and the CHPID-Subchannel Table at 1705 are indexed by OFPA # thereby linking them to each other. At 3903, the CHPID-Subchannel table is built to provide a fast way to associate CHPID to OSA Service Subchannel. (the SP will use the CHPID number, not the Subchannel number in the OFPA when initiating service requests to the OSA/IA.) The ISCA@ is passed to the setup code in FIG. 38 and FIG. 39 at initialization time and saved at 1706 because it is needed by OSA/IA to find where the OFPA is located. Also in the OFPA are OSA Logging areas at 1707 which will be used as a holding area to dump error logs from the card to SP DASD (or hard drive) for analysis. At 1708 is a data drop off area which is used for the Alter and Display OSA Memory Service Functions, for example.

FIG. 18 shows the format of each OSA Function Parameter Area (OFPA). The SP should set up the Function ID at 1801, Status at 1802 and Additional Parameters at 1803 depending on the Function ID as indicated in FIG. 18. The Additional Parameters for the various functions are described in FIG. 19 thru FIG. 21. Note that other embodiments could have a larger suite of Function IDs and Additional Parameters. The suite of Function IDs and Additional Parameters shown in this embodiment, are minimally required to load new microcode on to the adapter and get the card operational.

Each non-zero Function ID listed in FIG. 18, except for the "Reset OSA" function at 1804, will cause the OSA/IA to build and initiate Channel Programs to perform the function. The Reset OSA function works a little differently. The Reset OSA function will cause OSA/IA to signal the Channel identified by the CHPID in the OFPA at 1805 to drop outbound "electronic" light on the Serial Link. A small hardware change in the "electronic link" or glue logic in FIG. 15 at 1502 was made to signal the components in the OSA communication controller at 1504 to reset when light is dropped. The OSA card will reset when the Channel at 1501 turns off outbound light to the Control Unit at 1503 on the electronic link at 1502. This mechanism was needed because should the Control Unit at 1503 or the Control Processor at 1504 hang, for example, the drop light reset would be as effective as pushing a reset button. In System/390 processors, the dropping of light on a Serial Link is the prior art practice in normal system operations such as when a channel is physically deconfigured as shown in FIG. 30 and will be discussed later.

Figures 21, 24:
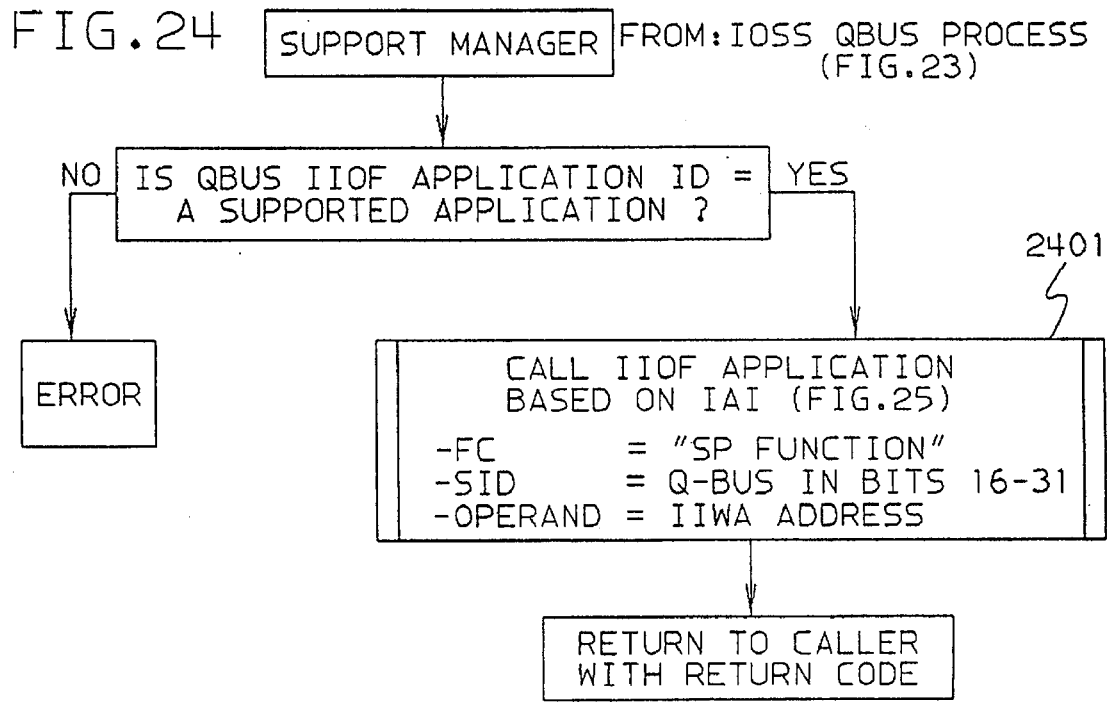
FIG. 21 is a map of the Additional Parameters needed for the Service Function: Set Port Enable/Disable. This function allows for communication to either occur (enable) or stop (disable) on an OSA port.
FIG. 24 is a flow chart showing the Support Manager call to a Support Processor application.
Figure 22:
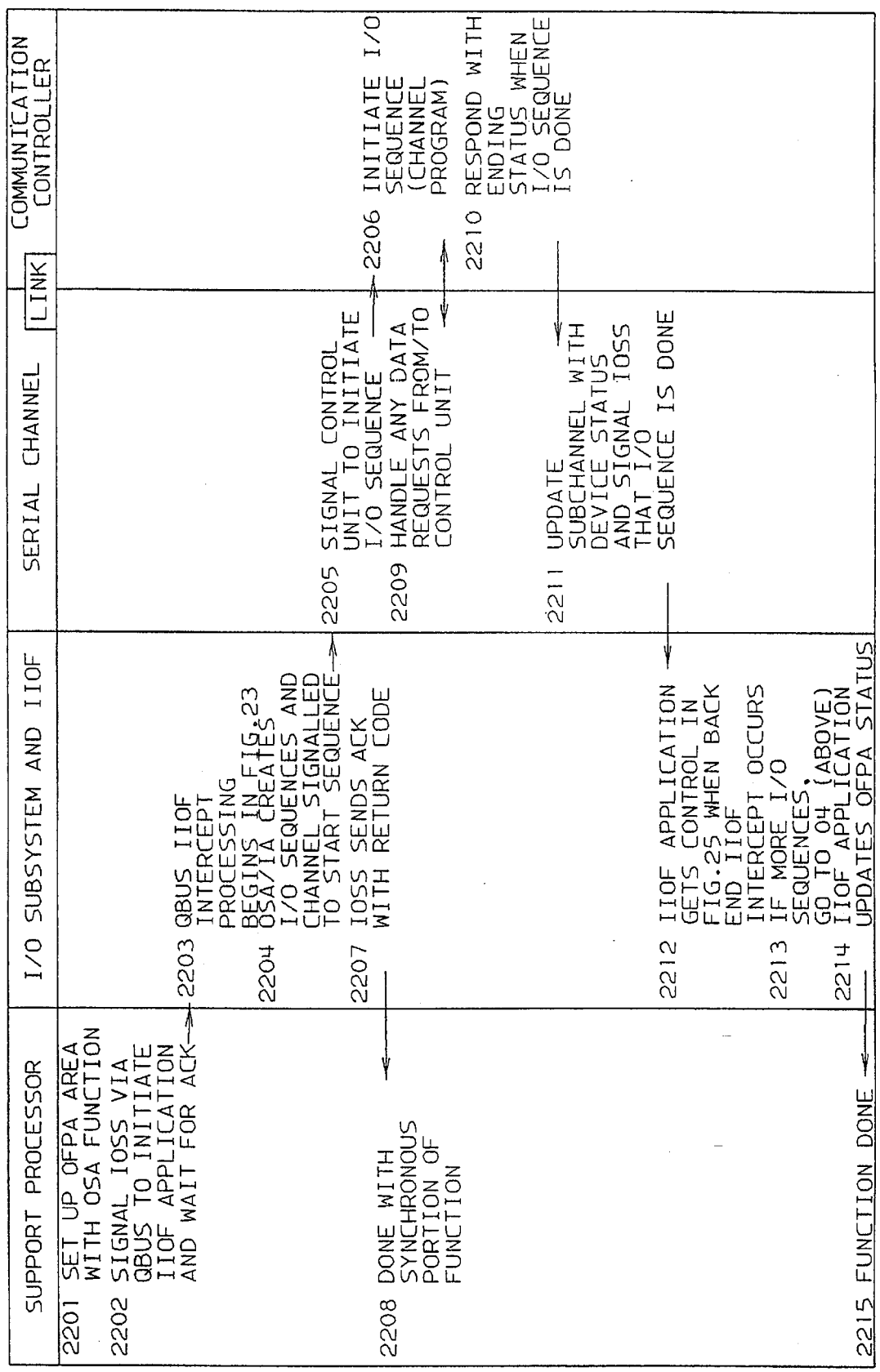
FIG. 22 is a flow diagram showing the transfer of control among the various sytem elements for handling a Support Processor initiated OSA Service Function request.

FIG. 22 shows the transfer of control among the system elements to handle Support Processor initiated OSA Service Function requests. At 2201, the SP must first set up the OFPA and if need be, the OCDA in FIG. 17 for the channel path or paths with the Function(s) needing to be performed. With the basic functions described in FIG. 18 thru FIG. 21, most tasks can be accomplished. If the SP wanted to perform an update to the microcode in the flash area in FIG. 15 at 1511, the SP in FIG. 14 at 1401 would load the OCDA at 1708 with microcode stored on SP Hard Disk or DASD at 1414. Then the SP could set up one or more OFPAs with the "Alter OSA Memory" Function and Additional Parameters shown in FIG. 18 and FIG. 19. The SP would then signal the IOSS by writing the Q-Bus register at 2202. The description follows.

Figure 23:
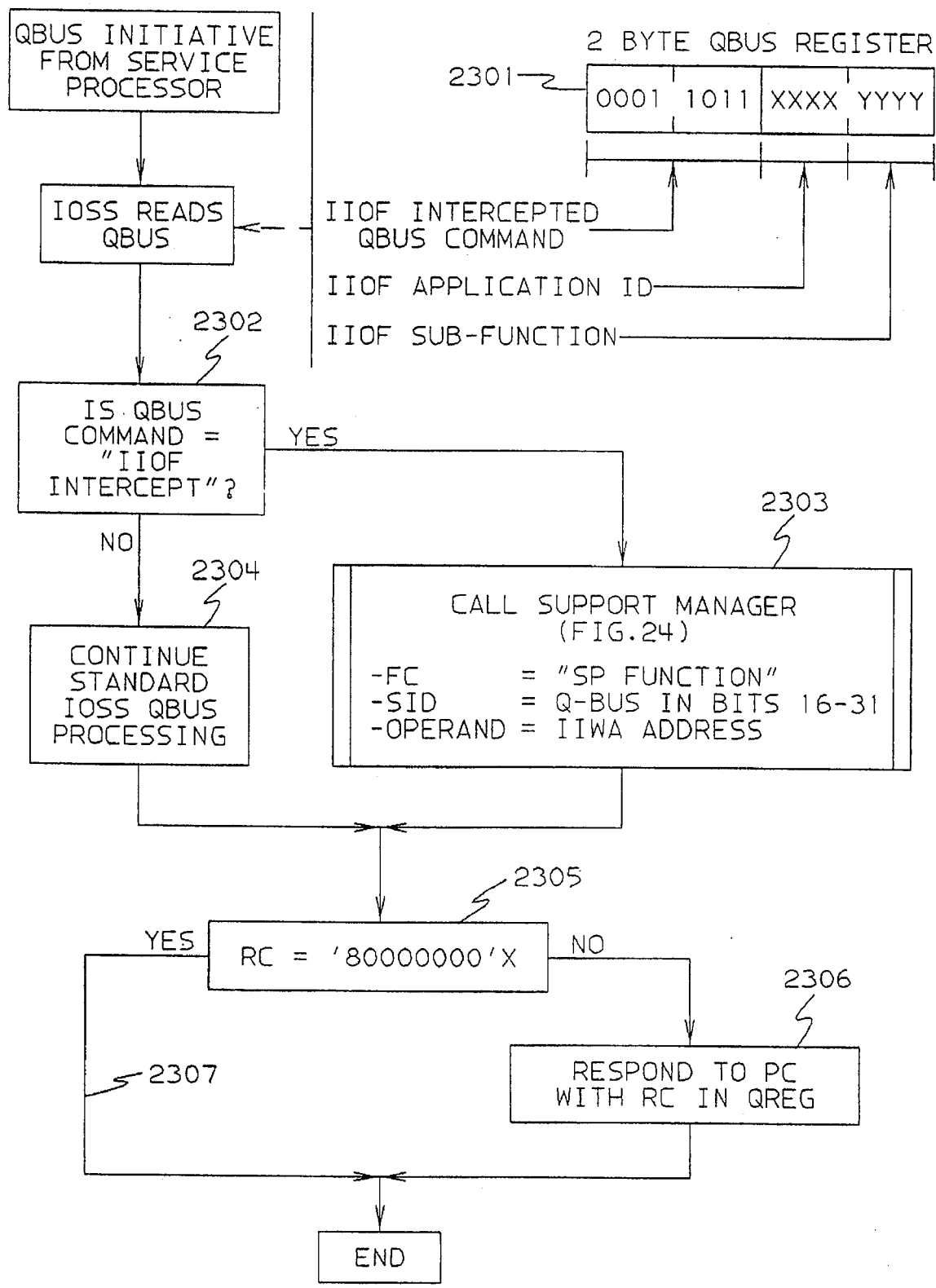
FIG. 23 is a flow chart showing the processing needed in the IOSS to invoke the Support Manager.

At 2203, control now passes to the IOSS and Q-bus intercept processing begins in FIG. 23. At 2301 is a description of the Q-bus fields. The Q-bus is a prior art signalling mechanism between the Service Processor and the IOSS and is a 2 byte register containing a Command (First Byte) and Qualifiers (Second Byte). "1B"X is the arbitrarily chosen Q-Bus iIOF intercept value that would cause the test at 2302 to take the YES leg and invoke the Support Manager at 2303. Non-Q-Bus iIOF Commands would take the NO leg at 2304 to continue normal Q-Bus command processing. The Q-bus iIOF Application ID is passed at 2301 as well as an iIOF Sub-Function value that can further granularize the type of request. Since the Diagnostic Subchannels were set up with IAI=1 at 3902, the Q-bus iIOF Application ID should be set to 1 by the SP to cause the OSA/IA to be called. The Q-bus Sub-Function at 2301 of "4"X indicates an SP initiated function requiring a Start-Function to be issued by the OSA/IA. These constructs in FIG. 23 were added to the iIOF in FIG. 16 at 1611 and 1612 because in this embodiment, the Service Processor microcode runs in its own processor, but it has access to the Q-bus at 1612 and SSA at 1606.

At 2305, a test is made to determine if the return code from the Support Manager should be passed back to the SP at 2306. The Q-bus is a bidirectional bus which can also be used by the IOSS to signal the SP about he completion status of the operation. When the Q-bus is written at 2306, the SP will be freed up from the Synchronous portion of the Service Function. The SP can then go off and perform other processing. A Q-bus return code value at 2305 other than zero will indicate to the SP that the OSA/IA did not successfully initiate the Requested Service Function and the SP can take recovery actions if needed. A zero Q-bus return code at 2306 will indicate to the SP that the Requested Service Function has been initiated and the SP will later be signalled when the Asynchronous completion of the Service Request has been performed. The SP will be signalled when the Asynchronous portion of the Service Function is completed when the OFPA Status in FIG. 18 is updated to a value greater than or equal to 02 as indicated at 1806. If the YES leg is taken at 2307, the SP will continue to wait for completion of the Synchronous portion of the command and is used mainly for other IOSS q-bus commands.

At 2303, the Support Manager will be called. In FIG. 24, the Support Manager, like the iIOF Application Manager, will call the application based on IAI as shown at 2401. When the Application is called with an IAI=1, the OSA Support Function Process (OSA/SFP) at 2501 in FIG. 25 will get control based on the sub-function=4. The additional Sub-Function values of 5 and 6 are supported at 2502 and 2503 to give the Service Processor additional capability.

The OSA Generic Function Process (OSA/GFP) at 2502 is used when a user wants to enter in a channel program as a handloop for test and debug purposes. The OSA/GFP will set the iORB to point to CCWs that have been entered into the SSA by the SP. Then the OSA/GFP will initiate a Start-Function. The SP console is used to enter the CCWs into SSA and invoke the OSA/GFP. OSA/GFP will get control when a Sub-Function of 5 is passed in the Q-bus at 2502.

The OSA/Cancel Function Process (OSA/CFP) at 2502 provides the SP with a means to issue a Clear-Function to terminate an in-progress channel program should the SP timeout on a previously initiated function using the OSA/SFP or OSA/GFP. The OSA/Cancel Function Processor is invoked in similar way as the OSA/SFP. When the OSA/CFP is signaled by the SP, it will issue a Clear-Function on the Diagnostic subchannel for the selected Channel Path. The OSA/CFP will report the results in a manor similar to the OSA/SFP. OSA/CFP will get control when a Sub-Function of 6 is passed in the Q-bus at 2503.

Figure 26:
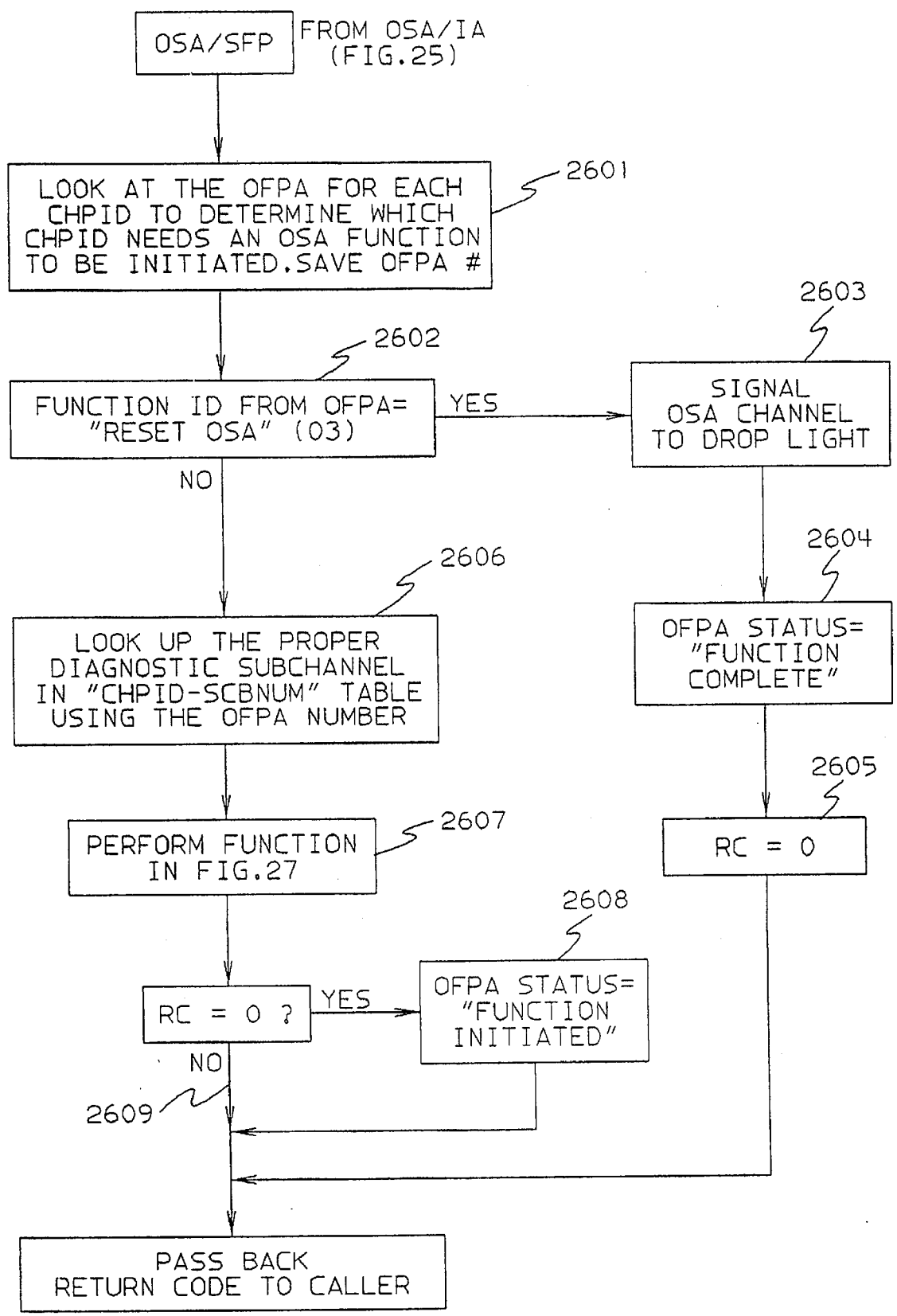
FIG. 26 is a flow chart showing the OSA Service Function Process (OSA/SFP). A request from the Support Processor (SP) will get processed here.

FIG. 26 shows the processing steps that the OSA/SFP will perform. OSA/SFP must first determine which OFPA in FIG. 17 has a function pending in it. At 2601, the first OFPA with a non-zero Function ID and a zero Status byte as shown in FIG. 18 will be selected. At 2602, it is determined if a Reset OSA Function is requested. If so, the OSA Channel (or CHPID) is signalled to drop light at 2603. When the Channel is successfully signalled, the OFPA Status is updated to say the "Function Completed" (02) at 2604 as described in FIG. 18 at 1806. This status is set because the OSA Reset Function has no Channel Program to run and the completion of the reset is handled by the IOSS MAIN as will be seen in later drawings. A return code of 0 will be passed back to the SP at 2605 to free the SP from the Synchronous portion of the command as well.

Once the SP has been given a response to the Synchronous portion of the Service Function when the IOSS writes the Q-Bus Response in FIG. 23 at 2306, the SP can initiate another Service Function for a different OSA card. It can do this by setting up the OFPA, if it hadn't already done so, for the CHPID that the SP wants the new Service Function to be performed on, then invoke the Q-Bus as described above. Since the OFPA of the already started Service Function has been updated as described above, the FIG. 26 processing will cause the OFPA of the already initiated Service Function not to be selected and OFPA of an uninitiated Service Request to be selected.

If the function is other than an OSA Reset, processing will proceed at 2606. The Chpid-Subchannel Lookup Table in FIG. 17 will be used to determine which OSA Service Subchannel for the particular Chpid will be used to perform the Service Function. At 2607, an attempt will be made to initiate the service function. If initiation was successful, the OFPA Status will be updated as "Function Initiated (01)" at 2608. The SP will then be signalled later on when the Asynchonous portion of the Service Function has completed. Otherwise, the NO leg at 2609, will end up passing back a Non-Zero return code resulting in the SP detecting the operation wasn't initiated.

Figure 27:
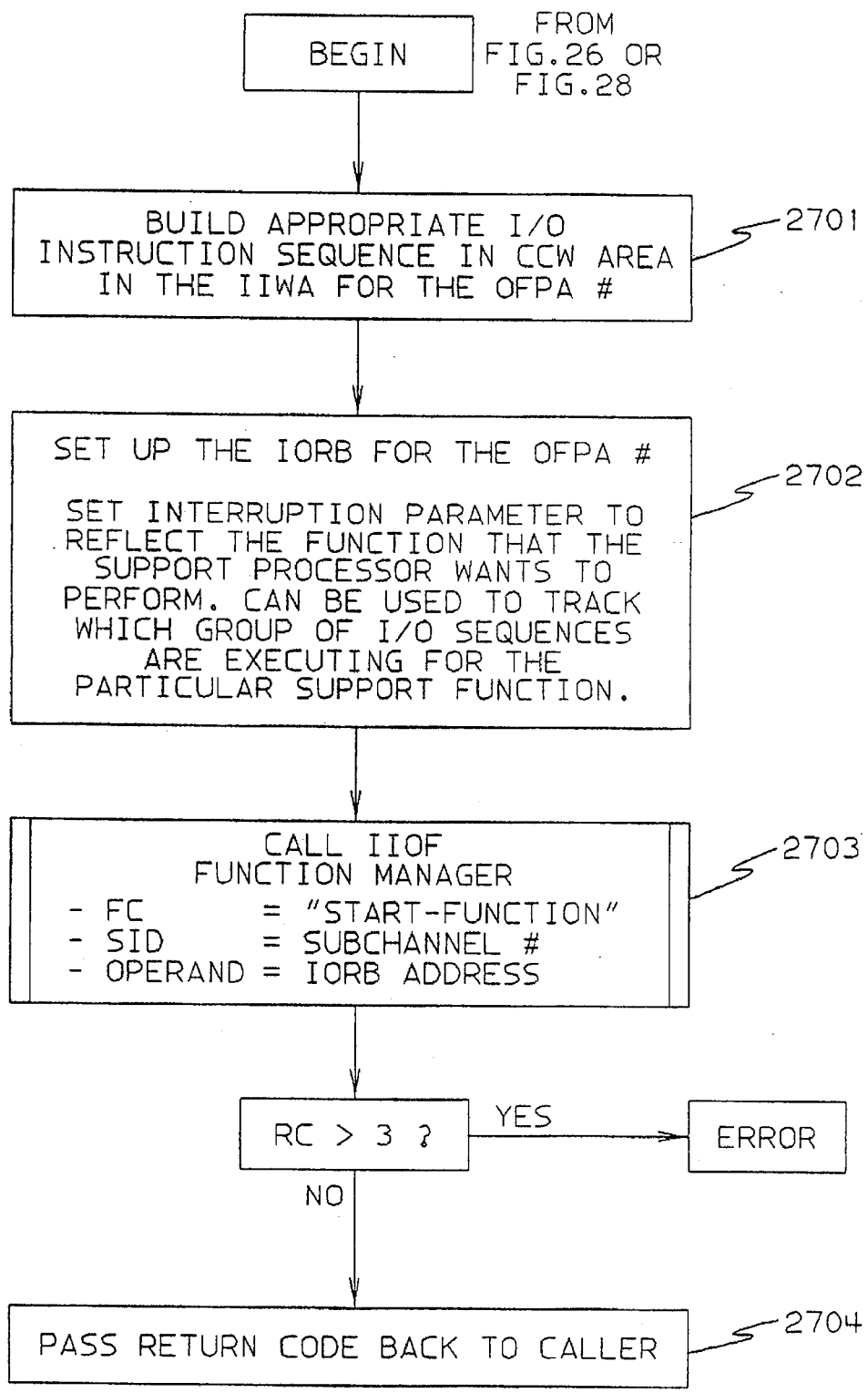
FIG. 27 is a flow chart showing how a Start Subchannel (SSCH) using the Start-Function is initiated.

FIG. 27 shows the processing to be done to initiate the Start-Function for the requested Service Function. At 2701, the appropriate CCWs needed to perform the Service Function are built in the work area for the particular OFPA shown in FIG. 17 at 1704. At 2702, the iORB is set up in the work area at 1704 with the Interruption Parameter used as a footprint for tracking the progress of the Service Request. Some Service Functions, such a Write Load Module, using Alter OSA Memory, may require that the OSA/IA initiate and handle the results from more than one channel program on the same OSA channel to accomplish the task of moving data from SSA to the OSA card flash before notifying the SP that the operation is completed. The Start-Function is initiated at 2703.

Upon successfully starting the Channel Program with a zero return code passed back at 2704, the iIOF processing of the Start-Function of the Diagnostic Subchannel that was dequeued from the Work Queue in FIG. 16 at 1613 will result in the selected OSA channel being signaled to initiate the Channel Program as shown in FIG. 22 at 2204. At 2205, the channel will signal the Control Unit to initiate the CCWs (I/O Sequences). At 2206, the OSA Service Device will be started and the Communication Controller will process the I/O Sequences. The Channel at 2209 will perform the data transfers that are required into or from the SSA (and not the Main Storage Area in FIG. 16). In the mean time, the IOSS will send back an ACK to the SP at 2207 in the form of a write Q-Bus return code at previously described in FIG. 23 at 2306. The SP is done with the Synchronous Portion at 2208 and can go off and do other processing until it is signalled or polls the OFPA Status byte for a change in the OFPA status byte in FIG. 18 at 1802.

When the I/O Sequences have completed, the Communication Controller will transmit combined or split "Channel End/Device End" status at 2210. These status settings are described in the ESA/390 Priciples of Operation. The channel will update the internal SSA subchannel with the status at 2211 and signal the IOSS. IOSS will get control and determine that the status requires that the subchannel be placed on the Interrupt Queue. At 2212, the Back End Intercept will occur in FIG. 4 at 41, the Application Manager will be called at 42, then the OSA/IA will be called by the Application Manager in FIG. 5 at 51 because the IAI will be set to 1 in the subchannel.

OSA/IA in FIG. 25 will get control again and determine from the Function Code at 2504 that status needs to be handled. The OSA Back End Intercept Process (OSA/INT) will be called at 2505, and will get control in FIG. 28. At 2801 a Test-Function will be done to determine the status. Then at 2802, the CHPID associated with the Subchannel can be determined using the "Chpid-Subchannel" Table shown in FIG. 17 at 1705. This method is used because the OFPA # must be obtained so the correct OFPA at 1703 can be updated with status if the OSA Service Device presented final status to the channel program. If the status is only channel end as tested at 2803, the OFPA Status cannot be updated until device end status comes in which signifies completion of the usage of the OSA Service Device for that channel program. The status should not be an Asynchronous/ Attention Unit Check In this case as tested for at 2804, because the status is the result of the SP initiating a Service Function. Thus the no leg at 2805 should be taken in this case. If the final status is OK (Channel End/Device End or Device End in split status case), a check Is made at 2806 to determine if additional channel programs need to be initiated to complete the processing of the Service Function. (This is also shown in FIG. 22 at 2213.) It may be desirable to break up the Service Function into multiple Channel Programs. This is sometimes needed if the results in terms of data obtained from one channel program dictate the execution of the next channel program. The Interruption Parameter can be used to track which channel program is running for the particular Service Function. If no additional programs need to be run, OSA/INT updates the OFPA Status to "Function Complete" at 2807. (This is also shown in FIG. 22 at 2214.) Depending on the implementation, this update alone may be enough to signal the SP that the processing is completed if the SP is periodically polling the Status field in the OFPA. Otherwise, the SP could be interrupted using the Q-bus or equivalent. In either case, an RC=0 is passed back so that when control is finally passed back to IOSS, from FIG. 28 to FIG. 25 to FIG. 5 to FIG. 4, the IOSS won't take any additional action with this OSA Service Subchannel. In cases where the OFPA Status is set to "Function Failed" at 2808 and 2809, the opertion is considered terminated and the SP will be signalled as is the case for "Function Complete" status. It is then up to the SP to retry the Service Function. At 2810, the Interrupt Parameter will need to be reset because the Service Function at this point is considered done (successful or failed). The resetting of the Interrupt Parameter can be done by first doing a Store-Function, then resetting the field, then a Modify-Function for the Diagnostic Subchannel being worked on. At this point, in the Support Processor Initiated Function Request in FIG. 22, the process is done at 2215.

FIG. 30 shows the System/390 Channel Path Deconfigure Offline process. This process is shown to point out the effect of turning off light to the OSA Communication Controller. When the Channel drops outbound light to the Communication Controller at 3004, the Communication Controller will drop inbound light to the Channel at 3005 and begin its reset process. (Steps 3001 thru 3004 and 3006 thru 3007 are prior art.) The Reset process caused by the dropping of light to the OSA Communication Controller causes all the hardware (see FIG. 15) in the Communication Controller portion of the OSA card to be reset. Diagnostics that are stored in Flash at 1513 are run. If an error occurs with the diags, an Error Log will be stored in Flash at 1514 to be logged out by a process that will be described later in this disclosure. After the diags are run, the Operational Microcode will be booted from Flash at 1511 into RAM at 1515.

Figure 31:
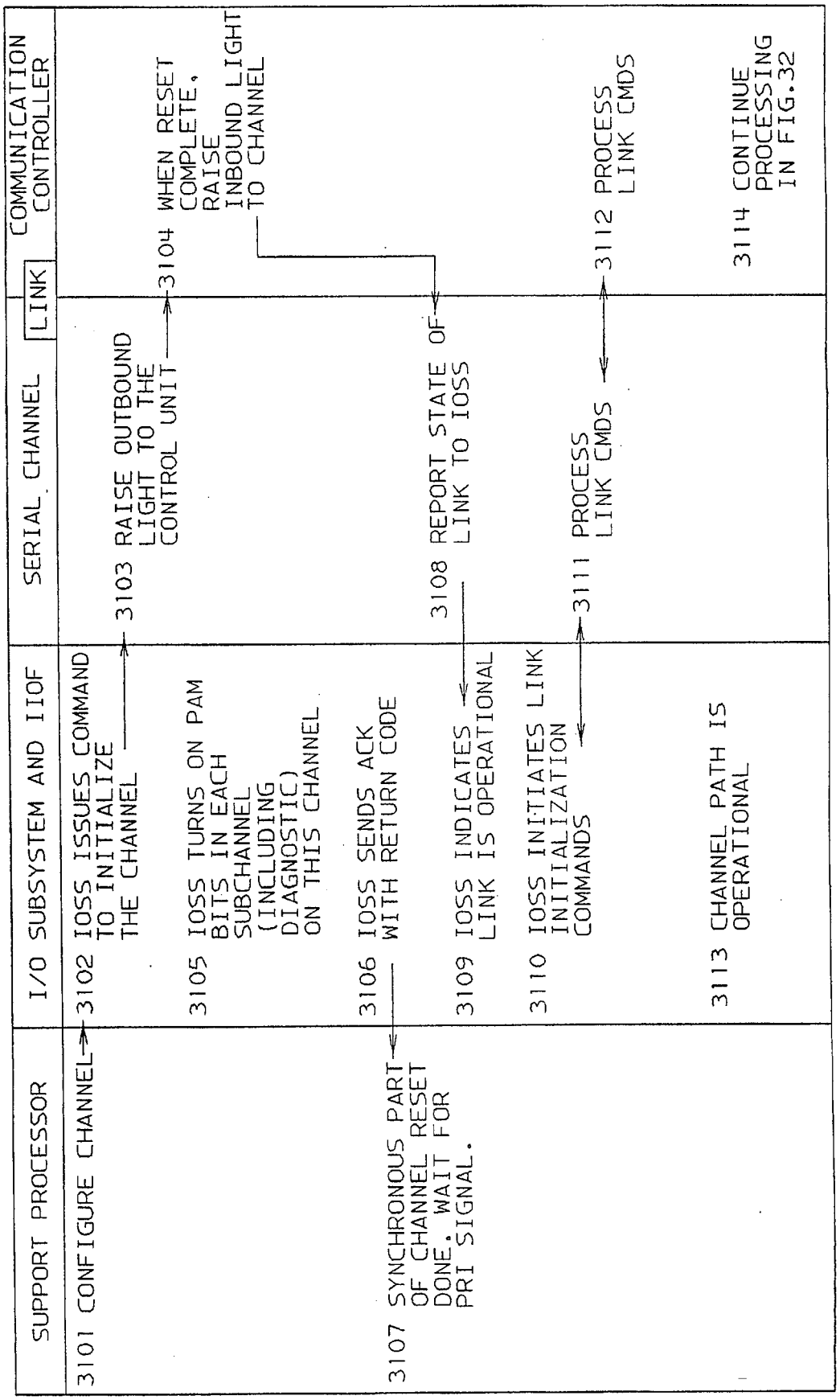
FIG. 31 is a flow diagram showing the transfer of control among the various system elements for handling Configure Channel Path.

FIG. 31 shows the System/390 prior art Configure Channel Path Online for the purpose of showing how the OSA card is driven through its initialization sequence when outbound light is turned on by the Channel at 3103. At 3104, the OSA Communication Controller will remain in the reset state until two conditions are met. First, an ample amount of time has elapsed to complete its reset process, and second, the Channel has turned on outbound light to the Communication Controller. Once the Reset is complete, the Communication Controller will raise inbound light to the channel at 3108 and Serial Link Initialization will proceed as it does in the prior art. Once link initialization is complete and the channel is operational at 3113, the OSA/IA will get involved in the initialization process as it continues in FIG. 32.

Figure 32:
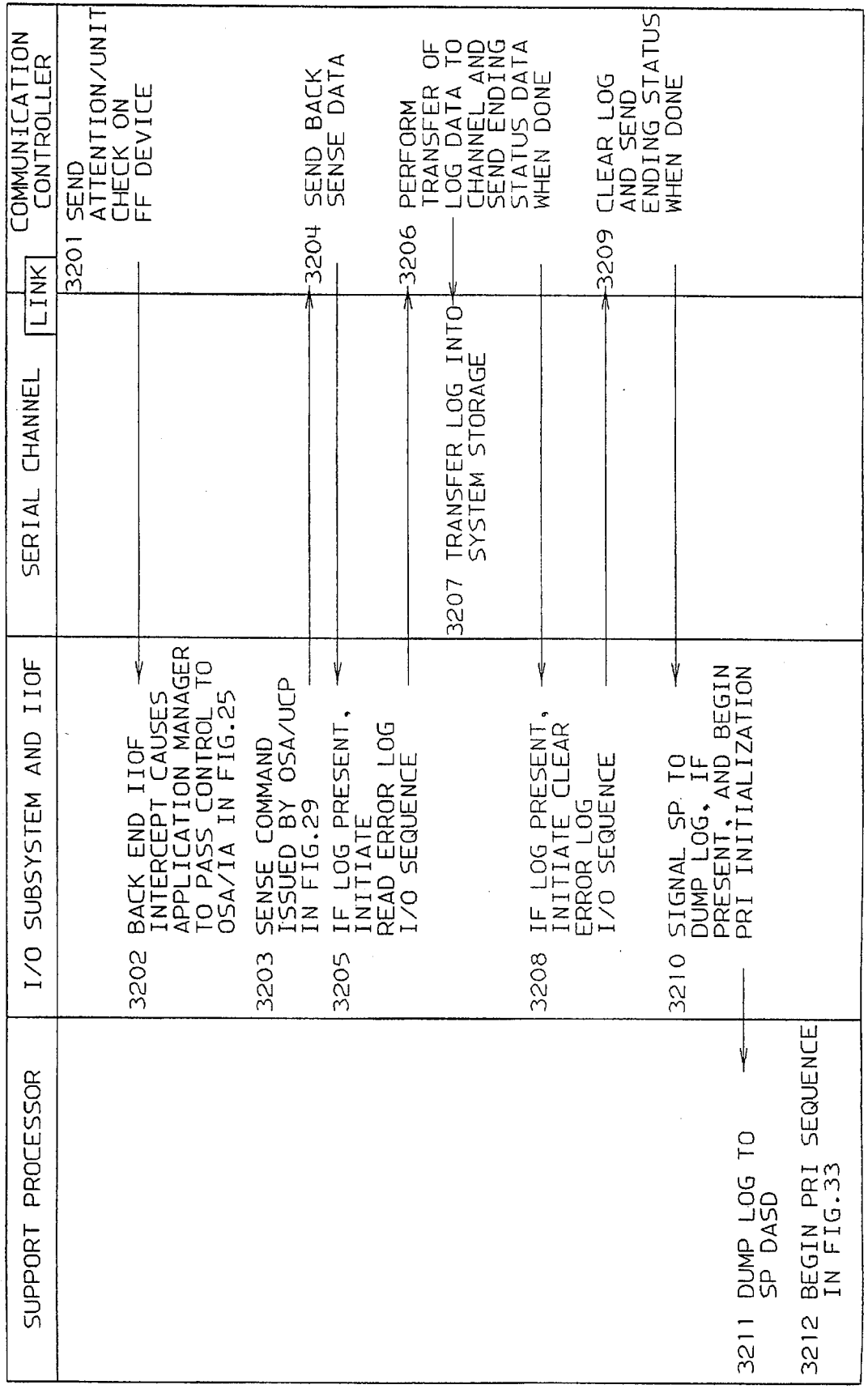
FIG. 32 is a flow diagram showing the transfer of control among the various sytem elements for handling an Attention/Unit Check on the OSA Service Device subchannel.

FIG. 32 is a continuation of the OSA reset sequence showing how the OSA/IA becomes involved. At 3201, the OSA Service Device will generate an Attention/Unit Check which causes a Back End Intercept to occur on the OSA Service Subchannel for that OSA channel at 3202 in much the same way as the processing occurred in FIG. 22 at 2212.

Figure 25:
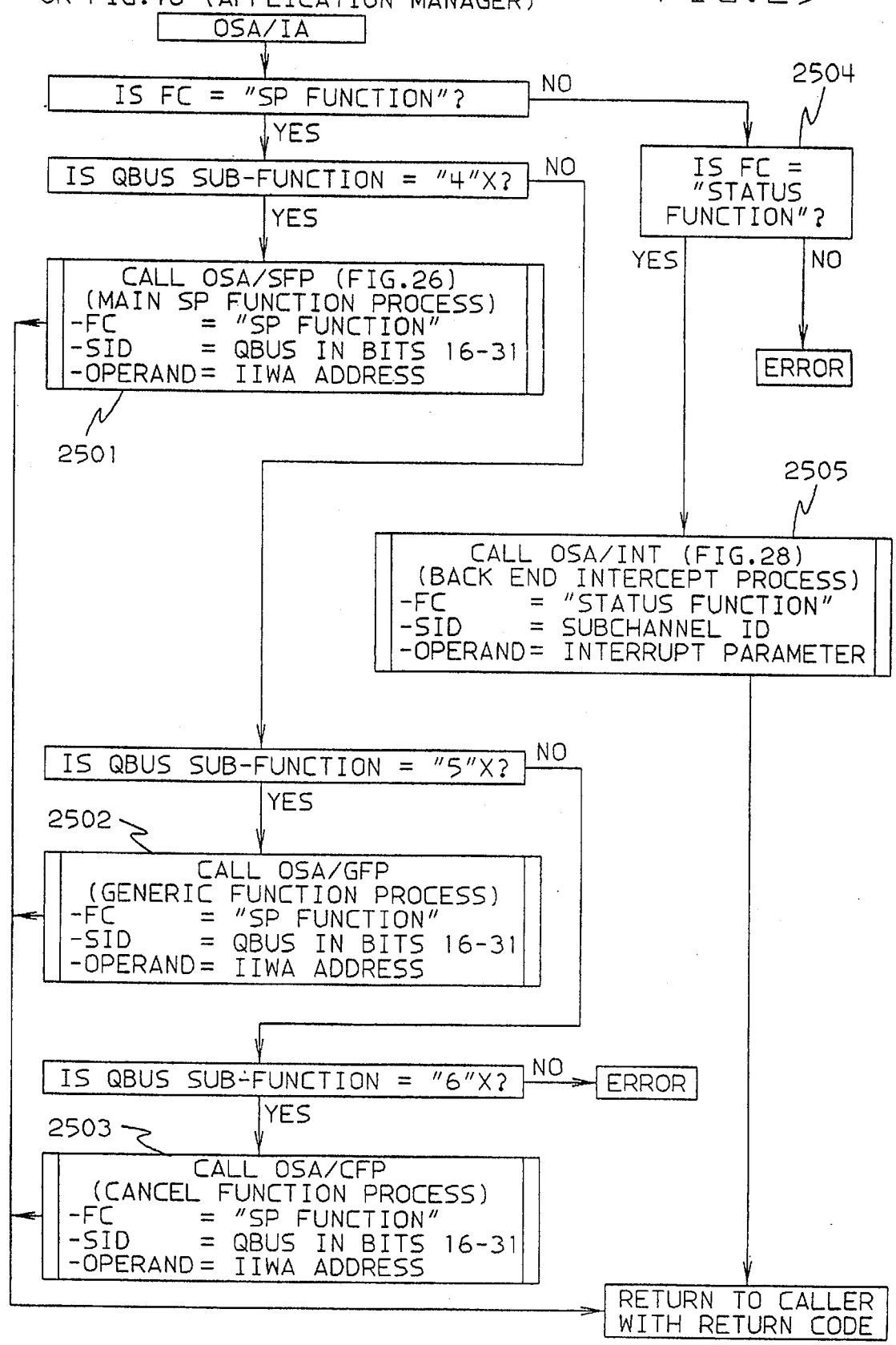
FIG. 25 is a flow chart showing the OSA/IA (OSA iIOF Application).
Figure 28:
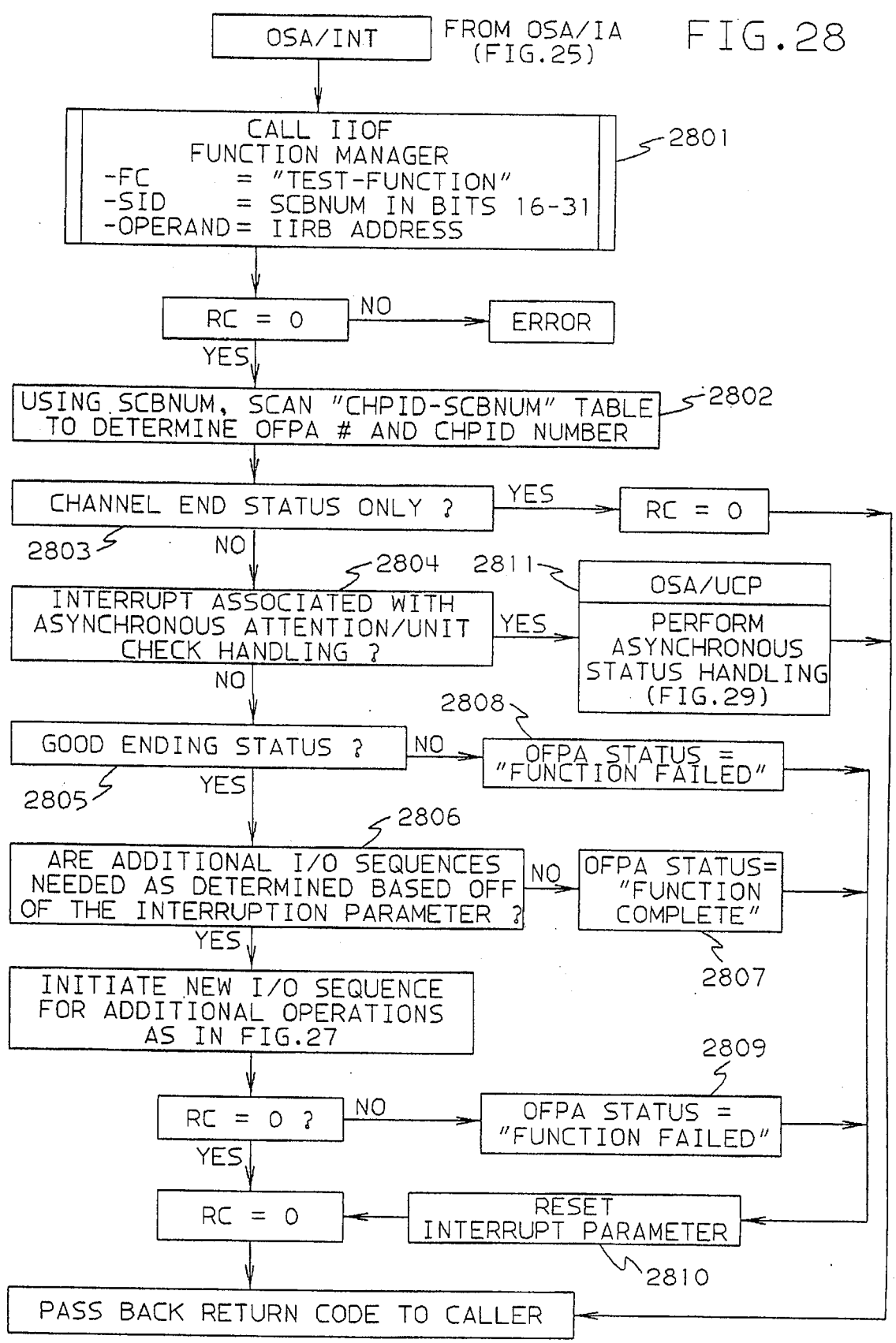
FIG. 28 is a flow chart showing how the back end interrupt Status-Function is processed for a Diagnostic subchannel for the OSA internal Application.

The Backend processing will proceed through the IOSS in FIG. 4, then to the Application Manager in FIG. 5, then to OSA/IA in FIG. 25, then to OSA/INT in FIG. 28. However, in FIG. 28 at 2804, processing will proceed to the OSA/UCP (Unit Check Processor) at 2811 because the I/O Status is an Attention/Unit Check. This is a way that the OSA Communications Controller can place a Service Request to the Host.

Figure 29:
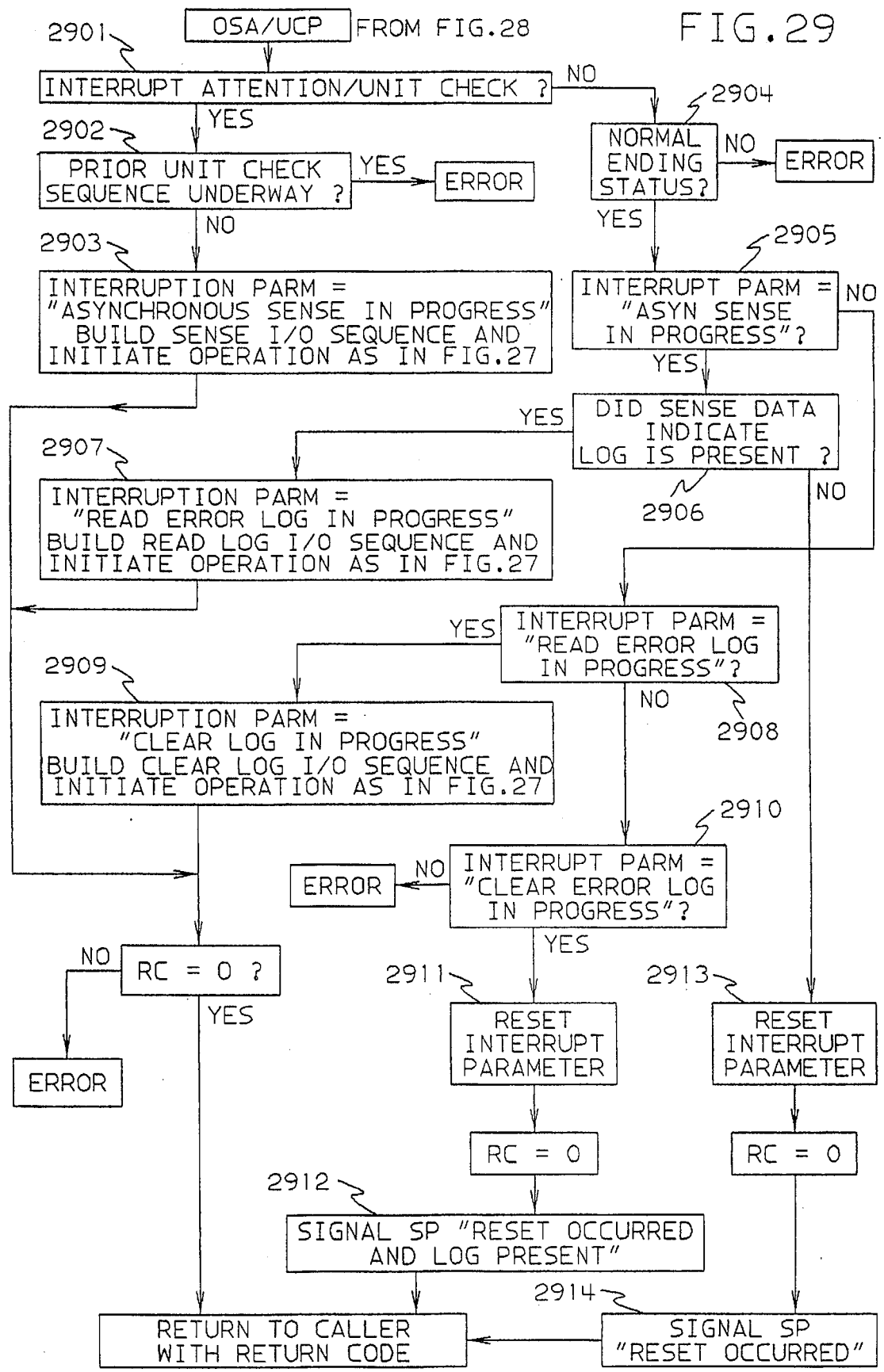
FIG. 29 is a flow chart showing OSA Attention/Unit Checks processing (OSA/UCP).

In FIG. 29 at 2901, the test for Attention/Unit Check will proceed down the YES path. At 2902, a test is made to check if Attention/Unit Check processing is already going on for this OSA channel. If YES, this is treated as an error because one Attention/Unit Check process (Sense/Read Log and Clear Log) can be maintained for a specific OSA channel at a time. However, Attention/Unit Check processing is allowed to overlap for different OSA channels at the same time. If the NO branch is taken, a Sense Channel Program will be set up at 2903 to cause the Sense Data to be stored in the Work Area in FIG. 17 at 1704. The OFPA # will be used to determine the address of the area to use. In addition, the Interruption Parameter is set to "Asynchronous Sense In Progress" as a means to footprint this unit check process. Footprinting is needed because 2 additional channel programs may have to be set up and initiated depending on the contents of the Sense Data. The process at 2903 to initiate the Start-Function is the same as the one used in FIG. 27. Once the Sense is initiated, control is passed back to FIG. 28, then to FIG. 25, then to the Application Manager in FIG. 5, then to the IOSS in FIG. 4 with RC=0. The issuing of the Sense Channel program is also indicated in FIG. 32 at 3203. The Communication Controller will send back the Sense Data and give ending status at 3204. At 3205, control will eventually get back to FIG. 29 as it did for the Attention/Unit check status. However, the check at 2901 will take the NO leg and the test for Normal Ending Status will be made at 2904. Then the Interrupt Parameter will be used to determine what Channel program just completed at 2905. In this case, the "Asyn Sense in Progress" indicates the Sense channel program was in progress. At 2906, the Sense Data will be analyzed. If the Sense Data indicates that a Log is present, a new channel program and iORB with the interrupt parameter equal to "Read Error Log in Progress" will be set up at 2907 to read the Error Log from Flash located in FIG. 15 at 1514 into one of the OSA Log Areas in FIG. 17 at 1707.

A Log in Flash may have been created due to a Diagnostic Failure, for example. Then, at 3206 and 3207, the data transfer of the Log into System Storage will occur. When the data transfer is complete, ending status sent at 3206 on the OSA Service Subchannel, it will be intercepted in the back end and control will be passed along to the OSA/UCP in FIG. 29 like the ending status for the Sense command was processed. Then at 2908, the YES leg will be taken and a Clear Error Log Channel program and iORB will be setup at 2909 (also shown at 3208). A Clear Error Log channel program is required to reset the error log space in flash at 1514 so the space can be used if a new log needs to be processed. When the Clear Error Log completes, ending status at 3209 on the OSA Service Subchannel will be intercepted in the back end and control will be passed along to OSA/UCP in FIG. 29.

At 2910, the YES leg will be taken and the Interrupt Parameter will be reset at 2911 as was done in FIG. 28 at 2810. In order for the SP to find out about the Log, the OSA/UCP at 2912 will signal the SP that a Log is present in System Storage in FIG. 17 at 1707. When the SP is signalled as also shown in FIG. 32 at 3210, the SP at 3211 will dump the Log from SSA in FIG. 17 at 1707, onto SP DASD or Hard Disk in FIG. 14 at 1414. This log can now be obtained remotely as do the other logs dumped to the Support Processor DASD. A big improvement from having to dump a control unit log to floppy and mail it to development. If there was no log to dump from the OSA card as determined in FIG. 29 at 2906, the Interrupt Parameter will be reset at 2913. At both 2912 and 2914, a determination will be made to see if the Sense Data indicates that the OSA card went through a reset to determine if the SP should be signalled that the card was reset.

In FIG. 32 at 3212, if it was determined from the sense data that the card was reset, the reset sequence will now enter the Post Reset Initialization (PRI) phase in FIG. 33. At 3301, the SP will set up the OFPA in FIG. 17 for the OSA channel that had been reset and then do a "Display OSA Memory". The Additional Parmeters for the Display Memory in FIG. 20 would contain the predetermined Flash address of the Master File in FIG. 15 at 1512. The Master File contains the version and levels of each of the microcode modules in the flash area at 1511 and their locations. The SP will then proceed to invoke the same process at 3301 to process a Support Processor initiated Service Function as shown in detail already for FIG. 22. At 3302, once the Master File is read, the SP will compare the levels of code in the Master File at 1512 read from the OSA card against the levels within the Master File it has stored on DASD in FIG. 14 at 1414. At 3303, if there is a mismatch, the SP will load the appropriate microcode into OCSA at 1708. At 3304, the SP will invoke "Alter OSA Memory" Service Functions to store the updated microcode from the OCDA to Flash on the Card. After the microcode has been updated in flash, the SP at 3305 will write the updated Master File to the card. This will ensure that the card is not being continually updated every PRI sequence. If the OSA microcode got updated, then an OSA Reset will be needed to make the new code in Flash the operational code as indicated at 3306. However, once the Reset command is issued, the SP should abort from the PRI sequence because the OSA Communications Controller will appear as Not-Operational throughout the OSA Reset sequence and the reset will bring the card back to its initial state. If the card doesn't have to be reset, the PRI sequence will continue at 3307 where the Set Port Enable Function is issued by the SP for each port on the OSA card.

At 3308, the SP will issue the Enable I/O Service Function. What this function does is it causes the non-OSA Service Devices that have been defined to be in the configuration of the OSA card to go from being in a non-operational state to an operational state. The default state of the non-OSA Service Devices after a card reset is to be in a non-operational state. The OSA Service Device will be left in the operational state after link initialization has completed in FIG. 31 at 3113 so the Attention/Unit Check processing could occur in FIG. 32 and the OSA Service Subchannel could be used in the PRI sequence in FIG. 33. The purpose of having the host accessible devices to be in the non-operational state during the PRI sequence is to prevent the host OS from initiating I/O sequences when the card could potentially be going through various updates during the PRI that could affect the outcome of the operations on these host accessible devices. Thus, the Enable I/O CCW is interpreted by the OSA card to put devices in the operational state. When the Enable I/O completes, the OSA/IA will signal the Host OS with an I/O Accessibility report to assist the OS to determine if it should retry I/O operations on the OSA channel should the host have encountered non-operational conditions on the devices. At 3309, the PRI ends when Enable I/O completes.

Figure 37:
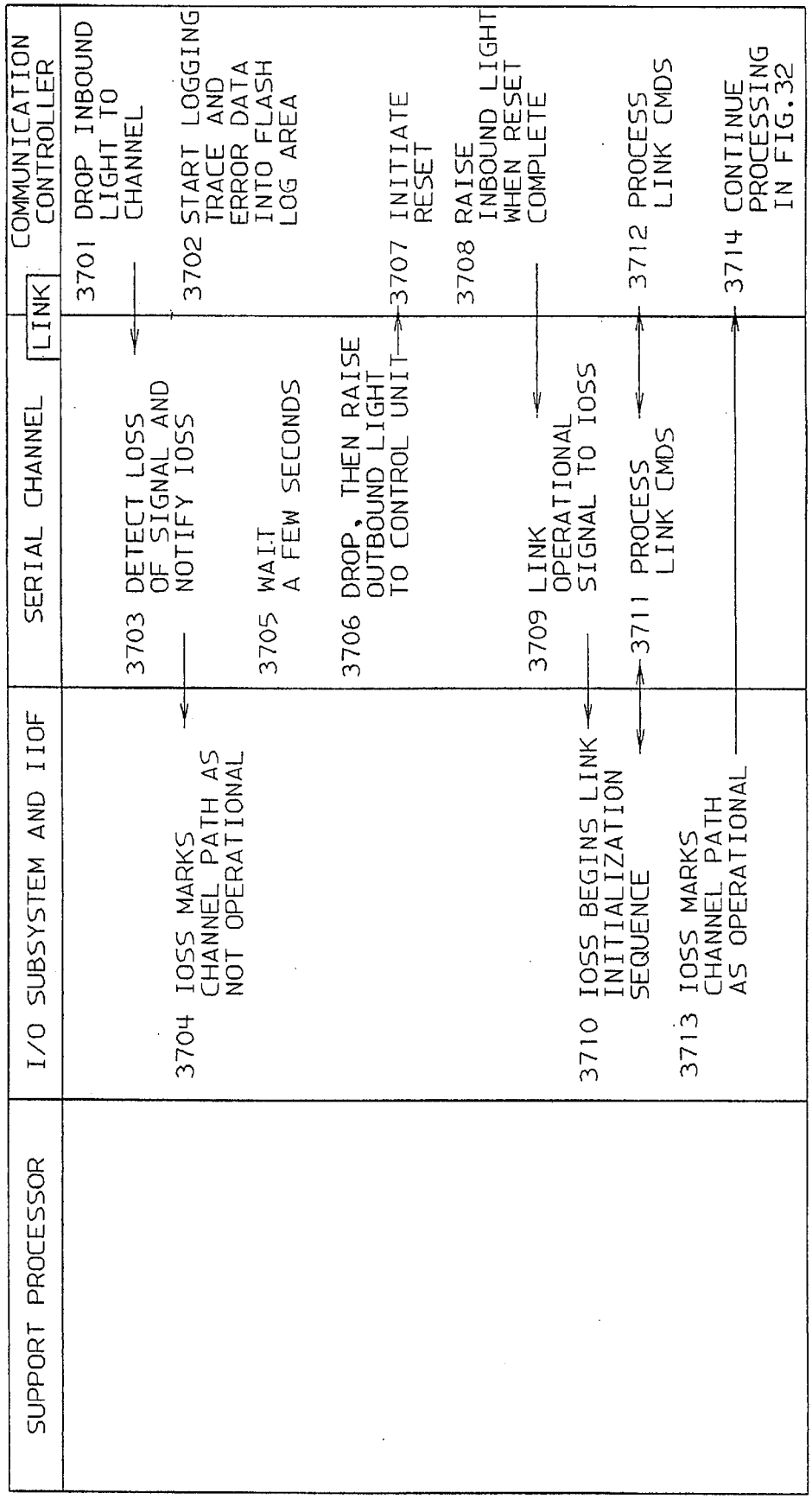
FIG. 37 is a flow diagram showing the transfer of control and signaling among the various sytem elements during an OSA recovery caused by either a Force OSA log request, OSA Detected error or OSA/IA detected error.

In the event that the OSA control unit detects a failure that requires the OSA control unit to be logged and recovered, FIG. 34 shows the recovery process on an OSA detected error. At 3401, the OSA Card detects a hardware error. In FIG. 37 at 3701, the Communication Controller will signal the Serial Channel that a failure has occured by dropping inbound light to the channel. At 3702, the Controller will begin logging critical error data to nonvolatile flash memory in FIG. 15 at 1514. This step assumes that the error logging capability of the control unit is still operational. At 3703, the Serial Channel notifies the upstream IOSS that this loss of inbound light has occurred. This will cause logical paths to be removed and outstanding I/O operations on that channel to be terminated with the proper status. (This is already being done when a loss of signal condition is detected on any Serial channel). At 3705, the Channel will give the Controller some time to log, then at 3706, the channel will drop, then raise outbound light to the OSA Controller. This will cause the OSA Controller to go through a complete reset at 3707. At 3708, upon successful completion of the logging and reset, the OSA controller will turn on inbound light to the OSA channel. At 3709, when the serial channel sees inbound light, it will signal the upstream IOSS that the link is operational. If inbound light is not seen by the channel within a preset time period, it will take additional recovery actions and the remaining steps in this process will be skipped. (In this embodiment, the channel will request to be made "permanent, initialized" if light is not seen within a few minutes from the time it saw light drop.) At 3710, when the upstream IOSS sees this link operational signal, it will initiate link initialization to reestablish a logical path between the channel and controller. This step is already implemented in the IOSS. At 3713, once a logical path is established, the IOSS marks the path as operational and the processing continues in FIG. 32.

FIG. 35 shows the process by which an OSA Log can be forced as requested by the Support Processor. At 3501, the Support Processor will signal the IOSS that an OSA Controller log is requested when a user requests a log via a user interface provided by the Support Processor. At 3502, the IOSS gets the request and it initiates a recovery and force log process. This process will invoke existing channel recovery processes shown at 3503, 3504 and 3505 to clean up existing I/O activity on the channel. At 3506, the Serial Channel is signaled by the upstream IOSS to send a special Serial sequence out on the link to the OSA controller at 3507. The sequence '04'x was chosen. At 3508, upon receipt of this special sequence, the OSA controller will continue the process in FIG. 37. At 3509 the IOSS lets the SP know that the fore log was initiated so the SP can alert the user at 3510 that the logging is in progress.

Figure 36:
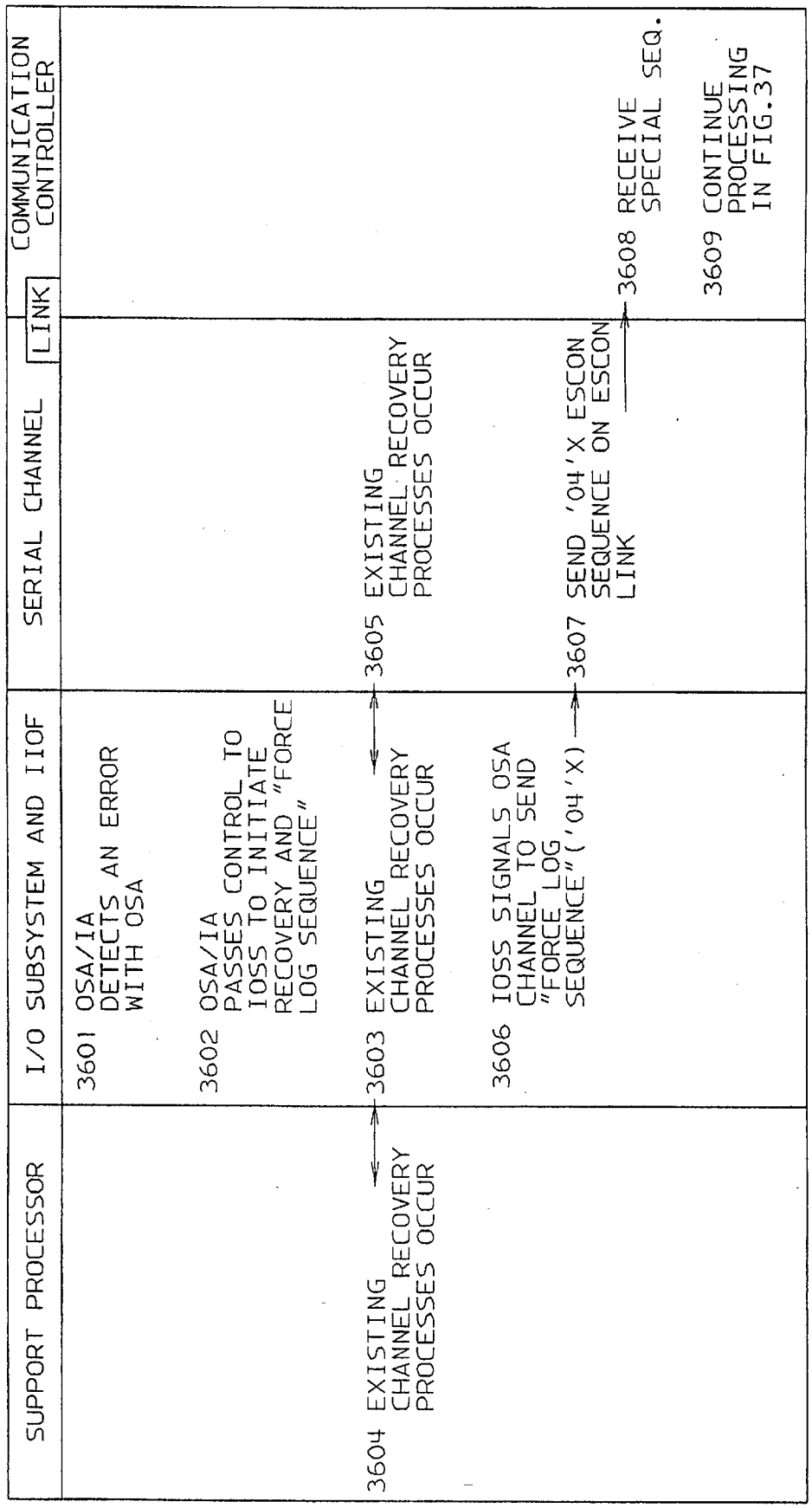
FIG. 36 is a flow diagram showing the transfer of control among the various sytem elements during an OSA internal Application detected error.

FIG. 36 show a process by which an iIOF application such as the OSA/IA can force an OSA Controller log and put the OSA through recovery. At 3601, OSA/IA detects an error that requires an OSA controller to be logged and recovered. At 3602, the IOSS gets the request from the OSA/IA and it initiates a recovery and force log process. This process will invoke existing channel recovery processes shown at 3603, 3604 and 3605 to clean up existing I/O activity on the channel. At 3606, the Serial Channel is signaled by the upstream IOSS to send a special Serial sequence out on the link to the OSA controller at 3607. The sequence '04'x was chosen. At 3608, upon receipt of this special sequence, the OSA controller will continue the process in FIG. 37.

In conclusion, the method and system for controlling the serviceability of adaptors connected by an I/O channel interface provides for a means to automatically update non-volatile microcode storage and make the updated code active over a standard I/O interface from a remote location as demonstrated. The adaptor need only be Deconfigured, then Configured back on line to cause a reset thereby giving it initiative to go through the PRI sequence. In addition, an automatic logging and recovery mechanism is provided whereby logs stored in the Communications Controller could be obtained over a standard I/O interface. Recovery and Logging actions can be initiated by the adaptor, the iIOF application or by the Support Processor, either manually or automatically. Service Requests on different Cards could be initiated concurrently due to the assignment of one subchannel per adaptor thereby providing a time savings in the above processes.

It should be understood that the embodiments described herein have been provided by way of example and not by way of limitation. In light of the foregoing description, many modifications and variations exist which do not depart from the scope and spirit of the invention as defined by the appended claims.

Having thus described our invention, what we claim as new and desire to secure by Letters Patent is:

1. A method of intercepting execution of software initiated input/output (I/O) operations in an input/output subsystem (IOSS) of a computer system to execute an I/O related microcoded application (the application), comprising the steps of:

loading the application comprised of IOSS microcode in a microcode memory accessed by the IOSS, the microcode memory not being addressable by software programs executing in the computer system, assigning and associating an I/O subchannel control block (subchannel) with the application by providing an application identifier in a field in the subchannel, and locating the subchannel in the IOSS in microcode memory, structuring the subchannel with at least one intercept field and an address representation for entering execution of the application, the intercept field having states for indicating whether or not IOSS processing for the subchannel is to execute the application, and invoking execution of the application by the IOSS when the intercept field indicates an intercept state, and invoking execution of the I/O operation when the intercept field does not indicate the intercept state.

2. A method of intercepting I/O operations in an input/output subsystem (IOSS) of a computer system to execute the application, as defined in claim 1, further comprising the steps of:

superimposing an execution of the application on an execution of the I/O operation by the IOSS if the intercept field indicates an intercept state, but only executing the I/O operation (and not executing the application) if the intercept field indicates a non-intercept state.

3. A method of intercepting I/O operations in an input/output subsystem (IOSS) of a computer system to execute the application, as defined in claim 1, further comprising the steps of:

structuring the IOSS with a plurality of queues, in which one of the queues receives the subchannel.

4. A method of intercepting I/O operations in an input/output subsystem (IOSS) of a computer system to execute the application, as defined in claim 3, further comprising the steps of:

providing an IOSS work request queue as a predetermined queue in the plurality of IOSS queues for receiving I/O requests from a central processor (CPU) directed to the subchannel.

5. A method of intercepting a software initiated I/O operation in an input/output subsystem (IOSS) of a computer system to execute an I/O related microcoded application (the application), comprising the steps of:

loading the application in a microcode memory accessed by the IOSS, the microcode memory not being addressable by software executing in the computer system, associating an I/O subchannel control block (the subchannel) with the application by providing an application identifier in a field in the subchannel, and locating the subchannel in microcode memory, structuring the subchannel with an intercept field and an address representation for entering execution of the microcoded application, the intercept field having a state indicating whether IOSS processing for the subchannel is to include execution of the application, invoking execution of the application when the subchannel is queued, or is to be queued, on a predetermined queue in the I/O subsystem while the intercept field indicates an intercept state, structuring the IOSS with a plurality of queues, in which one of the queues is the predetermined queue, providing an IOSS work request queue as the predetermined queue in the plurality of IOSS queues for receiving I/O requests directed to the subchannel, associating the intercept field with the IOSS work request queue, and executing the application before or instead of execution of IOSS processing for the subchannel if the testing step finds an intercept state exists for the subchannel.

6. A method of intercepting a computer operation in an input/output subsystem (IOSS) of a computer system to superimpose an execution of an I/O related application as defined in claim 5, comprising the step of:

executing IOSS processing for the subchannel with no execution then provided for the microcoded application in response to the testing step finding a non-intercept state exists for the subchannel.

7. A method of intercepting a software initiated I/O operation in an input/output subsystem (IOSS) of a computer system to superimpose an execution of an I/O related microcoded application (the application), comprising the steps of:

loading the application in a microcode memory accessed by the IOSS, the microcode memory not being addressable by software executing in the computer system, associating an I/O subchannel control block (the subchannel) with the application by providing an application identifier in a field in the subchannel, and locating the subchannel in the microcode memory, structuring the subchannel with an intercept field and an address representation for entering execution of the application, the intercept field having a state indicating whether IOSS processing for the subchannel is to include execution of the application, invoking execution of the application when the subchannel is queued, or is to be queued, on a predetermined queue in the I/O subsystem while the intercept field indicates an intercept state, structuring the IOSS with a plurality of queues, in which one of the queues is the predetermined queue.

8. A method of intercepting a computer operation in an input/output subsystem (IOSS) of a computer system to superimpose an execution of an I/O related microcoded application (the application), comprising the steps of:

loading the application in a microcode memory accessed by the IOSS, the microcode memory not being addressable by software executing in the computer system, associating an I/O subchannel control block (the subchannel) with the application by providing an application identifier in a field in the subchannel, and locating the subchannel in microcode memory, structuring the subchannel with an intercept field and an address representation for entering execution of the application, the intercept field having a state indicating whether IOSS processing for the subchannel is to include execution of the application, invoking execution of the application when the subchannel is queued, or is to be queued, on a predetermined queue in the I/O subsystem while the intercept field indicates an intercept state, structuring the IOSS with a plurality of queues, in which one of the queues is the predetermined queue, receiving status information in the IOSS concerning execution of an I/O request for the subchannel before queuing the subchannel on an IOSS interruption queue, the IOSS interruption queue being the predetermined queue in the plurality of queues in the IOSS.

9. A method of intercepting a software initiated input/output operation (the I/O operation) in an input/output subsystem (IOSS) of a computer system to superimpose an execution of an I/O related microcoded application (the application), comprising the steps of:

loading the application in a microcode memory accessed by the IOSS, the microcode memory not being addressable by software executing in the computer system, associating an I/O subchannel control block (the subchannel) with the application by providing an application identifier in a field in the subchannel, and locating the subchannel in microcode memory, structuring the subchannel with an intercept field and an address representation for entering execution of the application, the intercept field having a state indicating whether IOSS processing for the subchannel is to include execution of the application, invoking execution of the application when the subchannel is queued, or is to be queued, on a predetermined queue in the I/O subsystem while the intercept field indicates an intercept state, structuring the IOSS with a plurality of queues, in which one of the queues is the predetermined queue, associating the intercept field with the IOSS interruption queue, and executing the application after execution of prior IOSS processing for the subchannel if the testing step finds an intercept state exists for the subchannel when status is provided for placing the subchannel on the IOSS interruption queue.

10. A method of intercepting a computer operation in an input/output subsystem (IOSS) of a computer system to superimpose an execution of an I/O related application as defined in claim 9, comprising the step of:

performing IOSS processing for the subchannel with no execution then provided of the microcoded application, in response to the testing step finding a non-intercept state existing for the subchannel when status is provided for the subchannel to enable queuing the subchannel on the IOSS interruption queue.

11. A method of intercepting a computer operation in an input/output subsystem (IOSS) of a computer system to superimpose an execution of an I/O related application as defined in claim 10, comprising the steps of:

receiving status information in the IOSS concerning execution of an I/O request for the subchannel before queuing the subchannel on an IOSS interruption queue, the IOSS interruption queue being the predetermined queue in the plurality of queues in the IOSS.

12. A method of intercepting a computer operation in an input/output subsystem (IOSS) of a computer system to superimpose an execution of an I/O related application as defined in claim 11, in which the intercept field comprises a back-end (B) intercept bit associated with the IOSS interruption queue in an extension of the subchannel.

13. A method of intercepting a software initiated input/output operation (the I/O operation) in an input/output subsystem (IOSS) of a computer system to superimpose an execution of an I/O related microcoded application (the application), comprising the steps of:

loading the application in a microcode memory accessed by the IOSS, the microcode memory not being addressable by software executing in the computer system, associating an I/O subchannel control block (the subchannel) with the application by providing an application identifier in a field in the subchannel, and locating the subchannel in microcode memory, structuring the subchannel with an intercept field and an address representation for entering execution of the application, the intercept field having a state indicating whether IOSS processing for the subchannel is to include execution of the application, invoking execution of the application when the subchannel is queued, or is to be queued, on a predetermined queue in the IOSS while the intercept field indicates an intercept state, structuring the IOSS with a plurality of queues, in which one of the queues is the predetermined queue, providing an IOSS work request queue as the predetermined queue in the plurality of IOSS queues for receiving I/O requests directed to the subchannel, loading application initiated I/O operations for performing sequences of operations for a real I/O device represented by the subchannel, and initiating execution of the application I/O operation by an I/O start function queuing the subchannel on the IOSS work request queue.

14. A method of intercepting a software initiated I/O operation in an input/output subsystem (IOSS) of a computer system to superimpose an execution of an I/O related microcoded application (the application), comprising the steps of:

loading the application in a microcode memory accessed by the IOSS, the microcode memory not being addressable by software executing in the computer system, associating an I/O subchannel control block (the subchannel) with the application by providing an application identifier in a field in the subchannel, and locating the subchannel in microcode memory, structuring the subchannel with an intercept field and an address representation for entering execution of the application, the intercept field having a state indicating whether IOSS processing for the subchannel is to include execution of the application, invoking execution of the application when the subchannel is queued, or is to be queued, on a predetermined queue in the IOSS while the intercept field indicates an intercept state, structuring the IOSS with a plurality of queues, in which one of the queues is the predetermined queue, providing an IOSS work request queue as the predetermined queue in the plurality of IOSS queues for receiving I/O requests directed to the subchannel, loading the application for performing sequences of operations for a real I/O device represented by the subchannel, and initiating execution of an application I/O operation by an I/O start function queuing the subchannel on the IOSS work request queue, executing the application to perform operations on other subchannels defined in the application but not defined to an operating system (OS), and generating status for I/O operations for a software initiated I/O start instruction for which the status does not recognize the existence of the subchannels in the application not defined to the OS, and queuing the status information on an IOSS interruption queue for communicating the status information to software.

15. A method of intercepting execution of a prior-type input/output processor (IOP) program in an input/output subsystem (IOSS) of a computer system, comprising the steps of:

initiating execution in the IOSS of the prior-type IOP program, testing in response to the initiating step an interception indicator state of a control block (subchannel) associated with the prior-type IOP program to control whether to initiate execution of an I/O related microcoded application (the application), executing the application instead of, or in addition to, the prior-type IOP program if the indicator state is an interception state, and only executing the prior-type IOP program if the indicator has a non-interception state, and controlling a following flow of execution in the IOSS as a function of the execution of the application.

16. A method of intercepting execution of a prior-type IOP program, as defined in claim 15, the controlling step further comprising:

testing another interception indicator state of the subchannel in response to an ending status signal by an I/O device associated with the subchannel for an I/O operation requested by the IOP program to determine If the I/O related microcoded application is to be executed.

17. A method of intercepting execution of a prior-type IOP program, as defined in claim 15, the controlling step further comprising:

initiating an I/O operation by the application, or a different application, after execution of an IOP microcoded function in the application in response to a setting of an interception indicator state in the subchannel.

18. A method of intercepting execution of a prior-type IOP program, as defined in claim 15, the controlling step further comprising:

receiving ending status by the IOP from an I/O device upon completing execution of an I/O operation for the prior-type IOP program to signal the IOP to examine the interception state in the subchannel.

19. A method of intercepting execution of a prior-type IOP program, as defined in claim 17, the controlling step further comprising:

executing the IOP microcoded application in response to the existence of the interception state in the subchannel.

20. A method of intercepting execution of a prior-type IOP program, as defined in claim 15, further having:

the initiating step comprising a start subchannel instruction sent to the IOP by a central processor (CPU) for initiating the execution of the prior-type IOP program, and the prior-type IOP program being an I/O software program comprised of one or more channel command words.

21. A method of intercepting execution of a prior-type input/output processor (IOP) program, comprising the steps of:

executing by the IOSS the prior-type IOP program in response to an input initiative signal, receiving by the IOSS an ending status from a device when the device completes each I/O operation request issued by the prior-type IOP program, testing by the IOSS an interception field in a control block (subchannel) associated with the device in response to the ending status, requesting by the IOSS any next I/O operation in the IOSS software program if the interception indicator field indicates no interception state, and switching IOSS execution to an IOSS microcoded program for performing one or more application functions if the interception indicator field indicates an interception state, and any subsequent execution of the prior-type IOP program being controllable by the IOSS microcoded program.

22. A method of intercepting execution of a prior-type input/output processor (IOP) program, as defined in claim 21, further comprising the step of:

generating by the IOSS coded program interruption status to be stored in a computer memory location associated with an interruption signal sent to a central processor in the computer system upon completing execution of the IOSS microcoded program for a last I/O request in the prior-type IOP program.

23. A method of intercepting execution of a prior-type input/output processor (IOP) program, as defined in claim 21, further comprising the step of:

generating by the IOSS for the prior-type IOP program an interruption status to be stored in a computer memory location associated with an interruption signal sent to a central processor in the computer system upon completing execution of the prior-type IOP program.

24. A method of intercepting execution of a prior-type IOP program as defined in claim 21, further comprising:

switching IOSS execution to a different prior-type IOP program in response to execution by the IOSS microcoded program.

25. A method of intercepting execution of a prior-type IOP program as defined in claim 21, further comprising:

switching IOSS execution to a different subchannel in response to IOSS execution by the IOSS microcoded program.

26. A method of intercepting a computer operation in an input/output subsystem (IOSS) of a computer system to superimpose an execution of an I/O related application as defined in claim 3, in which the intercept field comprises a front-end (F) intercept bit associated with the IOSS work request queue in an extension of the subchannel.

27. A method of intercepting IOSS execution of a prior-type IOP program as defined in claim 21, further comprising:

structuring the subchannel with a front-end intercept indicator, a back-end intercept indicator, and an address representation for entering execution of the IOSS microcoded program, the front-end intercept indicator and the back-end intercept indicator each having a state indicating if an intercept execution entry is to be taken into the IOSS microcoded program at the address representation in the subchannel, executing IOSS mainline code for controlling entry into the IOSS microcoded program, including:

invoking execution of the IOSS microcoded program when the subchannel is accessed from a subchannel request queue for execution of the IOSS program when the front-end intercept indicator has an intercept state, and invoking execution of the IOSS microcoded program when the IOSS receives an ending status signal upon completion of an I/O operation by a device associated with a current subchannel when the back-end intercept indicator has an intercept state.

* * * * *